(12) United States Patent
Newell et al.

(10) Patent No.: US 7,197,716 B2
(45) Date of Patent: Mar. 27, 2007

(54) LITIGATION MANAGEMENT SYSTEM AND METHOD

(75) Inventors: Kimberly Ann Newell, Coon Rapids, MN (US); Robert Joseph Glance, Minneapolis, MN (US)

(73) Assignee: Merchant & Gould, P.C., Minneapolis, MN (US)

( * ) Notice: Subject to any disclaimer, the term of this patent is extended or adjusted under 35 U.S.C. 154(b) by 669 days.

(21) Appl. No.: 10/028,060

(22) Filed: Dec. 21, 2001

(65) Prior Publication Data

US 2003/0112270 A1 Jun. 19, 2003

Related U.S. Application Data

(60) Provisional application No. 60/257,607, filed on Dec. 22, 2000.

(51) Int. Cl.
*G06F 3/00* (2006.01)
(52) U.S. Cl. .................................. 715/760; 715/854
(58) Field of Classification Search ................ 715/760, 715/733, 741, 743–747, 810, 853–855, 705, 715/712–713, 961, 962, 700, 501.1, 513; 705/1, 8
See application file for complete search history.

(56) References Cited

U.S. PATENT DOCUMENTS

| | | | | |
|---|---|---|---|---|
| 5,444,615 A * | 8/1995 | Bennett et al. | ................ | 705/8 |
| 5,815,392 A * | 9/1998 | Bennett et al. | ................ | 705/8 |
| 5,838,966 A * | 11/1998 | Harlan | ........................ | 715/866 |
| 5,875,431 A * | 2/1999 | Heckman et al. | ............... | 705/7 |
| 5,903,646 A * | 5/1999 | Rackman | ..................... | 705/51 |
| 5,940,800 A * | 8/1999 | Bennett et al. | ................ | 705/1 |
| 5,956,687 A * | 9/1999 | Wamsley et al. | ............... | 705/1 |
| 6,098,070 A * | 8/2000 | Maxwell | ...................... | 707/102 |
| 6,128,620 A * | 10/2000 | Pissanos et al. | ............. | 707/102 |
| 6,182,078 B1 * | 1/2001 | Whitmyer, Jr. | ............... | 707/10 |
| 6,330,551 B1 * | 12/2001 | Burchetta et al. | ............. | 705/80 |
| 6,430,581 B1 * | 8/2002 | Mahoney et al. | ........... | 715/500 |
| 6,502,113 B1 * | 12/2002 | Crawford et al. | ........... | 715/530 |
| 6,599,324 B2 * | 7/2003 | Saito et al. | ................... | 715/513 |
| 6,622,128 B1 * | 9/2003 | Bedell et al. | .................. | 705/30 |
| 6,694,315 B1 * | 2/2004 | Grow | .......................... | 707/10 |
| 6,738,760 B1 * | 5/2004 | Krachman | ..................... | 707/3 |
| 6,748,399 B1 * | 6/2004 | Kan et al. | ................. | 707/104.1 |
| 6,810,382 B1 * | 10/2004 | Wamsley et al. | ............... | 705/1 |

FOREIGN PATENT DOCUMENTS

| | | |
|---|---|---|
| WO | WO 00/55787 | 9/2000 |
| WO | WO 00/65483 | 11/2000 |
| WO | WO 00/65773 | 11/2000 |

OTHER PUBLICATIONS

Greenspun et al. (Making Way for Intelligence in Case Space, ACM 1995, pp. 96-103).*

(Continued)

*Primary Examiner*—Sy D. Luu

(57) ABSTRACT

A computer-based user interface for accessing litigation information associated with at least one litigation case includes a home page. The home page includes a first plurality of user-selectable hyperlinks. Each hyperlink in the first plurality of hyperlinks identifies a category of litigation information. The interface also includes a plurality of web pages. Each web page is associated with one of the hyperlinks in the first plurality of hyperlinks. Each web page provides litigation information related to the category identified by the hyperlink associated with the web page. Each web page is displayed in response to selection of the hyperlink associated with the web page.

81 Claims, 66 Drawing Sheets

OTHER PUBLICATIONS

Internet Downloaded Document (Australasian Legal Information Institute's Roles, Electronic Law Journals-JILT 1997 (2), pp. 1-12).*

Kolker, Carlyn, Class Action on The Web, *The National Law Journal*, Dec. 17, 2001.

Plotkin, Robert, Electronic Court Filing: Past, Present, and Future, *Boston Bar Journal*, May/Jun. 2000.

Clare-Tagoe, Cynthia, US Federal Courts Offer Electronic Case Filing, *The Internet Law Journal*, Nov. 15, 1999 (http://www.tilj.com/content/litigationheadline11159901.htm).

United States District Court, Northern District of California, Electronic Case Filing Users Manual, Oct. 2001.

Court Technology Vendors Excerpt (http://www.ncsc.dnj.us/NCSC/VENDOR/Excerpts/ELECFIL3.htm).

A copy of PCT Search Report mailed Feb. 5, 2003 (6 pgs).

* cited by examiner

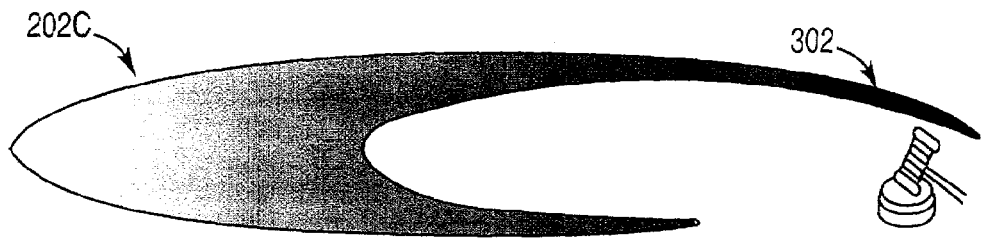

- 202C
- 302
- 304 → Status: Response to plaintiffs' Interrogatories DUE: January 2, 2001
- 306 → CONTACT INFORMATION
- 308A → Home
- 308B → Contact Information
- 308C → Docket
- 308D → Client Information
- 308E → Correspondence
- 308F → Pleading Index
- 308G → Rules
- 308H → Patents
- 308I → Discovery
- 308J → Expert
- 308K → Orders
- 308L → Trial Notebook
- 308M → Motions
- 308N → BCC List
- 308O → Search

IN THE UNITED STATES DISTRICT FOR THE _____ DISTRICT OF _____

[INSERT PLAINTIFF(S)],

Plaintiffs, v.

[INSERT DEFENDANT(S)],

Defendants.

Civil Action No. 00 XXXX

Judge John W. Doe
Magistrate Judge Doe

} 310

312

| | | Direct | Cell |
|---|---|---|---|
| M&G No.: | _____.1-US-ZA | | |
| Attorneys: | George W. Bush, Esq. | (555) 555-5555 | (555) 555-5555 |
| | Monica Lewinski | (555) 555-5555 | (555) 555-5555 |
| | Al Gore, Esq. | | |
| | Hillary Clinton | | |
| | Minnie Mouse, Paralegal | | |

Merchant & Gould P.C.
3200 IDS Center
80 South Eighth Street
Minneapolis, MN 55402

Phone: (555) 555-5555

Fig. 3B-1     TO FIG. 3B-2

FROM FIG. 3B-1

320 — 322 —

| Court | Judicial Assignment |
|---|---|
| U.S. District court for the Northern District of Illinois Eastern Division 219 South Dearborn Street Chicago, IL 60604<br><br>Main Phone: (555) 555-5555<br>Link to: OFFICE OF CLERK<br>Clerk of Court: Michael W. Jackson<br>Room 2044<br>Phone: (555) 555-5555<br>Fax: (555) 555-5555<br>Office Hours: 8:30 a.m. - 4:30 p.m.<br>Phone Inquiries: 8:15 a.m. - 5:00 p.m. | Judge John W. Doe<br>Secretary:   Kathryn E. Blanchetti<br>   Phone: (555) 555-5555<br>   Room 1204<br>Law Clerks:<br>   1) Luke Duke<br>   2) Catherine Bach<br>Court Reporter:<br>   Loni Anderson<br>   Phone: (555) 555-5555<br>   Room 1212<br><br>Judge Jane Doe<br>Judge Bio Information<br>Secretary: Liz Taylor<br>   Phone: (555) 555-5555<br>Courtroom : 2319<br>Motions: Tues - odd #'s 9:30 a.m.<br>         Thurs - Even #'s 9:30 a.m.<br>         Wed - Criminal 9:30 a.m.<br>Courtroom Deputy: Dr. Ruth<br>   Phone: (555) 555-5555<br>Court Reporter:<br>   Rosie O'Donnel<br>Phone: (555) 555-5555<br><br>o Judge Doe's Standing Pretrial Order for all civil cases<br>o Judge Doe's Trial Procedure<br>o Calender of Judges<br>o Quick Reference guide - includes directory of judges with dates they hear motions and their telephone numbers; and fees for transcript requests |

FROM FIG. 3B-2

324 —
- Common Case Forms
- General Information (including map to courthouse)
- Link to pacer

326

Plaintiffs

328

1) Plaintiffs Name
   [ Plaintiffs Address]
   [Plaintiff City, State, Zip]

Phone: (___)___-____
   Fax: (___)___-____
   Email:_____
   Website: www.your site here.com 2) Plaintiff No. 2 Name
   [Plaintiff Address]
   [Plaintiff City, State, Zip]

Phone: (___)___-____
   Fax: (___)___-____
   Email: (___)___-____
   Website: www.your site here.com MCI Corporate headquarters

Plaintiffs' Attorney
(Opposing Counsel)

Richard Gere, Esq.
*Attorney Bio
Harrison Ford, Esq.
* Attorney Bio
Plaintiffs' Counsel, Ltd.
244 Main Street, Suite 450
Hollywood, IL 60606

Phone: (555) 555-5555
Fax: (555) 555-5555

Web site: www.law-firm.com

332

330

Defendants - Our Clients

1) Client No. 1
   [ Client's Address]
   [ City, State, Zip]

Phone: (___)___-____
   Direct: (___)___-____
   Fax: (___)___-____
   Email:_____
   Website: www.your site here.com

Defendants' Attorney

George W. Bush, Esq, Atty ID No. xxxxx
Al Gore, Esq., Atty ID No. xxxxx
Merchant & Gould P.C.
3200 IDS Center
80 South 8th Street
Minneapolis, MN 55402

Phone: (555) 555-5555
Fax: (555) 555-5555
Firm Website: www.merchant-gould.com

Fig. 3B-3      TO FIG. 3B-4

FROM FIG. 3B-3

2) Client No. 2
   [ Client's Address]
   [ City, State, Zip]

Phone: (___)___-____
   Direct: (___)___-____
   Fax: (___)___-____
   Email:_____
   Website: www.your site here.com

334

(Our) Local Counsel

Alvin N. Chipmunk, Esq. Attorney ID No. 3125633
   *Attorney Bio
   Direct Phone: (555) 555-5555
Bruce Springstein, Esq.
   *Attorney Bio
   Direct Phone: (555) 555-5555
Local Counsel & Associates
500 West Main Street, 13 th Floor
Chicago, IL 60661-2511

Firm Phone: (555) 555-5555
Fax: (555) 555-5555
Firm Website: www.local-counsel.com Litigation Secretary: charlie brown @ Local-counsel.com
Direct Phone: (555) 555-5555

Top of page
Questions or problems regarding this web site should be directed to knewell@merchant-gould.com.
Copyright © 2000 Merchant & Gould P.C. All rights reserved.
Date last updated: December 21, 2000 10:46 AM

Fig. 3B-4

FROM FIG. 3C-1
↓

| Date | Action | Completed | Basis/Comments/Assigned to: |
|---|---|---|---|
| ~~10-09-XX~~<br>~~10-23-XX~~<br>10-30-XX | SERVE: Response to Plaintiffs' First Requests for the Production of Documents and Things (No. 1-99) | 10-30-XX | 2 week extension granted to counsel by other counsel on 10-04-XX;<br><br>Per conversation with other counsel granted one additional week extension to respond to discovery.<br>- New Due DUE DATE IS 10-30-XX |

356H

[MONTH, YEAR]

| ~~10-21-XX~~<br>~~11-04-XX~~<br>~~11-11-XX~~<br>11-29-XX | DUE: Response to ABC's First Set of Interrogatories and Docs and Things | Rec'd 11-30-XX via FedEx | Fax from counsel from other counsel re: conversation about document production (dated 11-29-XX)<br><br>Counsel granted extension to other counsel- NOW DUE 11-29-XX<br><br>2 week extension granted to plaintiff's by counsel on 10-04--04-XX<br><br>(per conversation and correspondence of counsel to other counsel) |

356I

| Date | Action | Completed | Basis/Comments/Assigned to: |
|---|---|---|---|

[MONTH, YEAR]

| | | | |

[MONTH, YEAR]

| | | | |

FROM FIG. 3C-2

| | | | | |
|---|---|---|---|---|
| 356J | 01-01-XX | Responses to Plaintiffs' First Set of Interrogatories to Defendants (Nos. 1-13) | | Plaintiffs' First Set of Interrogatories to Defendants served by mail on 11-28-XX. (+30 = 12-28-XX+3 for mailing= 12-31-XX (sunday and Mon 1-1-XX is New years) |
| | colspan=4 [MONTH,YEAR] | | | |
| | | | | |
| | colspan=4 [MONTH,YEAR] | | | |
| | | | | |
| | colspan=4 [MONTH,YEAR] | | | |
| | | | | |
| | colspan=4 [MONTH,YEAR] | | | |
| 356K | 05-21-XX | Parties shall serve rebuttal expert reports | | Agreed Scheduling order |
| | colspan=4 [MONTH,YEAR] | | | |
| 356L | 06-01-XX | All written discovery and depositions of fact witnesses shall be completed! | | Agreed Scheduling order |
| 356M | 06-01-XX | Parties shall file summary judgement or dispositive motions by June 1, 2001 with briefing to be completed by July 17, 2001 | | Agreed Scheduling order |
| | colspan=4 [MONTH,YEAR] | | | |
| 356N | 07-17-XX | Parties shall produce expert witnesses for deposition discovery | | Agreed Scheduling order |
| | colspan=4 [MONTH,YEAR] | | | |
| | | | | |
| | colspan=4 [MONTH,YEAR] | | | |
| | | | | |

Fig. 3C-3    TO FIG. 3C-4

FROM FIG. 3C-3

| [MONTH,YEAR] | | | |
|---|---|---|---|
| | | | |
| [MONTH,YEAR] | | | |
| | | | |
| [MONTH,YEAR] | | | |
| | | | |
| [MONTH,YEAR] | | | |
| | | | |

Questions or problems regarding this web site should be directed to knewell@merchant-gould.com.
Copyright © 2000 Merchant & Gould P.C. All rights reserved.
Date last updated: December 21, 2000 10:46 AM

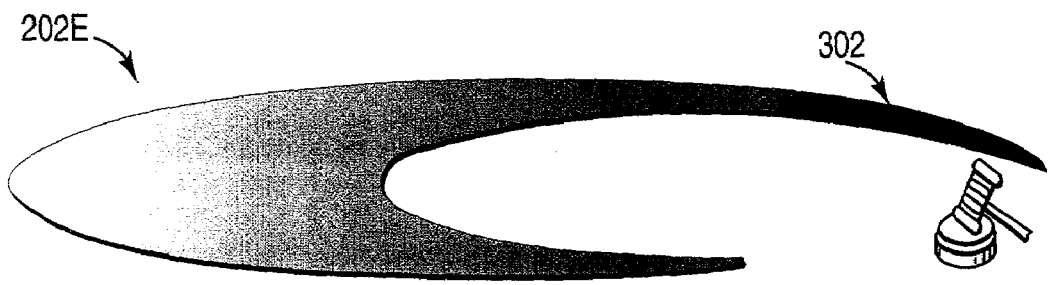

Status: Response to plaintiffs' Interrogatories DUE: January 2, 2001

CLIENT INFORMATION

- Home
- Contact Information
- Docket
- Client Information
- Correspondence
- Pleading Index
- Rules
- Patents
- Discovery
- Expert
- Orders
- Trial Notebook
- Motions
- BCC List
- Search

- Case Budget
- Client Agreement Letter
- Conflict Documentation

Questions or problems regarding this web site should be directed to knewell@merchant-gould.com.
Copyright©2000 Merchant & Gould P.C. All rights reserved.
Date last updated: February 16, 2000 10:29 PM

Fig. 3D

FROM FIG. 3F-1
↓

| | | | |
|---|---|---|---|
| 10 | Defendants' First Requests for the Product of Documents and things Certificate of service Affidavit of Delivery (proof of personal service of discovery documents) | 00-00-00 | Defendants |
| 11 | Minute Order re: status hearing schedule set for XX/XX/XX before Judge Doe at 9:30 a.m in Courtroom 1203 | 00-00-00 | Court |
| 12 | Minute Order re: Oral Motion For Leave To File Pro Hac Vice (granted) | 00-00-00 | Court |
| 13 | Notice of Filing of Agreed Scheduling Order | 00-00-00 | Court |
| 14 | Defendants' Response to Plaintiffs' First Request for the Production of Documents and things (Nos. 1-99) (w/certificate of service) | 00-00-00 | Defendants |
| 15 | Plaintiffs' First Set of Interrogatories to Defendants (Nos.1-13) (faxed copy) | 00-00-00 | Plaintiffs |
| 16 | Plaintiffs' Answers and Objections to Defendants First Set of Interrogatories to Plaintiff (unverified) | 00-00-00 | Plaintiffs |
| 17 | Plaintiffs' Response to Defendants' First Request for Production of Documents and Things | 00-00-00 | Plaintiffs |

Pleading Index #2 ←—406

Questions or problems regarding this web site should be directed to knewell@merchant-gould.com.
Copyright © 2000 Merchant & Gould P.C. All rights reserved.
Date last updated: December 20, 2000 08:20 PM

Fig. 3F-2

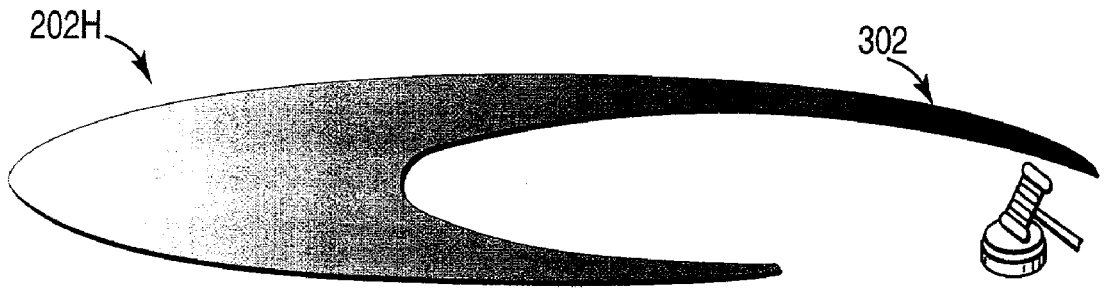

202H → 302

304 → Status: Response to plaintiffs' Interrogatories DUE: January 2, 2001
306 → RULES
308A → Home
308B → Contact Information
308C → Docket
308D → Client Information
308E → Correspondence
308F → Pleading Index
308G → Rules
308H → Patents
308I → Discovery
308J → Expert
308K → Orders
308L → Trial Notebook
308M → Motions
308N → BCC List
308O → Search Local Rules Fed. R. Civ. P Fed. R. Evid.      420

Patent Law

28 U.S.C.

U.S.C.

MPEP

USPTO

PACER

37 C.F.R.

TBMP

Questions or problems regarding this web site should be directed to knewell@merchant-gould.com.
Copyright © 2000 Merchant & Gould P.C. All rights reserved.
Date last updated: December 22, 2000 02:29 PM

Fig. 3G

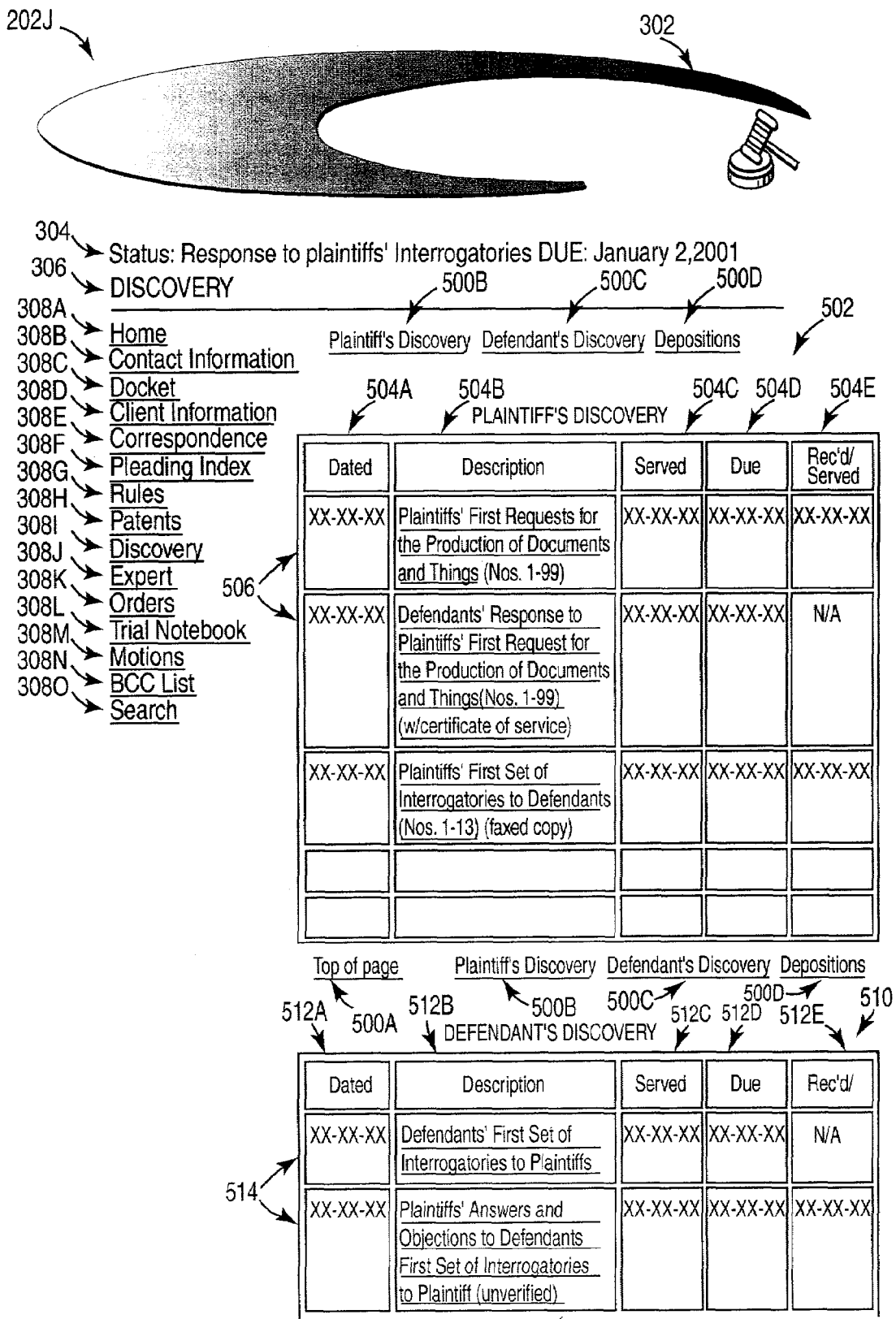
Fig. 3J-1 / TO FIG. 3J-2

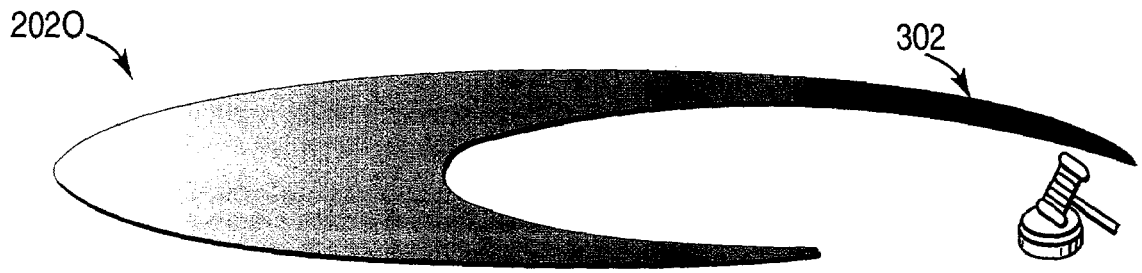
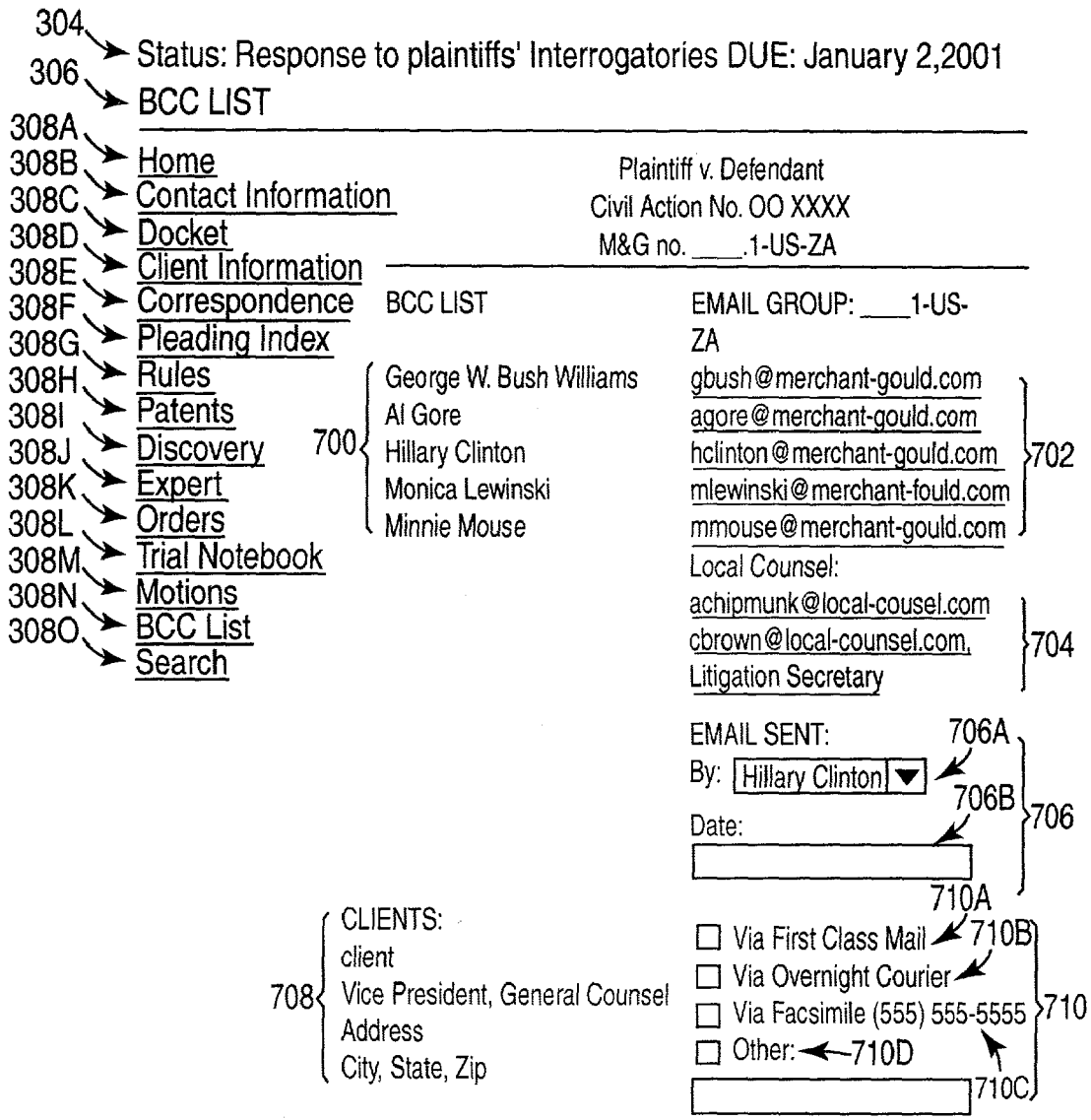
TO FIG. 3O-2
Fig. 3O-1

FROM FIG. 4A-1
↓

80 South Eighth Street
Minneapolis, MN 55402
Phone: 612.332.5300
Fax: 612.332.9081

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

Elumis™ is a trademark of Merchant & Gould P.C. | Patent Pending | Attorney Work Product |Attorney-Client Privileged |
All Questions or problems regarding this web site should be directed to knewell@merchant-gould.com. © 2000, 2001 Merchant & Gould P.C.
All rights reserved.
Last modified: Friday, December 07, 2001 02:16 PM.

Fig. 4A-2

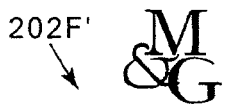
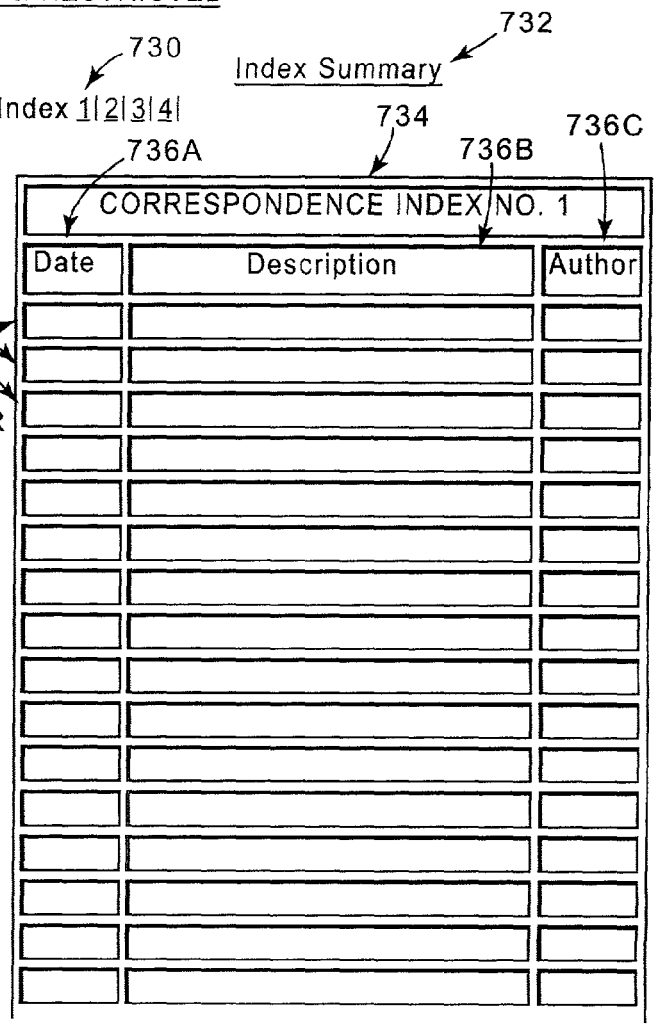

202F'

Merchant & Gould P.C.
3200 IDS Center
80 South Eighth Street
Minneapolis, MN 55402
Phone: 612.332.5300
306  Fax: 612.332.9081

M&G No.:
*

←302

Correspondence CONFIDENTIAL & RESTRICTED

Home ← 308A
Client Information ← 308D
Case Strategy ← 308P
Contact Information ← 308B
Docket ← 308C
Correspondence ← 308E
Pleading Index ← 308F
Initial Pleadings ← 308Q
Rules ← 308G
Patents/TM/© ← 308H
Discovery ← 308I
Index of Depositions ← 308R
Expert ← 308J
Orders ← 308K
Trial Notebook ← 308L
Motions ← 308M
Site Map ← 308S
Transcripts/Documents
Fact Chronology — 308T
Login Portal Page — 308U
Legal Research — 308V
Memoranda & Notes — 308W
308X

Merchant & Gould P.C.
3200 IDS Center
80 South Eighth Street
Minneapolis, MN 55402

Phone: 612.332.5300

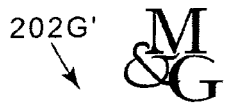
202G'

Merchant & Gould P.C.
3200 IDS Center
80 South Eighth Street
Minneapolis, MN 55402
Phone: 612.332.5300
306   Fax: 612.332.9081

M&G No.:
*

←—302

Pleading Index CONFIDENTIAL & RESTRICTED

Home ←———308A
Client Information ←—308D
Case Strategy ←—308P
Contact Information ←—308B
Docket ←———308C
Correspondence ←—308E
Pleading Index ←—308F
Initial Pleadings ←—308Q
Rules ←—308G
Patents/TM/© ←—308H
Discovery ←—308I
Index of Depositions ←—308R
Expert ←—308J
Orders ←—308K
Trial Notebook ←—308L
Motions ←—308M
Site Map ←—308S
Transcripts/Documents
Fact Chronology ←—308T
Login Portal Page ←—308U
Legal Research ←—308V
Memoranda & Notes ←—308W
308X

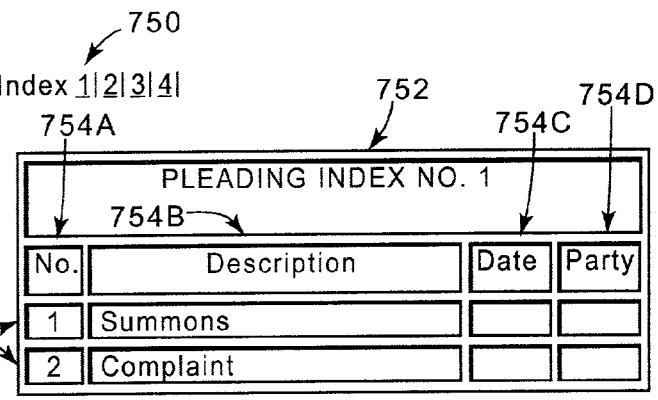

[Top of Page]
[ Home ] [ Contact Information ] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

308

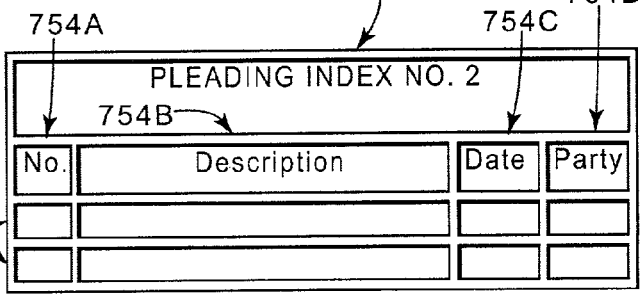

Merchant & Gould P.C.
3200 IDS Center
80 South Eighth Street
Minneapolis, MN 55402

Phone: 612.332.5300

FROM FIG. 4C-1

Fax: 612.332.9081

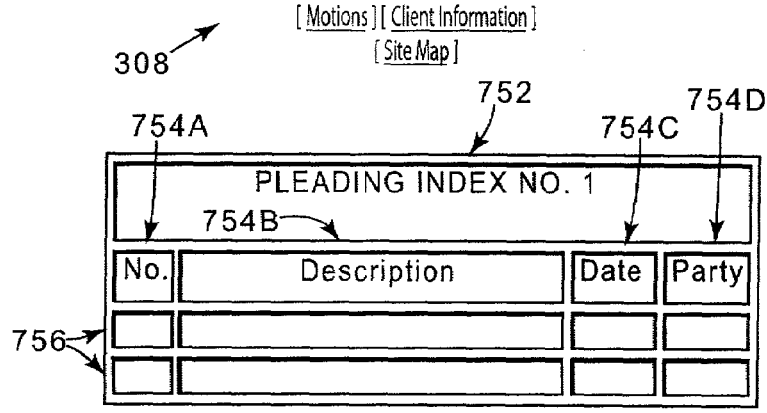

[Top of Page]
[ Home ] [ Contact Information] [ Docket ] [ Correspondence ] [ Pleading Index] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

---

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

---

Elumis™ is a trademark of Merchant & Gould P.C. | Patent Pending | Attorney Work Product |Attorney-Client Privileged |
All Questions or problems regarding this web site should be directed to [ ]. ©2000, 2001 Merchant & Gould P.C.
All rights reserved.
Last modified: Wednesday, August 15, 2001 08:06 PM.

Fig. 4C-2

202J'  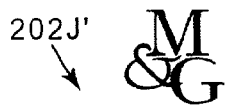

Merchant & Gould P.C.
3200 IDS Center
80 South Eighth Street
Minneapolis, MN 55402
Phone: 612.332.5300
306  Fax: 612.332.9081

M&G No.:
*

←—302

DiscoveryCONFIDENTIAL & RESTRICTED

Home ←———308A
Client Information ←—308D
Case Strategy ←—308P
Contact Information←—308B
Docket ←———308C
Correspondence ←—308E
Pleading Index ←—308F
Initial Pleadings ←—308Q
Rules ←—308G
Patents/TM/© ←—308H
Discovery ←—308I
Index of Depositions
Expert ←—308J   ↘308R
Orders ←—308K  ╱308L
Trial Notebook ↙
Motions ←—308M
Site Map ←—308S
Transcripts/Documents
Fact Chronology  308T
Login Portal Page  308U
Legal Research  308V
Memoranda & Notes  308W
             ↘308X

PLAINTIFFS' DISCOVERY

[Plaintiff's Discovery]  790

[Interrogatories]

[Request for Production of Docs]

[Request for Admissions]

[Plaintiff's Deposition Log]

[Plaintiff's Disclosures]

DEFENDANTS' DISCOVERY  792

[Defendant's Discovery]

[Interrogatories]

[Request for Production of Documents]

[Request for Admissions]

[Defendant's Deposition Log]

[Defendant's Disclosures]

[Privilege Logs]

[Depositions]  ←—794

[Disclosures]

[Protective Orders]

Plaintiff's Discovery:  796

| Plaintiff's Interrogatories (w/Responses) [Back to Top] | | |
|---|---|---|
| Pleading Index No. | Description | Date |
|  |  |  |
|  |  |  |

798A  798B  798C

800

Merchant & Gould P.C.
3200 IDS Center
80 South Eighth Street
Minneapolis, MN 55402

Phone: 612.332.5300
Phone: 612.332.9081

FROM FIG. 4E-2

TO FIG. 4E-4

FROM FIG. 4E-4

862 → Privilege Logs

| 864A | PRIVILEGE LOGS<br>[Back to Top]<br>864B | 864C |
|---|---|---|
| Pleading Index No. | Description | Date |
| 866 | | |

[Top of Page]
[ Home ] [ Contact Information ] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
308 → [ Site Map ]

[Back to Top]

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

Elumis™ is a trademark of Merchant & Gould P.C. | Patent Pending | Attorney Work Product |Attorney-Client Privileged |
All Questions or problems regarding this web site should be directed to [ ]. ©2000, 2001 Merchant & Gould P.C.
All rights reserved.
Last modified: Friday, May 18, 2001 02:58 PM.

Fig. 4E-5

Elumis™
Litigation Management System

M&G *

Merchant & Gould P.C.
3200 IDS Center
80 South Eighth Street
Minneapolis, MN 55402
Phone: 612.332.5300
Fax: 612.332.9081

→ 302

202Z →

306 →

Index of Depositions CONFIDENTIAL & RESTRICTED

NOTE: Information contained on this page is updated upon completion of deposition.
For a list of upcoming scheduled depositions please check the Docket.

LIST OF DEPONENTS NOTICED BY: Plaintiff

INDEX OF DEPOSITIONS
M&G No.: * ___ v. ___ *

880 →

| 882A → Deponent (Last, First) | 882B → Date Deposition Noticed (mm-dd-yy) | 882C → Date/Time of Deposition (mm-dd-yy) | 882D → Location | Court Reporter (name/address/ phone number) | 882E 882F → Received Deposition Transcript? (Yes/No) (When?) | Errata Received? (Yes/No) (When?) | 882G → 882H → Exhibits (#) | 882I → Confidential (Y/N) | 882J → Status \|Started\|Pending\| \|Completed\| \|Objected\| \|Withdrawn\| |
|---|---|---|---|---|---|---|---|---|---|
|  |  |  |  |  |  | Date: |  |  |  |
|  |  |  |  |  |  | Date: |  |  |  |
|  |  |  |  |  |  | Date: |  |  |  |
|  |  |  |  |  |  | Date: |  |  |  |

Home —— 308A
Client Information —— 308D
Case Strategy —— 308P
Contact Information —— 308B
Docket —— 308C
Correspondence —— 308E
Pleading Index —— 308F
Initial Pleadings —— 308Q
Rules —— 308G
Patents/TM/© —— 308H
Discovery —— 308I
Index of Depositions —— 308R
Expert —— 308J
Orders —— 308K
Trial Notebook —— 308L
Motions —— 308M
Site Map —— 308S
Transcripts/Documents
Fact Chronology —— 308T
Login Portal Page —— 308U
Legal Research —— 308V
Memoranda & Notes —— 308W
308X

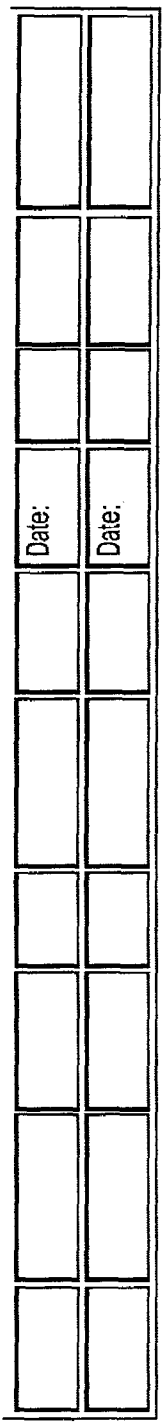

FROM FIG. 4F-2

[Top of Page]
[ Home ] [ Contact Information] [ Docket ] [ Correspondence] [ Pleading Index] [ Initial Pleading ]
[ Rules ] [ Patents/®/©] [ Discovery ] [ Index of Depositions ] [ Experts ] [ Orders ] [ Trial Notebook ]
[ Motions ] [ Client Information ]
[ Site Map ]

308

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

Elumis™ is a trademark of Merchant & Gould P.C. | Patent Pending | Attorney Work Product [Attorney-Client Privileged | All Questions or problems regarding this web site should be directed to [ ]. ©2000, 2001 Merchant & Gould P.C. All rights reserved.
Last modified: Wednesday, August 15, 2001 08:06 PM.

Fig. 4F-3

202AA 

Merchant & Gould P.C.
3200 IDS Center
80 South Eighth Street
Minneapolis, MN 55402
Phone: 612.332.5300
306  Fax: 612.332.9081

M&G No.:
*

←302

Site Map CONFIDENTIAL & RESTRICTED

Home ←———308A
Client Information ←308D
Case Strategy ←——308P
Contact Information ←308B
Docket ←———308C
Correspondence ←—308E
Pleading Index ←—308F
Initial Pleadings ←—308Q
Rules ←—308G
Patents/TM/© ←—308H
Discovery ←—308I
Index of Depositions ←—308R
Expert ←—308J
Orders ←—308K  308L
Trial Notebook ←
Motions ←—308M
Site Map ←—308S
Transcripts/Documents
Fact Chronology  308T
Login Portal Page ←308U
Legal Research ←308V
Memoranda & Notes  308W

308X

The following is a hierarchical listing of all the pages in this web that can be reached by following links from the top-level file "index.htm". Page titles are displayed if they exist, otherwise the entries are file names. Unreachable files are shown at the bottom of the list.

- Contact Information
- Docket
- Correspondence
- Pleading Index          _900
- Initial Pleadings
- Rules
- Patents/™/©
- Discovery
- Index of Depositions
- Experts
- Orders
- Trial Notebook
    Trial Briefs
    Motions in Limine
    Jury Instructions
    Witness List
    Exhibit List
    Deposition Designation of Testimony
    Offers of Settlement
    Special Verdict Forms
    Voir Dire Questions
- Motions
- Client Information
- Site Map Merchant & Gould P.C.
3200 IDS Center
80 South Eighth Street
Minneapolis, MN 55402

Phone: 612.332.5300
Fax: 612.332.9081

 Click here to download Acrobat Reader.FREE!

FROM FIG. 4G-1
↓

Phone: 612.332.5300
Fax: 612.332.9081

---

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

---

Elumis™ is a trademark of Merchant & Gould P.C. | Patent Pending | Attorney Work Product | Attorney-Client Privileged |
All Questions or problems regarding this web site should be directed to [ ]. ©2000, 2001 Merchant & Gould P.C.
All rights reserved.
Last modified: Wednesday, August 15, 2001 08:07 PM.

Fig. 4G-2

202P

Merchant & Gould P.C.
3200 IDS Center
80 South Eighth Street
Minneapolis, MN 55402
Phone: 612.332.5300
306    Fax: 612.332.9081

M&G No.:
*

—302

Trial Briefs <u>CONFIDENTIAL & RESTRICTED</u>

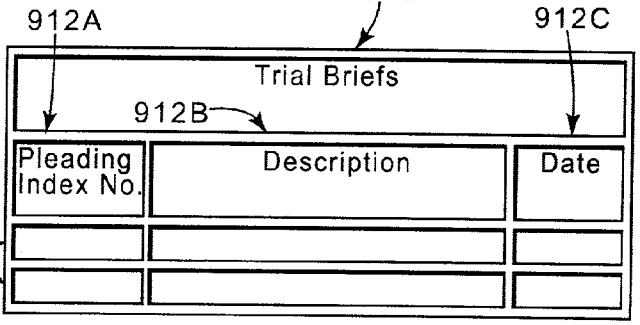

<u>Home</u> ← 308A
<u>Client Information</u> ← 308D
<u>Case Strategy</u> ← 308P
<u>Contact Information</u> ← 308B
<u>Docket</u> ← 308C
<u>Correspondence</u> ← 308E
<u>Pleading Index</u> ← 308F
<u>Initial Pleadings</u> ← 308Q
<u>Rules</u> ← 308G
<u>Patents/TM/©</u> ← 308H
<u>Discovery</u> ← 308I
<u>Index of Depositions</u> ← 308R
<u>Expert</u> ← 308J
<u>Orders</u> ← 308K
<u>Trial Notebook</u> ← 308L
<u>Motions</u> ← 308M
<u>Site Map</u> ← 308S
<u>Transcripts/Documents</u>
<u>Fact Chronology</u> — 308T
<u>Login Portal Page</u> — 308U
<u>Legal Research</u> — 308V
<u>Memoranda & Notes</u> — 308W

308X

[Top of Page]
[ <u>Home</u> ] [ <u>Contact Information</u> ] [ <u>Docket</u> ] [ <u>Correspondence</u> ] [ <u>Pleading Index</u> ] [ <u>Initial Pleading</u> ]
[ <u>Rules</u> ] [ <u>Patents/®/©</u> ] [ <u>Discovery</u> ] [ <u>Index of Depositions</u> ] [ <u>Experts</u> ] [ <u>Orders</u> ] [ <u>Trial Notebook</u> ]
[ <u>Motions</u> ] [ <u>Client Information</u> ]
[ <u>Site Map</u> ]

308

Merchant & Gould P.C.
3200 IDS Center
80 South Eighth Street
Minneapolis, MN 55402

Phone: 612.332.5300

FROM FIG. 4H-1

Fax: 612.332.9081

---

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

---

Elumis™ is a trademark of Merchant & Gould P.C. | Patent Pending | Attorney Work Product |Attorney-Client Privileged | All Questions or problems regarding this web site should be directed to [ ]. ©2000, 2001 Merchant & Gould P.C. All rights reserved.
Last modified: Friday, October 26, 2001 03:06 PM.

Fig. 4H-2

   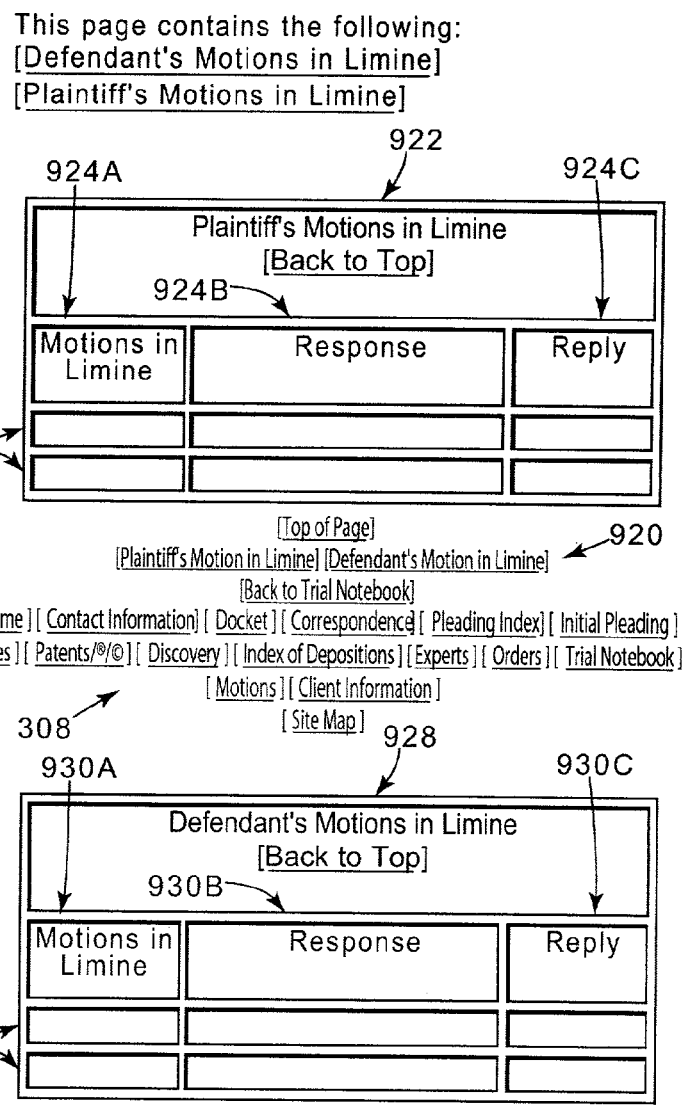
Fig. 4I-1

FROM FIG. 4I-1
↓

Fax: 612.332.9081

[Top of Page]
[Plaintiff's Motion in Limine] [Defendant's Motion in Limine] ← 920
[Back to Trial Notebook]
[ Home ] [ Contact Information] [ Docket ] [ Correspondence] [ Pleading Index] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
308
[ Site Map ]

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

Elumis™ is a trademark of Merchant & Gould P.C. | Patent Pending | Attorney Work Product |Attorney-Client Privileged |
All Questions or problems regarding this web site should be directed to [ ]. ©2000, 2001 Merchant & Gould P.C.
All rights reserved.
Last modified: Wednesday, August 15, 2001 08:07 PM.

Fig. 4I-2

202R

Merchant & Gould P.C.
3200 IDS Center
80 South Eighth Street
Minneapolis, MN 55402
Phone: 612.332.5300
Fax: 612.332.9081

306

M&G No.:
*

302

Jury Instructions CONFIDENTIAL & RESTRICTED

Home ← 308A
Client Information ← 308D
Case Strategy ← 308P
Contact Information ← 308B
Docket ← 308C
Correspondence ← 308E
Pleading Index ← 308F
Initial Pleadings ← 308Q
Rules ← 308G
Patents/TM/© ← 308H
Discovery ← 308I     308R
Index of Depositions ← 946
Expert ← 308J
Orders ← 308K   308L
Trial Notebook ←
Motions ← 308M
Site Map ← 308S
Transcripts/Documents
Fact Chronology   308T
Login Portal Page  308U
Legal Research   308V
Memoranda & Notes  308W
308X This page contains the following: 940
[Plaintiff's Jury Instructions]
[Defendant's Jury Instructions]

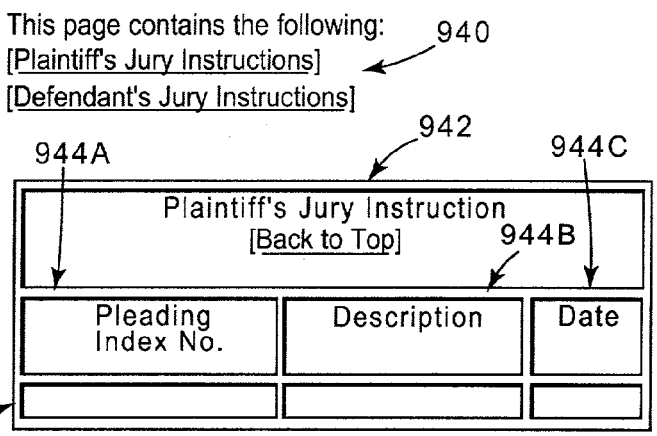

[Top of Page]
[Back to Trial Notebook]
[ Home ] [ Contact Information ] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

308

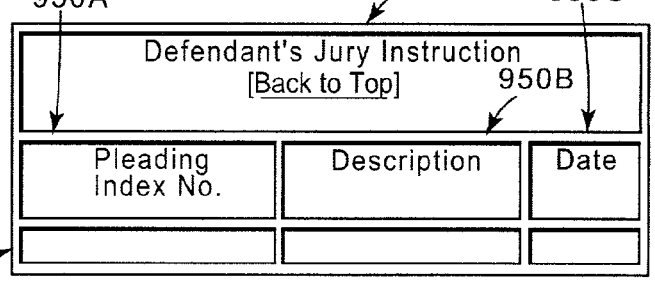

Merchant & Gould P.C.    952
3200 IDS Center
80 South Eighth Street
Minneapolis, MN 55402

Phone: 612.332.5300

FROM FIG. 4J-1

Fax: 612.332.9081

[Top of Page]
[Back to Trial Notebook]
[ Home ] [ Contact Information ] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

308 

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

Elumis™ is a trademark of Merchant & Gould P.C. | Patent Pending | Attorney Work Product |Attorney-Client Privileged |
All Questions or problems regarding this web site should be directed to [ ]. ©2000, 2001 Merchant & Gould P.C.
All rights reserved.
Last modified: Wednesday, August 15, 2001 08:07 PM.

Fig. 4J-2

202S

Merchant & Gould P.C.
3200 IDS Center
80 South Eighth Street
Minneapolis, MN 55402
Phone: 612.332.5300
306  Fax: 612.332.9081

M&G No.:
*
←302

Witness List CONFIDENTIAL & RESTRICTED

Home ←———308A
Client Information ←—308D
Case Strategy ←——308P
Contact Information ←—308B
Docket ←———308C
Correspondence ←—308E
Pleading Index ←—308F
Initial Pleadings ←—308Q
Rules ←—308G
Patents/TM/© ←—308H
Discovery ←—308I      308R
Index of Depositions ←
Expert ←—308J
Orders ←—308K    308L
Trial Notebook ←
Motions ←—308M
Site Map ←—308S
Transcripts/Documents ←
Fact Chronology    308T
Login Portal Page   308U
Legal Research   308V
Memoranda & Notes  308W
                308X

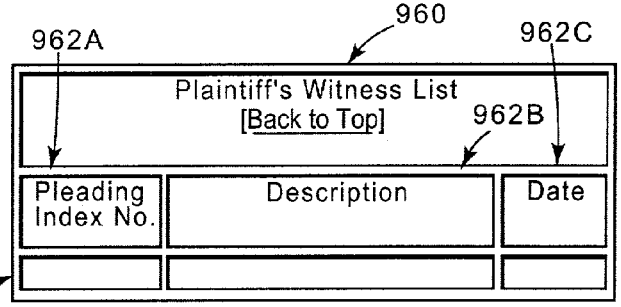

[Top of Page]
[Back to Trial Notebook]
[ Home ] [ Contact Information] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

308

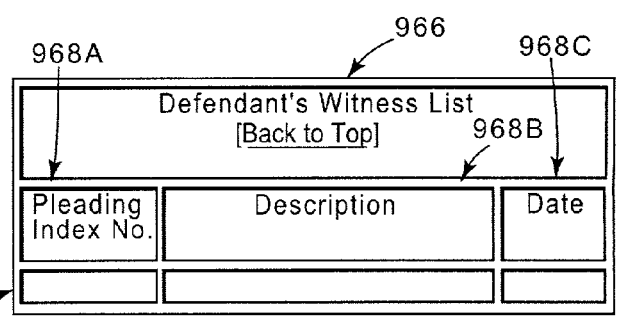

Merchant & Gould P.C.
3200 IDS Center
80 South Eighth Street
Minneapolis, MN 55402

Phone: 612.332.5300

FROM FIG. 4K-1
↓

Fax: 612.332.9081

[Top of Page]
[Back to Trial Notebook]
[ Home ] [ Contact Information ] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

308

---

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

---

Elumis™ is a trademark of Merchant & Gould P.C. | Patent Pending | Attorney Work Product |Attorney-Client Privileged |
All Questions or problems regarding this web site should be directed to [ ]. ©2000, 2001 Merchant & Gould P.C.
All rights reserved.
Last modified: Wednesday, August 15, 2001 08:07 PM.

Fig. 4K-2

202T 

Merchant & Gould P.C.
3200 IDS Center
80 South Eighth Street
Minneapolis, MN 55402
Phone: 612.332.5300
306  Fax:  612.332.9081

M&G No.:
*

⟵302

Exhibit List CONFIDENTIAL & RESTRICTED

Home ⟵ 308A
Client Information ⟵ 308D
Case Strategy ⟵ 308P
Contact Information ⟵ 308B
Docket ⟵ 308C
Correspondence ⟵ 308E
Pleading Index ⟵ 308F
Initial Pleadings ⟵ 308Q
Rules ⟵ 308G
Patents/TM/© ⟵ 308H
Discovery ⟵ 308I      308R
Index of Depositions ⟵
Expert ⟵ 308J
Orders ⟵ 308K     308L
Trial Notebook ⟵
Motions ⟵ 308M
Site Map ⟵ 308S
Transcripts/Documents
Fact Chronology        308T
Login Portal Page ⟵ 308U
Legal Research ⟵ 308V
Memoranda & Notes ⟵ 308W
                         308X

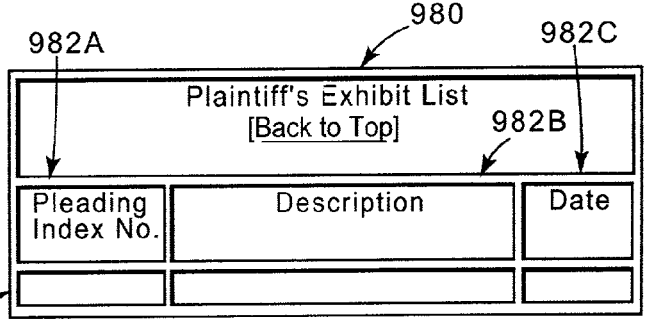

[Top of Page]
[Back to Trial Notebook]
[ Home ] [ Contact Information ] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

308

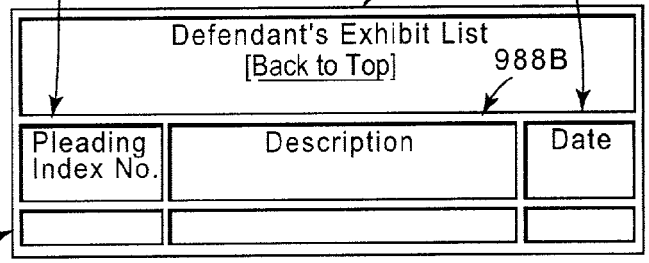

M&G

Merchant & Gould P.C.
3200 IDS Center
80 South Eighth Street
Minneapolis, MN 55402

Phone: 612.332.5300

FROM FIG. 4L-1

Fax: 612.332.9081

[Top of Page]
[Back to Trial Notebook]
[ Home ] [ Contact Information] [ Docket ] [ Correspondence] [ Pleading Index] [ Initial Pleading ]
[ Rules ] [ Patents/®/©] [ Discovery ] [ Index of Depositions ] [ Experts ] [ Orders ] [ Trial Notebook ]
[ Motions ] [ Client Information ]
[ Site Map ]

308

---

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

---

Elumis™ is a trademark of Merchant & Gould P.C. | Patent Pending | Attorney Work Product |Attorney-Client Privileged |
All Questions or problems regarding this web site should be directed to [ ]. ©2000, 2001 Merchant & Gould P.C.
All rights reserved.
Last modified: Wednesday, August 15, 2001 08:07 PM.

Fig. 4L-2

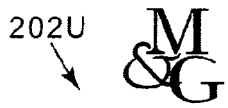

202U

Merchant & Gould P.C.
3200 IDS Center
80 South Eighth Street
Minneapolis, MN 55402
Phone: 612.332.5300
306  Fax: 612.332.9081

M&G No.:
*

302

Deposition Designation of Testimony CONFIDENTIAL & RESTRICTED

Home ←———308A
Client Information ←—308D
Case Strategy ←——308P
Contact Information ←——308B
Docket ←———308C
Correspondence←—308E
Pleading Index←—308F
Initial Pleadings ←—308Q
Rules ←—308G
Patents/TM/© ←—308H
Discovery ←—308I     308R
Index of Depositions ←
Expert ←—308J       1004
Orders ←—308K  308L
Trial Notebook ←
Motions ←—308M
Site Map ←—308S
Transcripts/Documents
Fact Chronology      308T
Login Portal Page   308U
Legal Research   308V
Memoranda & Notes  308W
                    308X

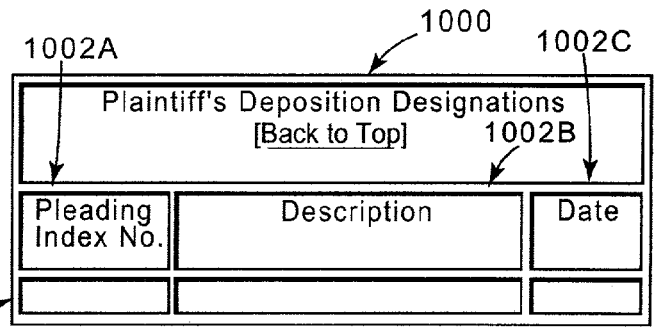

[Top of Page]
[Back to Trial Notebook]
[ Home ] [ Contact Information ] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

308

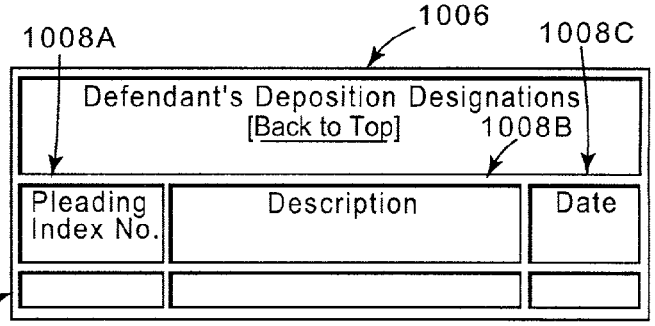

Merchant & Gould P.C.  1010
3200 IDS Center
80 South Eighth Street
Minneapolis, MN 55402

Phone: 612.332.5300

FROM FIG. 4M-1

Fax: 612.332.9081

[Top of Page]
[Back to Trial Notebook]
[ Home ] [ Contact Information ] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

308

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

Elumis™ is a trademark of Merchant & Gould P.C. | Patent Pending | Attorney Work Product |Attorney-Client Privileged |
All Questions or problems regarding this web site should be directed to [ ]. ©2000, 2001 Merchant & Gould P.C.
All rights reserved.
Last modified: Wednesday, August 15, 2001 08:07 PM.

Fig. 4M-2

202V

Merchant & Gould P.C.
3200 IDS Center
80 South Eighth Street
Minneapolis, MN 55402
Phone: 612.332.5300
Fax: 612.332.9081

306

M&G No.:
*

302

Offers of Settlement CONFIDENTIAL & RESTRICTED

Home ← 308A
Client Information ← 308D
Case Strategy ← 308P
Contact Information ← 308B
Docket ← 308C
Correspondence ← 308E
Pleading Index ← 308F
Initial Pleadings ← 308Q
Rules ← 308G
Patents/TM/© ← 308H
Discovery ← 308I
Index of Depositions ← 308R
Expert ← 308J
Orders ← 308K
Trial Notebook ← 308L
Motions ← 308M
Site Map ← 308S
Transcripts/Documents ← 308T
Fact Chronology ← 308U
Login Portal Page ← 308V
Legal Research ← 308W
Memoranda & Notes ← 308X

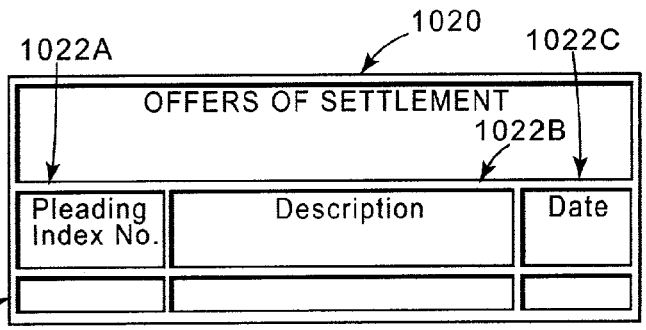

1024

[Top of Page]
[Back to Trial Notebook]
[ Home ] [ Contact Information ] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

308

Merchant & Gould P.C.
3200 IDS Center
80 South Eighth Street
Minneapolis, MN 55402

Phone: 612.332.5300

FROM FIG. 4N-1
↓

Fax: 612.332.9081

---

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

---

Elumis™ is a trademark of Merchant & Gould P.C. | Patent Pending | Attorney Work Product |Attorney-Client Privileged | All Questions or problems regarding this web site should be directed to [ ]. ©2000, 2001 Merchant & Gould P.C. All rights reserved.
Last modified: Wednesday, August 15, 2001 08:07 PM.

Fig. 4N-2

202W

Merchant & Gould P.C.
3200 IDS Center
80 South Eighth Street
Minneapolis, MN 55402
Phone: 612.332.5300
306   Fax: 612.332.9081

M&G No.:
*

←302

Special Verdict Forms <u>CONFIDENTIAL & RESTRICTED</u>

<u>Home</u> ←————308A
<u>Client Information</u> ←—308D
<u>Case Strategy</u> ←——308P
<u>Contact Information</u> ←—308B
<u>Docket</u> ←———308C
<u>Correspondence</u> ←—308E
<u>Pleading Index</u> ←—308F
<u>Initial Pleadings</u> ←—308Q
<u>Rules</u> ←—308G
<u>Patents/TM/©</u> ←—308H
<u>Discovery</u> ←—308I        308R
<u>Index of Depositions</u> ↙
<u>Expert</u> ←—308J        1034
<u>Orders</u> ←—308K   ⁄308L
<u>Trial Notebook</u>
<u>Motions</u> ←—308M
<u>Site Map</u> ←—308S
<u>Transcripts/Documents</u>
<u>Fact Chronology</u>    308T
<u>Login Portal Page</u> —308U
<u>Legal Research</u> ←—308V
<u>Memoranda & Notes</u> —308W
                        308X

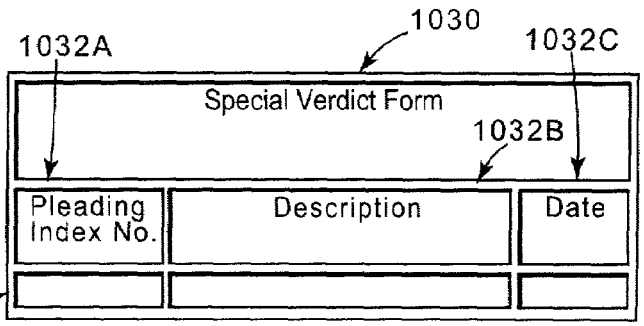

[Top of Page]
[Back to Trial Notebook]
[ Home ] [ Contact Information ] [ Docket ] [ Correspondence ] [ Pleading Index ] [ Initial Pleading ]
[ Rules ] [ Patents/®/© ] [ Discovery ] [ Index of Depositions ] [ Experts ] [ Orders ] [ Trial Notebook ]
[ Motions ] [ Client Information ]
[ Site Map ]

308

Merchant & Gould P.C.
3200 IDS Center
80 South Eighth Street
Minneapolis, MN 55402

Phone: 612.332.5300

FROM FIG. 40-1

Fax: 612.332.9081

---

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

---

Elumis™ is a trademark of Merchant & Gould P.C. | Patent Pending | Attorney Work Product |Attorney-Client Privileged | All Questions or problems regarding this web site should be directed to [ ]. ©2000, 2001 Merchant & Gould P.C. All rights reserved.
Last modified: Wednesday, August 15, 2001 08:07 PM.

Fig. 40-2

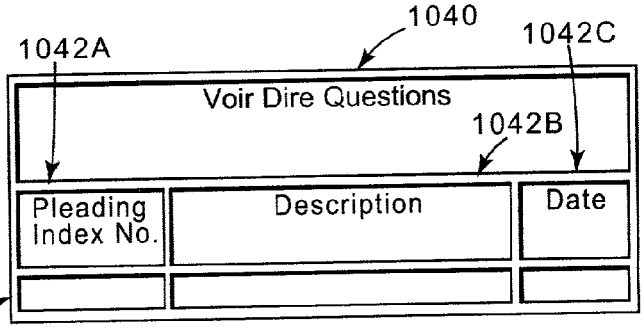
Fig. 4P-1

FROM FIG. 4P-1

Fax: 612.332.9081

---

This web page contains information that is confidential and/or legally privileged. Portions may be subject to a Protective Order. It is intended for use only by Merchant & Gould personnel and the specific Merchant & Gould client identified herein. If you have received this web page in error, please notify us by telephone immediately so that we can arrange for the return of the original and any copies to us.

---

Elumis™ is a trademark of Merchant & Gould P.C. | Patent Pending | Attorney Work Product |Attorney-Client Privileged |
All Questions or problems regarding this web site should be directed to [ ]. ©2000, 2001 Merchant & Gould P.C.
All rights reserved.
Last modified: Wednesday, August 15, 2001 08:07 PM.

Fig. 4P-2

202BB
Merchant & Gould P.C.
3200 IDS Center
80 South Eighth Street
Minneapolis, MN 55402
Phone: 612.332.5300
Fax: 612.332.9081
←302
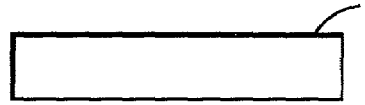
Enter Client Name
Enter Password
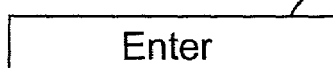
Enter
Fig. 5A

LITIGATION MANAGEMENT SYSTEM AND METHOD

CROSS REFERENCE TO RELATED APPLICATIONS

This Non-Provisional Utility Patent Application claims the benefit of filing date of U.S. Provisional Application Ser. No. 60/257,607, filed Dec. 22, 2000, entitled LITIGATION MANAGEMENT SYSTEM.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

THE FIELD OF THE INVENTION

The present invention relates to information management systems, and more particularly to a system and method for managing litigation information.

BACKGROUND OF THE INVENTION

Currently, it is common practice in the field of litigation to maintain litigation documents, such as pleadings and correspondence, in folders, books, binders, and other similar paper-based organizational tools. In large litigations, multiple binders are used to store each category of litigation documents, and it becomes difficult and time-consuming to locate particular documents. There are a few computer-based tools that assist in the organization and storage of litigation documents, such as "Blaze" from Summation Legal Technologies, Inc., and "ProLaw" from ProLaw Software, Inc. Computer-based tools such as these typically store litigation information in a database that must be queried by a user to obtain desired information. Queries may identify a date range, or a document description, or similar identification data, and often result in the return of multiple "hits". The returned hits occasionally identify the desired information, but often also identify a great deal of irrelevant information. A user must typically enter multiple queries and sort through irrelevant information before locating the desired information.

It would be desirable for a litigation management system to provide an easy-to-use interface that provides a logical relationship between litigation information, and allows a user to quickly locate and view desired litigation information.

SUMMARY OF THE INVENTION

One form of the present invention provides a computer-based user interface for accessing litigation information associated with at least one litigation case. A home page includes a first plurality of user-selectable hyperlinks. Each hyperlink in the first plurality of hyperlinks identifies a category of litigation information. The interface also includes a plurality of web pages. Each web page is associated with one of the hyperlinks in the first plurality of hyperlinks. Each web page provides litigation information related to the category identified by the hyperlink associated with the web page. Each web page is displayed in response to selection of the hyperlink associated with the web page.

In one embodiment, one of the categories identified by the hyperlinks is contact information, and the web page associated with the hyperlink for contact information includes contact information for opposing counsel, the court handling the litigation case, and clients.

In one embodiment, one of the categories identified by the hyperlinks is docket information, and the web page associated with the hyperlink for docket information includes a plurality of docket entries. Each docket entry includes a description of a litigation action and a due date for the action. The web page associated with the hyperlink for docket information includes hyperlinks to electronic copies of litigation documents associated with docket entries.

In one embodiment, one of the categories identified by the hyperlinks is correspondence information, and the web page associated with the hyperlink for correspondence information includes a plurality of correspondence entries. Each correspondence entry includes a description of a correspondence and a date of the correspondence. The web page associated with the hyperlink for correspondence information includes hyperlinks to electronic copies of correspondence.

In one embodiment, one of the categories identified by the hyperlinks is pleadings information, and the web page associated with the hyperlink for pleadings information includes a plurality of pleadings entries. Each pleadings entry including a description of a pleading. Each pleadings entry further includes a pleadings number, a date, and a source identifier identifying a source of the described pleading. The web page associated with the hyperlink for pleadings information includes hyperlinks to electronic copies of pleadings documents.

In one embodiment, one of the categories identified by the hyperlinks is rules information, and the web page associated with the hyperlink for rules information includes a plurality of hyperlinks to legal information sources relevant to the litigation case.

In one embodiment, one of the categories identified by the hyperlinks is patent information, and the web page associated with the hyperlink for patent information includes information regarding at least one patent involved in the litigation case. The web page associated with the hyperlink for patent information includes a hyperlink to an electronic copy of the at least one patent, and a hyperlink to an electronic copy of a file history of the at least one patent.

In one embodiment, one of the categories identified by the hyperlinks is discovery information, and the web page associated with the hyperlink for discovery information includes a plurality of discovery entries. Each discovery entry includes a description of a discovery document. The discovery entries further include a date of service and a due date. The web page associated with the hyperlink for discovery information includes hyperlinks to electronic copies of discovery documents. The discovery entries are grouped into subcategories including plaintiff's discovery, defendant's discovery, and depositions.

In one embodiment, one of the categories identified by the hyperlinks is expert information, and the web page associated with the hyperlink for expert information includes information regarding experts used in the litigation case. The web page associated with the hyperlink for expert information includes a plurality of hyperlinks to electronic copies of documents related to experts. The plurality of hyperlinks to electronic copies of documents related to experts includes hyperlinks to electronic copies of expert reports and expert depositions.

In one embodiment, one of the categories identified by the hyperlinks is court orders, and the web page associated with the hyperlink for court orders includes a plurality of court order entries. Each court order entry includes a description of a court order. The court order entries further include pleadings numbers and dates associated with the court orders. The web page associated with the hyperlink for court orders includes hyperlinks to electronic copies of court orders.

In one embodiment, one of the categories identified by the hyperlinks is trial information, and the web page associated with the hyperlink for trial information includes a plurality of hyperlinks to electronic copies of documents to be submitted to a court for trial. The plurality of hyperlinks to electronic copies of documents to be submitted to a court for trial include hyperlinks to electronic copies of trial briefs, motions in limine, jury instructions, witness lists, and exhibit lists. The plurality of hyperlinks to electronic copies of documents to be submitted to a court for trial further include hyperlinks to electronic copies of designations of deposition testimony and offers of settlement.

In one embodiment, one of the categories identified by the hyperlinks is motions, and the web page associated with the hyperlink for motions includes a plurality of descriptions of motions and a plurality of hyperlinks to electronic copies of described motions.

In one embodiment, one of the categories identified by the hyperlinks is copy information, and the web page associated with the hyperlink for copy information allows a user to specify a list of individuals that are provided a copy of a specified litigation document. The web page associated with the hyperlink for copy information allows a user to specify a manner in which the specified litigation document is provided to each of the individuals in the specified list.

In one embodiment, one of the categories identified by the hyperlinks is client information, and the web page associated with the hyperlink for client information provides access to case budget information, conflict information and/or case objective information. The web page associated with the hyperlink for client information includes a plurality of hyperlinks to client information.

In one embodiment, the user interface includes a search feature that allows a user to specify a search for litigation information related to the litigation case.

In one embodiment, the home page includes a status information identifier that identifies at least one litigation task that is due by a specified date. In one embodiment, the status information identifier is included on each of the plurality of web pages.

In one embodiment, each of the plurality of web pages includes the first plurality of user-selectable hyperlinks.

In one embodiment, at least one of the plurality of web pages includes hyperlinks to electronic copies of litigation documents. The electronic copies of litigation documents include electronic copies of correspondence and pleadings. In one embodiment, the electronic copies of litigation documents are stored on a plurality of computers. In one embodiment, the plurality of computers include at least one local computer and at least one remote computer that is located offsite from the at least one local computer. In one embodiment, the at least one remote computer includes a first remote computer located offsite from the at least one local computer in a first location, and a second remote computer located offsite from the at least one local computer in a second location.

In one embodiment, the categories of litigation information identified by the first plurality of hyperlinks include at least one subcategory that is logically related to one of the other categories.

In one embodiment, the computer-based user interface is storable on a portable computer-readable medium. In one embodiment, the computer-based user interface further comprises electronic copies of litigation documents referenced by the plurality of web pages.

In one embodiment, the computer-based user interface is stored on a CD-ROM.

In one embodiment, the computer-based user interface is stored on a corporate intranet.

In one embodiment, the home page includes a user-selectable hyperlink for executing an application program. In one embodiment, the application program is a document management system. In one embodiment, the document management system is Summation Blaze.

One form of the present invention provides a litigation management system for managing and providing access to litigation information stored on a computer network. The system includes a server computer coupled to the computer network for storing user interface information. The user interface information includes a primary page having a plurality of links to a plurality of secondary pages. The primary page identifies a plurality of categories and subcategories of litigation information. Each subcategory is logically related to at least one of the categories. The secondary pages provide litigation information related to the identified categories and subcategories. A client computer coupled to the computer network displays a user interface based on user interface information received from the server computer. The client computer is configured to access the plurality of secondary pages via the user interface.

In one embodiment, one of the categories is pleadings information, and the subcategories include discovery information, court orders, and motions. The litigation information provided by the secondary pages related to the subcategories of discovery information, court orders, and motions is also provided by the secondary page related to the category of pleadings information.

In one embodiment, the plurality of categories and subcategories include at least a subset of the following: Contact information, docket information, case information, correspondence information, pleadings information, legal references information, discovery information, expert information, orders information, trial information, motions, and copy information.

In one embodiment, one of the plurality of categories is patent information.

In one embodiment, the primary page includes a status information identifier that identifies at least one litigation task that is due by a specified date. In one embodiment, the status information identifier is included on each of the plurality of secondary pages.

In one embodiment, each of the plurality of secondary pages includes at least a subset of the plurality of links.

In one embodiment, at least one of the plurality of secondary pages includes links to electronic copies of litigation documents. In one embodiment, the electronic copies of litigation documents are stored on a plurality of computers coupled to the computer network.

In one embodiment, the primary page includes a user-selectable hyperlink for executing an application program. In one embodiment, the application program is a document management system. In one embodiment, the document management system is Summation Blaze.

Another form of the present invention provides a method of managing litigation information for at least one lawsuit. The method includes storing litigation information for the lawsuit on a computer network. User interface data is stored on the computer network. A user interface is generated and displayed based on the stored user interface data. The user interface provides a plurality of links to the litigation information. Each of the plurality of links corresponds to one category of a plurality of categories of litigation information. At least one of the categories of litigation information is a subcategory of at least one of the other categories of litigation information. Selection data provided by a user is received. The selection data identifies a first link in the plurality of links. Litigation information related to the category corresponding to the first link is displayed.

In one embodiment, the plurality of categories of litigation information include at least a subset of the following: Contact information, docket information, case information, correspondence information, pleadings information, legal references information, discovery information, expert information, orders information, trial information, motions, and copy information.

In one embodiment, the displayed litigation information includes at least a subset of the plurality of links.

In one embodiment, the displayed litigation information includes links to electronic copies of litigation documents related to the category corresponding to the first link.

In one embodiment, the litigation information for the lawsuit is stored on a plurality of computers coupled to the computer network.

In one embodiment, the user interface data is stored on a server computer coupled to the computer network and is accessible to client computers via communication with the server computer.

In one embodiment, the user interface data is stored in a memory of at least one client computer coupled to the computer network.

In one embodiment, the user interface data is stored on a CD-ROM of the at least one client computer.

Another form of the present invention provides a computer-readable medium having computer-executable instructions for performing a method of accessing litigation information for at least one lawsuit. The method includes generating a primary display screen including a plurality of user-selectable litigation categories. The plurality of user-selectable litigation categories includes at least one user-selectable litigation subcategory that is logically related to at least one of the other litigation categories. Category selection information from a user identifying one of the user-selectable litigation categories is received. A secondary display screen including litigation information related to the identified litigation category is generated. The secondary display screen includes user-selectable links to electronic copies of litigation documents related to the identified litigation category.

In one embodiment, document selection information from a user identifying one of the user-selectable links to electronic copies of litigation documents is received. A display is generated of an electronic copy of a litigation document corresponding to the identified link.

In one embodiment, the plurality of user-selectable litigation categories includes pleadings information, and the at least one user-selectable litigation subcategory includes discovery information. The litigation information related to the discovery information subcategory is a subset of the litigation information related to the pleadings category.

In one embodiment, the plurality of user-selectable litigation categories includes pleadings information, and the at least one user-selectable litigation subcategory includes motions. The litigation information related to the motions subcategory is a subset of the litigation information related to the pleadings category.

In one embodiment, the plurality of user-selectable litigation categories includes pleadings information, and the at least one user-selectable litigation subcategory includes court orders. The litigation information related to the court orders subcategory is a subset of the litigation information related to the pleadings category.

Another form of the present invention provides a litigation management system for managing and providing access to litigation information stored on a computer network. At least one server computer coupled to the computer network stores user interface information. The user interface information includes a client login page; a plurality of litigation case selection pages, with each litigation case selection page including at least one hyperlink identifying at least one litigation case associated with a particular client; a plurality of litigation case home pages, with each litigation case home page associated with one of the identified litigation cases, and each litigation case home page including a first plurality of hyperlinks, wherein each hyperlink in the first plurality identifies a category of litigation information; and a plurality of web pages, with each web page being associated with one of the hyperlinks in the first plurality of hyperlinks of one of the home pages, and each web page providing case specific litigation information related to the category identified by the hyperlink associated with the web page. A client computer coupled to the computer network displays a user interface based on user interface information received from the server computer. The client computer is configured to access at least a subset of the plurality of web pages via the user interface.

In one embodiment, the user interface information further includes a plurality of topics pages. Each topics page is associated with a particular client and includes a plurality of hyperlinks identifying a plurality of topics. The plurality of hyperlinks identifying a plurality of topics includes a litigation hyperlink. Each litigation case selection page is associated with a litigation hyperlink on one of the plurality of topics pages.

In one embodiment, the litigation hyperlink is associated with active litigation cases, and the plurality of hyperlinks identifying a plurality of topics further includes an inactive litigation hyperlink associated with inactive litigation cases.

In one embodiment, the plurality of hyperlinks identifying a plurality of topics further comprises a competitors hyperlink that provides a link to information about a particular client's competitors.

In one embodiment, the plurality of hyperlinks identifying a plurality of topics further comprises a prosecution hyperlink that provides a link to information about a particular client's intellectual property applications.

Another form of the present invention provides a method of accessing litigation information associated with at least one litigation case. A home page including a first plurality of user-selectable hyperlinks is displayed. The hyperlinks in the first plurality identify a plurality of categories and subcategories of litigation information. Each subcategory is logically related to at least one of the categories. A first one of the plurality of hyperlinks is selected. A web page associated with the first one of the hyperlinks is displayed. The web page provides litigation information related to a category identified by the first one of the hyperlinks.

Another form of the present invention provides a user interface for accessing litigation information associated with at least one litigation case. The user interface includes a home page including a correspondence hyperlink and a pleadings hyperlink. A correspondence web page is associated with the correspondence hyperlink. The correspondence web page includes a plurality of correspondence entries. Each correspondence entry includes identifying information for a correspondence related to the at least one litigation case. A pleadings web page is associated with the pleadings hyperlink. The pleadings web page includes a plurality of pleading entries. Each pleading entry includes identifying information for a pleading related to the at least one litigation case.

In one embodiment, the correspondence web page includes hyperlinks to electronic copies of correspondence related to the at least one litigation case.

In one embodiment, the pleadings web page includes hyperlinks to electronic copies of pleading documents.

BRIEF DESCRIPTION OF THE DRAWINGS

FIGS. 3B-1 through 3B-4 are diagrams of one embodiment of a web page illustrating contact information for a litigation matter.

FIGS. 3C-1 through 3C-4 are diagrams of one embodiment of a web page illustrating docket/appointments/deadlines with links to documents that confirm the action and/or basis/comments.

FIG. 3D is a diagram of one embodiment of a web page illustrating case and client information.

FIGS. 3F-1 through 3F-2 are diagrams of one embodiment of a web page illustrating an index of pleadings served, filed, authored, received or otherwise generated by any party.

FIG. 3G is a diagram of one embodiment of a web page illustrating a list of references for legal information.

FIGS. 3J-1 through 3J-2 are diagrams of one embodiment of a web page illustrating an organizational discovery page.

FIGS. 3O-1 through 3O-2 are diagrams of one embodiment of a web page illustrating how the distribution of documents received and generated were effectuated.

FIGS. 4A-1 through 4A-2 are diagrams of a second embodiment of a home page illustrating typical litigation case caption information and contact information for attorneys handling a litigation matter, and additional hyperlinks.

FIGS. 4B-1 through 4B-3 are diagrams of a second embodiment of a web page illustrating an index of correspondence received and authored pertaining to a specified litigation matter.

FIGS. 4C-1 through 4C-2 are diagrams of a second embodiment of a web page illustrating an index of pleadings served, filed, authored, received or otherwise generated by any party.

FIGS. 4E-1 through 4E-5 are diagrams of a second embodiment of a web page illustrating an organizational discovery page.

FIGS. 4F-1 through 4F-3 are diagrams of one embodiment of a web page illustrating an index of completed depositions.

FIGS. 4G-1 through 4G-2 are diagrams of one embodiment of a web page illustrating a site map of web pages used in an embodiment of the present invention.

FIGS. 4H-1 through 4H-2 are diagrams of one embodiment of a web page illustrating an index of trial briefs.

FIGS. 4I-1 through 4I-2 are diagrams of one embodiment of a web page illustrating an index of motions in limine.

FIGS. 4J-1 through 4J-2 are diagrams of one embodiment of a web page illustrating an index of jury instructions.

FIGS. 4K-1 through 4K-2 are diagrams of one embodiment of a web page illustrating an index of witnesses.

FIGS. 4L-1 through 4AL-2 are diagrams of one embodiment of a web page illustrating an index of exhibits.

FIGS. 4M-1 through 4M-2 are diagrams of one embodiment of a web page illustrating an index of deposition designations of testimony.

FIGS. 4N-1 through 4N-2 are diagrams of one embodiment of a web page illustrating an index of offers of settlement.

FIGS. 4O-1 through 4O-2 are diagrams of one embodiment of a web page illustrating an index of special verdict forms.

FIGS. 4P-1 through 4P-2 are diagrams of one embodiment of a web page illustrating an index of Voir Dire questions.

FIG. 5A is a diagram of one embodiment of a client login web page.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One form of the present invention provides a system and method for the management of litigation documents and information. In one form of the invention, the term "litigation" as used herein means a contested legal matter with an adversary. One preferred embodiment provides a litigation management system for intellectual property litigation, which can include patent, copyright, trademark, and/or trade secret related litigation. In one embodiment described herein, the invention is a web-based litigation management system. The information for the system may be stored in many different kinds of formats and at many different locations, and can include electronic documents with electronic signatures. Information for the system may exist as an image file stored on a local server or optical disk, or reside as an HTML file on a remote server and be accessed by TCP/IP protocol or other communications protocol. Other file types are obviously possible, including multimedia. One form of the litigation management system of the present invention manages internal documents (e.g., documents stored within a law firm computer system), and external documents (e.g., documents stored on a computer system outside of the law firm), including scanned copies of signed, original documents, which may be stored locally, or at a remote location. In one embodiment, the litigation information is accessed through a secure Internet connection via a web-type user interface.

Figure 1A:
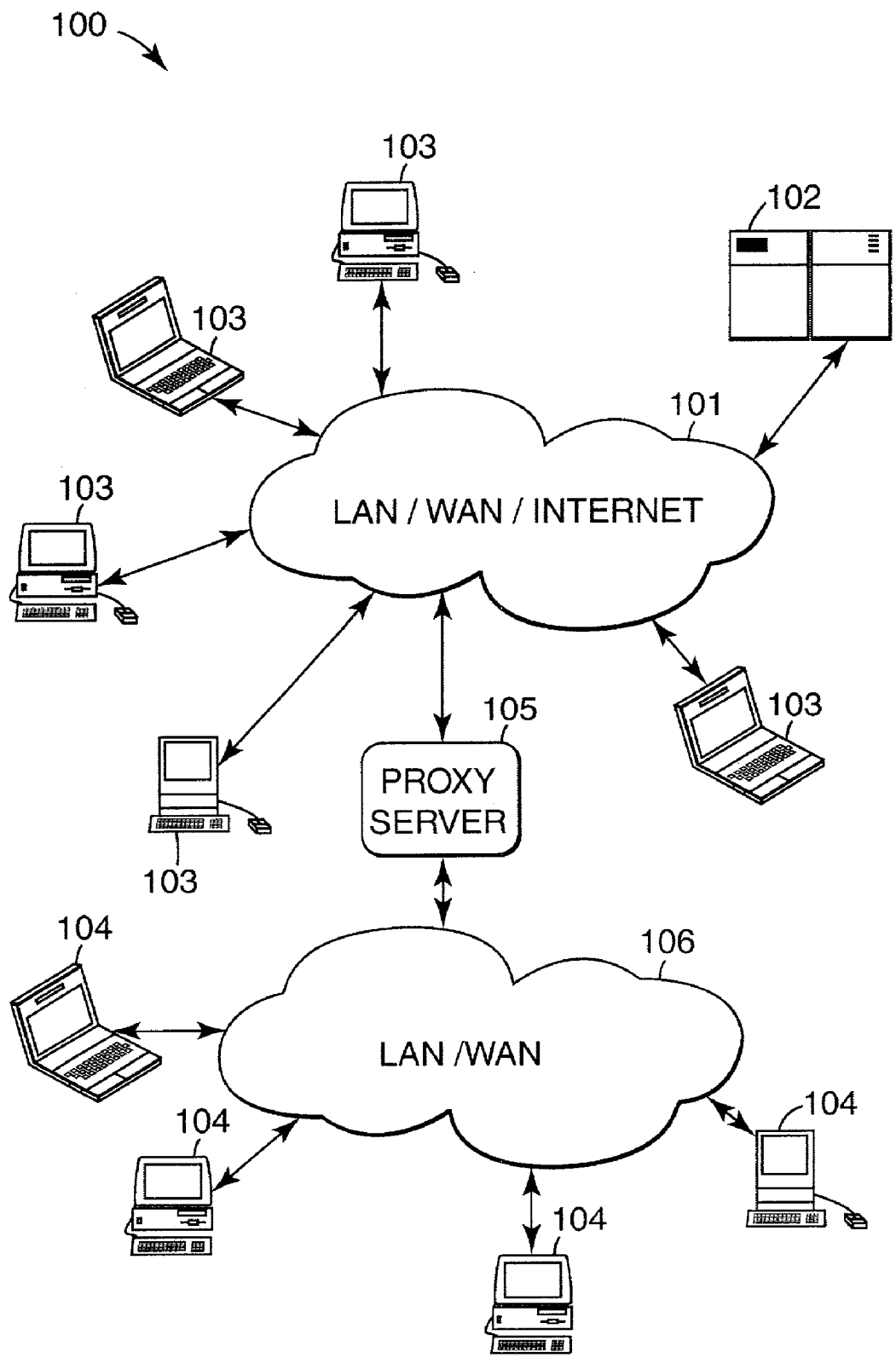
FIG. 1A is a diagram illustrating a distributed computing system for implementing one embodiment of the present invention.

FIG. 1A illustrates one possible organization for a distributed computing system for implementing an embodiment of the present invention. Distributed computing system 100 includes a plurality of computing systems connected together using communications networks 101 and 106. Distributed computing system 100 includes server computers 102, client computers 103 and 104, and proxy server 105. In one embodiment, client computers 103 and 104 include user workstations and laptop computers. Client computers 103 and 104 may also be any other type of device capable of communicating over a network, including a personal digital assistant (PDA). Client computers 103 are connected to communications network 101. Server computers 102 are also coupled to communications network 101. In one embodiment of the present invention, communications network 101 is a wide area network (WAN), such as the Internet, and client computers 103 connect to WAN 101 using a typical dial-up connection through an Internet service provider (ISP). Alternatively, communications network 101 can be a local area network (LAN).

Users may also connect to the communications system using client computers 104, which are connected to communications network 106. In one embodiment, communications network 106 is a LAN. Alternatively, communications network 106 can be a WAN. LAN 106 is connected to Internet 101 through a proxy server, such as proxy server 105. In this arrangement, client computers 104 access resources located on Internet 101 by sending a service request to proxy server 105. Proxy server 105 in turn forwards the service request to a destination on Internet 101. A response to the request is received by proxy server 105, which forwards the response to the requesting client computer 104.

Server computers 102 receive service requests from client computers 103 and 104, and generate appropriate responses. In one embodiment, the communications between server computers 102, and client computers 103 and 104, utilize the standard hypertext transport protocol (HTTP) communications protocol. The responses generated and returned to client computers 103 and 104 are typically in the form of a web page specified in hypertext markup language (HTML) that may be displayed to the user utilizing a web browser such as MICROSOFT INTERNET EXPLORER or NETSCAPE NAVIGATOR.

Server computers 102 store information such as database information or other electronic data. Data may be stored in a distributed manner across one or more of server computers 102. In one embodiment of the present invention, a web site is programmed to access litigation-related data stored in server computers 102. Client computers 103 and 104 include programs, such as browsers, that allow a user to access information stored on the web site and to navigate around the web. Generally, browsers employ a graphical user interface displayed on a monitor of a computer 103 or 104. A user of a computer 103 or 104 utilizes a mouse or other input device to interact with the graphical user interface, access servers 102, and perform data acquisition, data transmission, and navigation functions via the graphical user interface.

Figure 1B:
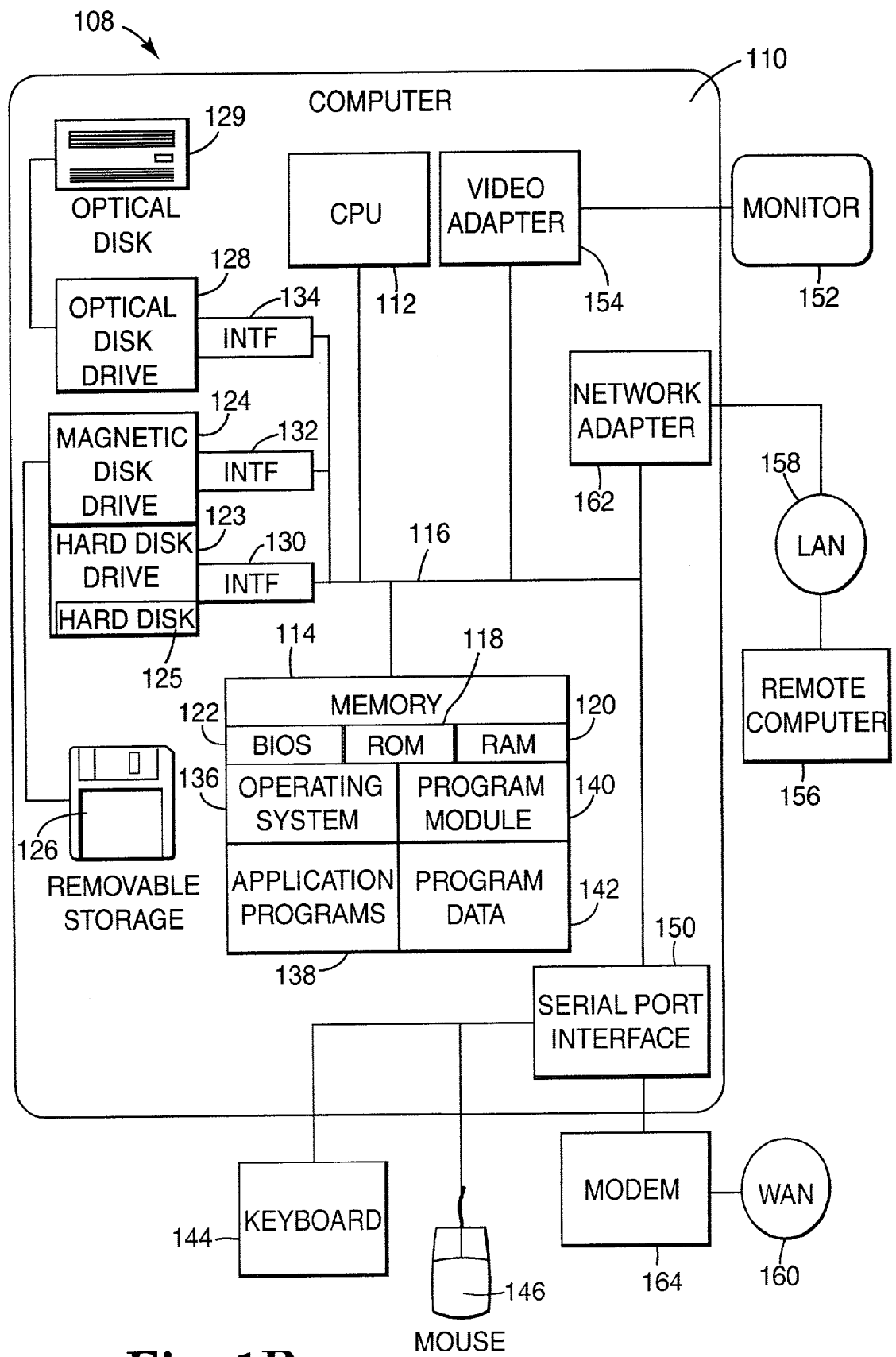
FIG. 1B is a block diagram illustrating an exemplary computing system according to one embodiment of the present invention.

FIG. 1B is an electrical block diagram of major components of an exemplary computing system 108 according to one embodiment of the present invention. In one embodiment, computers 102, 103, 104, and 105 are represented by exemplary computing system 108. In one form of the present invention, computing system 108 includes a general-purpose computing device 110 in the form of a conventional computer system. Computing device 110 includes a processor unit 112, a system memory 114, and a system bus 116 that couples various system components including system memory 114 to processor unit 112. System bus 116 maybe any of several types of bus structures including a memory bus or memory controller, a peripheral bus and a local bus using any of a variety of bus architectures. System memory 114 includes read only memory (ROM) 118 and random access memory (RAM) 120. A basic input/output system (BIOS) 122, which contains basic routines that help transfer information between elements within computing system 108, is also stored in memory 114.

Computing device 110 further includes a hard disk drive 123 for reading from and writing to a hard disk 125, a magnetic disk drive 124 for reading from or writing to a removable magnetic disk 126, and an optical disk drive 128 for reading from or writing to a removable optical disk 129, such as a CD ROM, digital versatile disk (DVD), or other optical media. Hard disk drive 123, magnetic disk drive 124, and optical disk drive 128 are connected to system bus 116 by a hard disk drive interface 130, a magnetic disk drive interface 132, and an optical drive interface 134, respectively. Drives 123, 124 and 128 and their associated computer-readable media provide nonvolatile storage of computer readable instructions, data structures, programs, and other data for computer system 108.

Although the exemplary computer system 108 described herein employs a hard disk 125, a removable magnetic disk 126, and a removable optical disk 129, other types of computer-readable media capable of storing data can be used in the exemplary system 108. Examples of other types of computer-readable mediums that can be used in the exemplary operating environment 108 include magnetic cassettes, flash memory cards, digital video disks, Bernoulli cartridges, random access memories (RAMs), and read only memories (ROMs).

A number of program modules may be stored on hard disk 125, magnetic disk 126, optical disk 129, ROM 118 and RAM 120, including an operating system 136, one or more application programs 138, other program modules 140, and program data 142. A user may enter commands and information into computer system 108 through input devices, such as a keyboard 144 and mouse 146 or other pointing device. Examples of other input devices include a microphone, joystick, game pad, satellite dish, and scanner. These and other input devices are often connected to the processing unit 112 through a serial port interface 150 that is coupled to system bus 116. Nevertheless, these input devices may also be connected by other interfaces, such as a parallel port, game port, or a universal serial bus (USB). A monitor 152 or other type of display device is also connected to system bus 116 via an interface, such as a video adapter 154. In addition to monitor 152, computer systems typically include other peripheral output devices (not shown), such as speakers and printers.

Computer system 108 operates in a networked environment using logical connections to one or more remote computers, such as remote computer 156. Remote computer 156 may be a computer system, a server, a router, a network PC, a peer device or other common network node, and typically includes many or all of the elements described above relative to computer system 108. The network connections include a LAN 158 and a WAN 160. Such networking environments are commonplace in offices, enterprise-wide computer networks, intranets, and the Internet.

When used in a LAN networking environment, computer system 108 is connected to LAN 158 through a network interface or adapter 162. When used in a WAN networking environment, computer system 108 typically includes a modem 164 or other means for establishing communications over a WAN 160, such as the Internet. Modem 164, which may be internal or external to computing device 110, is connected to system bus 116 via serial port interface 150. In a networked environment, program modules depicted relative to computer system 108, or portions thereof, may be stored in a remote memory storage device. It will be appreciated that the network connections shown are exemplary, and other means of establishing a communications link between computers may be used, including wireless technologies.

A computing device, such as computer system 102, 103, 104, or 105, typically includes at least some form of computer-readable media. Computer readable media can be any available media that can be accessed by a computer system 102, 103, 104, or 105. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, DVD, or other optical storage, magnetic cassettes, magnetic tape, magnetic disk storage or other magnetic storage devices, or any other medium that can be used to store the desired information and that can be accessed by a computer system 102, 103, 104, or 105.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media. Computer-readable media may also be referred to as computer program product.

Figure 2:
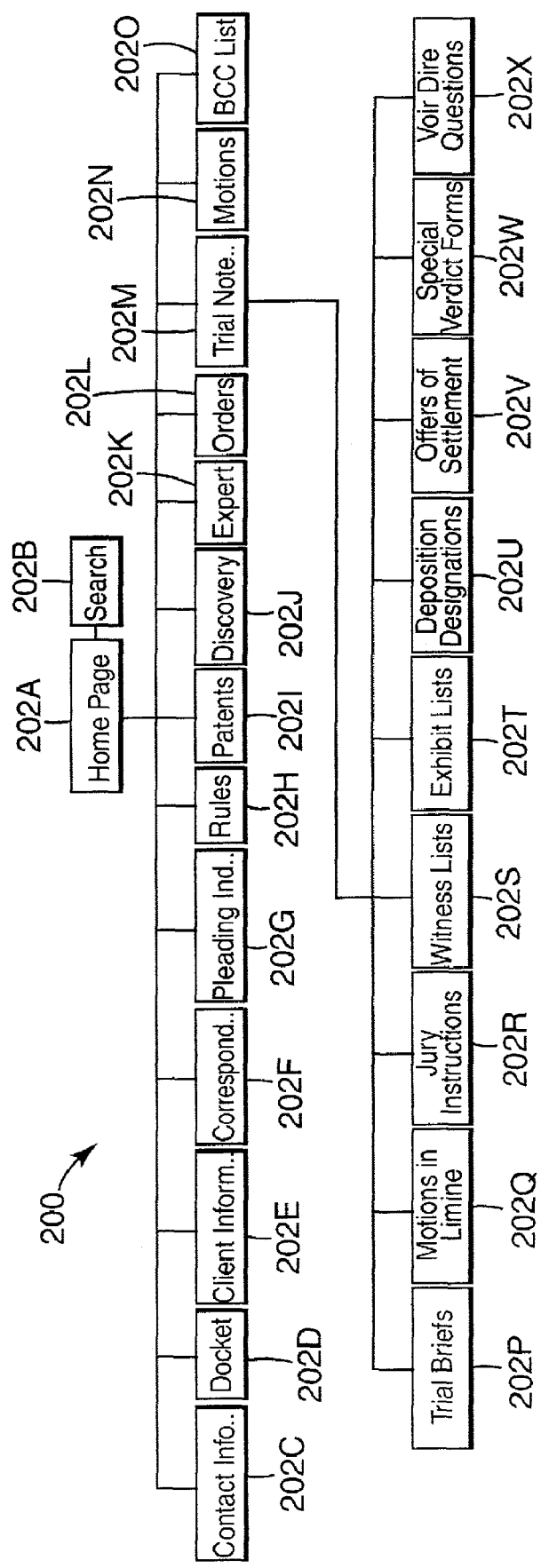
FIG. 2 is a block diagram illustrating a logical relationship between web pages used in one embodiment of the present invention.

FIG. 2 is a block diagram of a web site illustrating a logical relationship between web pages used in one embodiment of the present invention. Web site 200 includes web pages 202A–202X (collectively referred to as web pages 202). Web pages 202 include home page 202A, search web page 202B, contact information web page 202C, docket web page 202D, client information web page 202E, correspondence web page 202F, pleadings index web page 202G, rules web page 202H, patents web page 202I, discovery web page 202J, experts web page 202K, orders web page 202L, trial notebook web page 202M, motions web page 202N, BCC list web page 202O, trial briefs web page 202P, motions in limine web page 202Q, jury instructions web page 202R, witness lists web page 202S, exhibit lists web page 202T, deposition designations of testimony web page 202U, offers of settlement web page 202V, special verdict forms web page 202W, and Voir Dire questions web page 202X. Exemplary embodiments of several of web pages 202 are shown in FIGS. 3A–3O and 4A–4P. Web site 200 is also referred to as litigation management system 200.

Web pages 202C–202O are accessible via hyperlinks on home page 202A in one form of the present invention. In one embodiment, each of web pages 202C–202O corresponds to a particular category of litigation information, and provides hyperlinks to information within that category. For example, trial notebook web page 202M corresponds to a "trial information" category, and includes hyperlinks to web pages 202P–202X. Web pages 202P–202X provide trial information, such as trial briefs, trial motions, jury instructions, witness lists, exhibit lists, depositions and offers of settlement. In one embodiment, web pages 202P–202X include links to PDF files that are generated by scanning trial documents. Like web page 202M, each of web pages 202C–202L and 202N–202O also include hyperlinks to additional web pages (not shown) in one form of the present invention. In one embodiment, each of web pages 202C–202O includes hyperlinks to each of the other web pages 202C–202O on the same organizational level in FIG. 2. As will be understood by one of ordinary skill in the art, each of web pages 202 may include hyperlinks to any other of web pages 202.

Information for web pages 202 may be specified in a variety of formats or combinations of formats, including but not limited to HTML, PDF, TIFF and JPG. Web pages 202 provide a user interface that allows a user to quickly and efficiently locate and view information related to a specified litigation. Web pages 202 are also referred to as user interface 202. In addition to providing hyperlinks to other web pages 202, any of web pages 202 may also include "short cuts" or "jump links" that initiate the execution of program steps to perform tasks other than the retrieval of documents. For example, user interface 202 may initiate a search. The search could include text within the user interface or text generated through an optical character recognition (OCR) function on underlying data. Scanned documents, and text files generated by performing OCR on the scanned documents, may be stored and organized in one or more databases that are accessible through user interface 202. User interface 202 may also provide a portal to other databases and information repositories. User interface 202 may execute other application programs, such as Summation Blaze®, or a graphics program that illustrates the relationship of multiple patents in a flow chart or other organizational chart with hyperlinks to the documents referenced. Other application programs may also be executed through user interface 202.

In one form of the present invention, litigation management system 200 employs security features that permit restricted access to litigation data. For example, certain information in litigation management system 200 may be designated as being accessible only by attorneys or only by clients. Similarly, certain information may be designated as being modifiable only by certain individuals (e.g., a client may be able to update a client page, while the attorneys cannot modify the client page, nor even access the client page if such access restrictions are desired). Litigation management system 200 may also initiate program code for performing steps relating to creating, revising, and updating the data accessed by the litigation management system 200. Data may be provided to litigation management system 200 by the user or retrieved from system 200 by the user. Various methods of creating the logical connections between the retrieval of data and the submission of data may be employed. Litigation management system 200 may initiate another application program, and distribute information via various communications protocols (e.g., SMTP or other email protocol, wireless application protocol or WAP, pager, etc.), or take other actions.

In one embodiment, web pages 202 are executed by a browser such as Internet Explorer that interfaces with an email client, such as Microsoft Outlook and Exchange, and a server. The browser executes HTML or XML code that accesses the information through a link. Typically, the link accesses data stored as an image, text, html, or other file. These files may include links to data as well. Web pages 202 include links to other web pages 202 and documents stored as PDF files. Links also initiate email communications to a group or individual and may generate a form or a word processing document. User interface 202 and the underlying litigation data may be embodied in a portable medium such as a CD-ROM or a DVD-ROM or resident on a server (e.g., a server that is part of a corporate intranet), or both. Storing user interface 202 and the underlying litigation data on a portable computer-readable medium allows the information to be transported, confidentially provided to clients, and/or used in a courtroom or during a deposition, where Internet access may not be available. Alternatively, user interface 202 and the underlying litigation data may be accessed remotely via the Internet or other communication method. Litigation management system 200 also includes a method of updating and distributing the information. Users may be notified of changes to the content or other events such as docket dates or reminders of docket dates. Events may be initiated by the users or the litigation management system 200 itself.

Figure 3A:
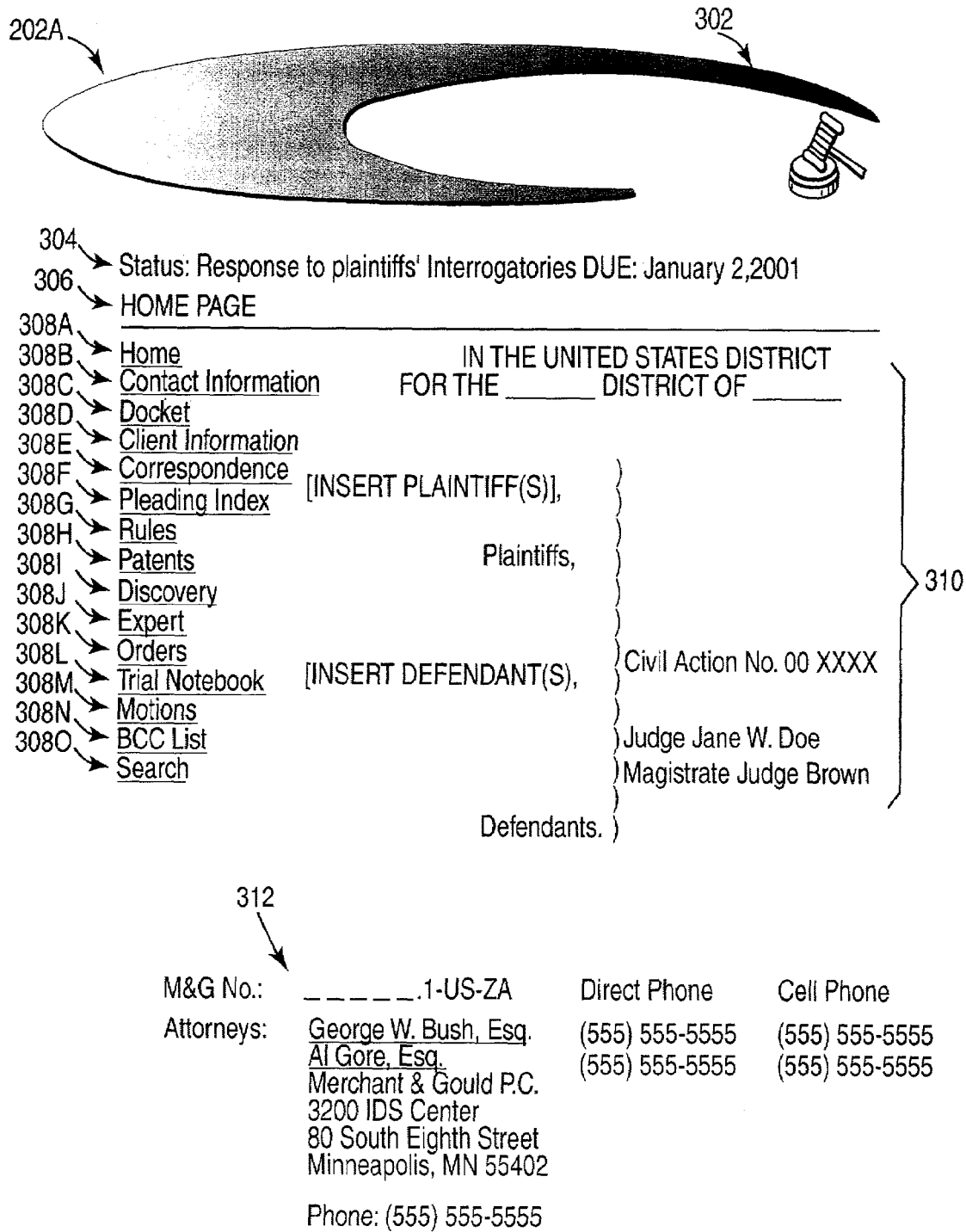
FIG. 3A is a diagram of one embodiment of a home page illustrating typical litigation case caption information and contact information for attorneys handling a litigation matter.

FIGS. 3A–3O are diagrams of exemplary web pages 202 that provide a user interface according to one embodiment of the present invention. The web pages illustrated in FIGS. 3A–3O were created using Microsoft® Frontpage®. Other methods of generating information pages for litigation management system 200 may be used. In FIGS. 3A–3O, underlined text indicates hyperlinks. The hyperlinks may go to a destination/page within the web site/page, to another "http:\\" location, an email message, to some other place on the network, or initiate some other action.

FIG. 3A is a diagram of an exemplary home page 202A illustrating typical litigation case caption information and contact information for attorneys handling a litigation matter. Home page 202A includes heading information 302, status information 304, page identifier 306, hyperlinks 308A–308O (collectively referred to as hyperlinks 308), case caption information 310, and attorney contact information 312.

In one embodiment, heading information 302 identifies the law firm handling the litigation and using litigation management system 200. In one embodiment, status information 304 is a marquee that scrolls across the top of each web page 202. Status information 304 identifies one or more litigation tasks that must be completed by a specified date. In the embodiment shown, status information 304 indicates that a Response to the Plaintiff's Interrogatories is due on Jan. 2, 2001. Status information 304 may be customized, and periodically updated to indicate current tasks to be completed for a litigation matter. Status information 304 may also provide other information regarding a litigation matter.

Page identifier 306 identifies the web page 202 currently being viewed by the user. In FIG. 3A, page identifier 306 indicates that the user is viewing "Home Page" 202A. Hyperlinks 308 allow a user to link to other web pages 202 within web site 200.

In one embodiment, case caption information 310 includes typical case information, including identification of the plaintiffs and the defendants, case number, and the judge or judges assigned to the case. In one embodiment, attorney contact information 312 includes information regarding the attorneys handling the case, including names, addresses, phone numbers, and facsimile numbers.

FIGS. 3B-1 through 3B-4 (collectively referred to as FIG. 3B) are diagrams of an exemplary contact information web page 202C illustrating contact information for a litigation matter. In one embodiment, contact information web page 202C is displayed in response to a user selecting link 308B from one of web pages 202A–202O. Page identifier 306 indicates that the user is viewing "Contact Information" web page 202C.

In one embodiment, contact information categories include, but are not limited to: Internal case information, court information, judicial assignment information, plaintiff(s) information, attorney for plaintiff(s) information, defendant(s) information, attorney for defendant(s) information, and local counsel information. In one embodiment, the above contact information categories include, but are not limited to, the following information: names, addresses, telephone numbers (firm, direct, cellular, other), facsimile numbers, email addresses, web site addresses, hyperlinks to biographical information on a website, room/suite numbers, and links to pages in other web sites that contain pertinent information.

In the embodiment shown in FIG. 3B, contact information web page 202C includes case caption information 310, attorney contact information 312, court information 320, judicial assignment information 322, judicial assignment links 324, plaintiff information 326, plaintiffs' attorneys information 328, defendant information 330, defendants' attorneys information 332, and local counsel information 334. Court information 320 includes the name and address of the court, phone and facsimile numbers at the court, hyperlinks to the office of clerk and the clerk of court, as well as other useful information. Judicial assignment information 322 includes information regarding the judges assigned to the case, including the names and phone numbers of secretaries, courtroom deputies, law clerks, and court reporters. One or more of the individuals listed in judicial assignment information 322 may have associated hyperlinks to other web pages that provide additional information about the individuals.

Judicial assignment information 322 also includes judicial assignment links 324. Judicial assignment links 324 include hyperlinks to various court related web pages, including web pages that provide information about standing orders, trial procedures, calendars, reference guides, common case forms, and general court information. Judicial assignment links 324 also include a hyperlink to "PACER," which stands for Public Access to Court Electronic Records. PACER provides access to case and docket information stored in databases maintained by various courts.

Plaintiff information 326 includes the names, addresses, phone numbers, facsimile numbers, e-mail addresses, and websites of the plaintiffs. Plaintiffs' attorneys information 328 includes information about counsel for the plaintiffs, including attorney names, hyperlinks to biographical information, hyperlinks to the attorneys' law firm, address information, phone numbers, and facsimile numbers. Defendant information 330 includes the names, addresses, phone numbers, facsimile numbers, e-mail addresses, and websites of the defendants. Defendants' attorneys information 332 includes information about counsel for the defendants, including attorney names, hyperlinks to biographical information, hyperlinks to the attorneys' law firm, address information, phone numbers, facsimile numbers, and attorney identification numbers. Local counsel information 334 includes information about local counsel for the defendants, including attorney names, hyperlinks to biographical information, hyperlinks to the attorneys' law firm, address information, phone numbers, facsimile numbers, and attorney identification numbers.

FIGS. 3C-1 through 3C-4 (collectively referred to as FIG. 3C) are diagrams of an exemplary docket web page 202D illustrating docket/appointments/deadlines with links to documents that confirm the action and/or provide basis/ comments. In one embodiment, docket web page 202D is displayed in response to a user selecting link 308C from one of web pages 202A–202O. Page identifier 306 indicates that the user is viewing "Docket" web page 202D. Docket web page 202D includes docket table 350 and hyperlink 354. Hyperlink 354 links a user to a printable version, in this case a Microsoft Word document, of docket table 350.

Docket table 350 includes four columns 352A–352D and a plurality of entries 356A–356N (collectively referred to as entries 356). Column 352B includes actions that have been taken or that need to be taken in a litigation. In one embodiment, actions under column 352B include, but are not limited to, summons and complaints, answers and counterclaims, status reports, hearings, discovery requests and responses, discovery deadlines, deadlines for motions, other pretrial or trial deadlines, and any other action relevant to the litigation. Actions specified under column 352B may include one or more hyperlinks to information associated with the action. For example, in entry 356A, the action specified in column 352B is "Complaint," and the action is underlined indicating that the action is a hyperlink. In one embodiment, if a user selects the "Complaint" hyperlink in entry 356A, an electronic copy of the complaint is displayed on the user's computer. Similarly, a user may select any other hyperlink in docket table 350 and view an electronic copy of the document identified by the hyperlink, or view additional information about the hyperlinked item.

Column 352A includes dates that actions specified in column 352B were taken, or dates that actions specified in column 352B are to be completed. Column 352C indicates whether an action specified in column 352B was completed, and may also include the date the action was completed. Column 352C may also include other information, such as an explanation why an action was not taken, like that shown in entry 356F. Column 352D includes miscellaneous information regarding entries 356, including a basis for an action, comments regarding an action, an identification of the person or persons who have been assigned an action, or other miscellaneous information.

FIG. 3D is a diagram of an exemplary client information web page 202E illustrating miscellaneous case and client information. In one embodiment, client information web page 202E is displayed in response to a user selecting link 308D from one of web pages 202A–202O. Page identifier 306 indicates that the user is viewing "Client Information" web page 202E. Client information web page 202E provides miscellaneous information regarding a litigation case, such as budget information, conflict information, case strategy information, case objective information, and any other important information relevant to the case.

In one embodiment, client information web page 202E includes hyperlinks 360A–360C. "Case Budget" hyperlink 360A provides a link to budget information for the case. In one embodiment, the budget information includes a budget comparison feature that compares invoices to the case budget and generates a report based on the comparison. "Client Agreement Letter" hyperlink 360B provides a link to an electronic copy of a client agreement letter for the case. "Conflict Documentation" hyperlink 360C provides a link to information related to conflicts for the case.

Figures 1, 2, 3C:
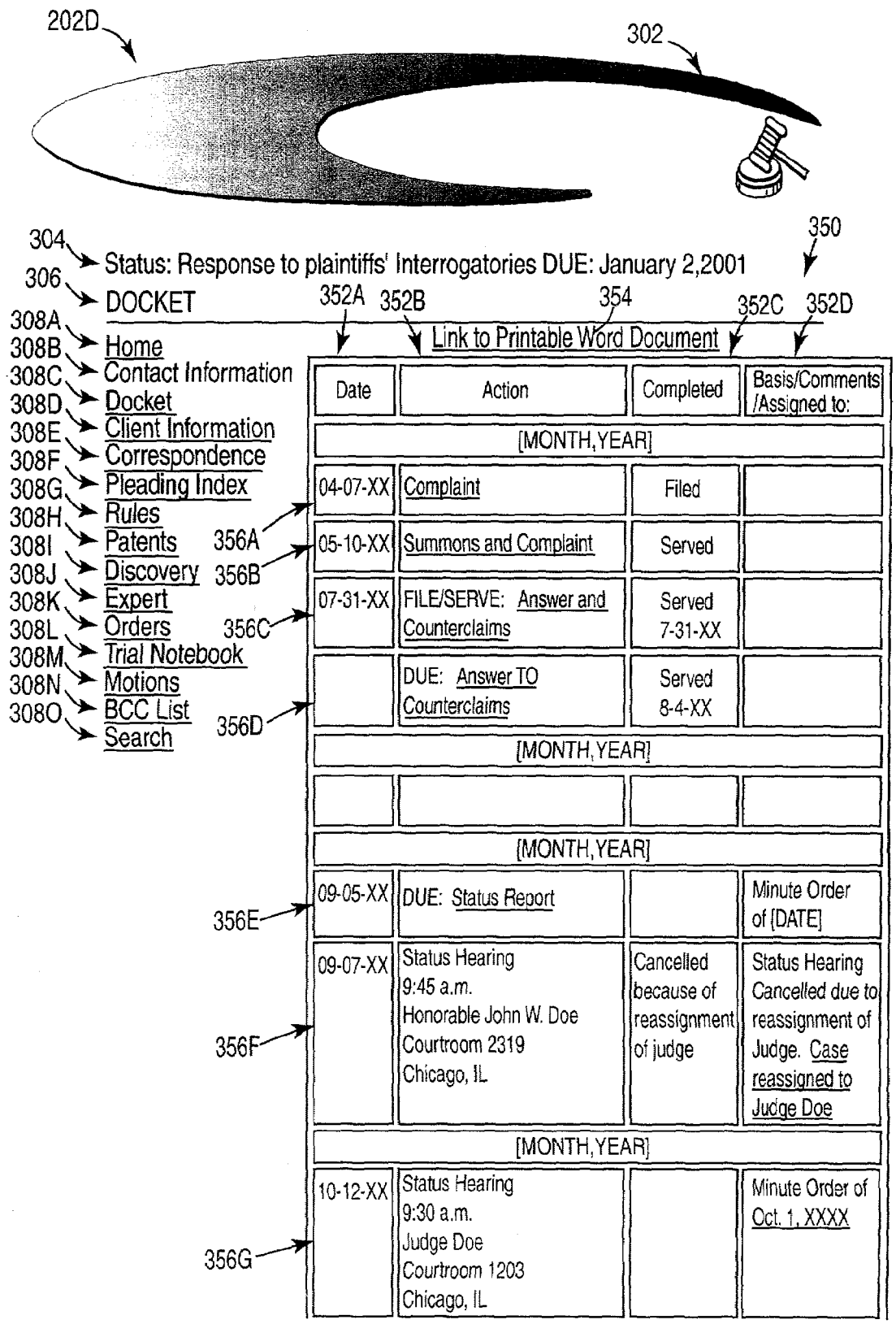
Figures 3, 3C, 4:
Figure 3E:
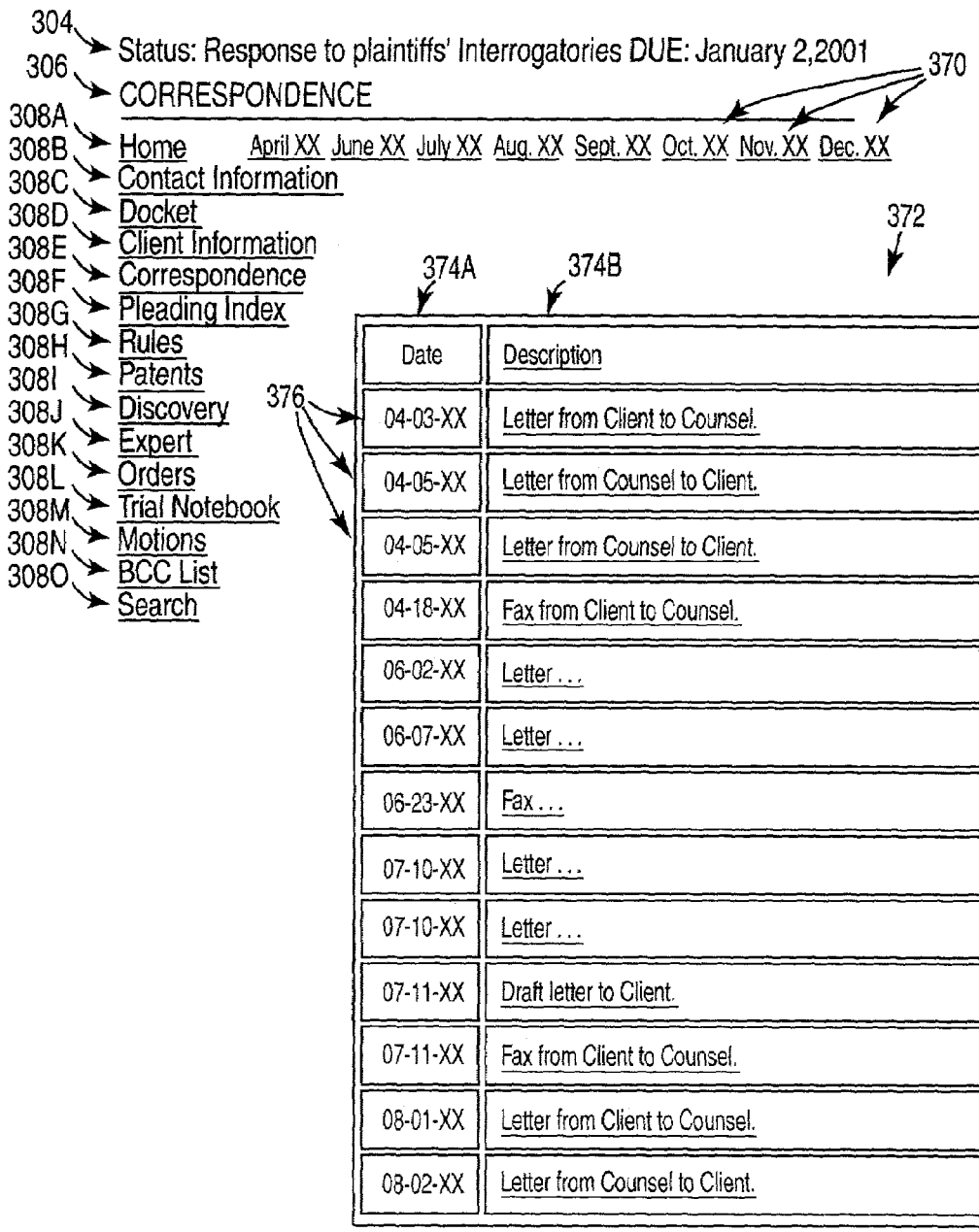
FIG. 3E is a diagram of one embodiment of a web page illustrating an index of correspondence received and authored pertaining to a specified litigation matter.

FIG. 3E is a diagram of an exemplary correspondence web page 202F illustrating an index of correspondence received and authored pertaining to a specified litigation matter. In one embodiment, correspondence web page 202F is displayed in response to a user selecting link 308E from one of web pages 202A–202O. Page identifier 306 indicates that the user is viewing "Correspondence" web page 202F.

Correspondence web page 202F includes month hyperlinks 370 and correspondence table 372. When a user selects one of month hyperlinks 370, descriptions of correspondence for the month and the year identified by the selected hyperlink are displayed at the top of correspondence table 372. Correspondence table 372 includes columns 374A and 374B, and a plurality of entries 376. Column 374B includes a description of correspondence associated with a particular litigation. Column 374A identifies dates of the correspondence listed in column 374B. In one embodiment, column 374B includes hyperlinks to electronic copies of correspondence identified therein.

Figures 1, 3F:
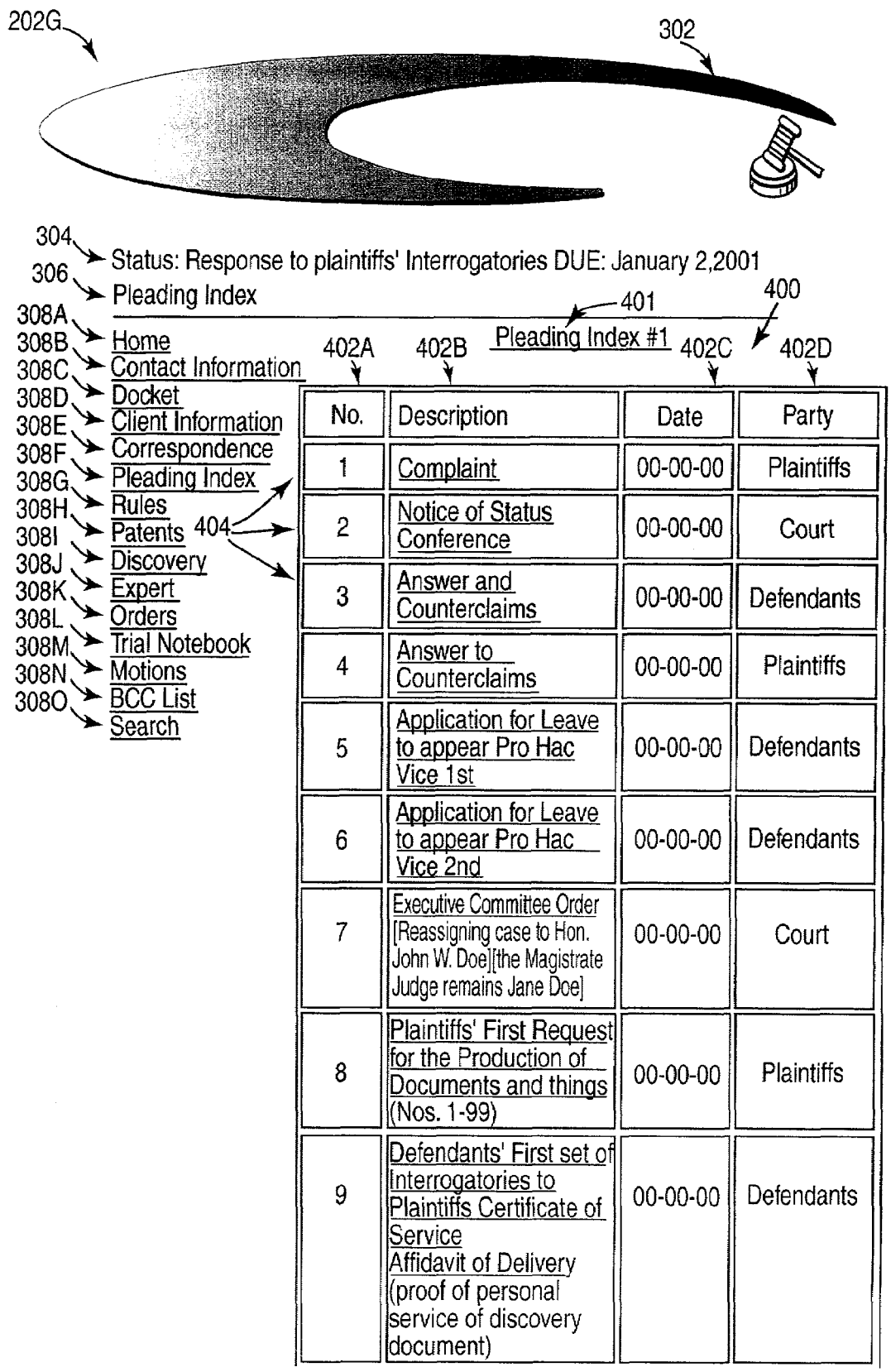

FIGS. 3F-1 through 3F-2 (collectively referred to as FIG. 3F) are diagrams of an exemplary pleadings index web page 202G illustrating an index of pleadings served, filed, authored, received or otherwise generated by any party. In one embodiment, pleadings index web page 202G is displayed in response to a user selecting link 308F from one of web pages 202A–202O. Page identifier 306 indicates that the user is viewing "Pleading Index" web page 202G.

Pleadings index web page 202G includes first pleadings index table 400. First pleadings index table 400 includes first index heading 401, columns 402A–402D, and a plurality of entries 404. Column 402A includes a pleadings number for each entry 404. Column 402B includes a description of each pleading. Column 402C includes a date for each pleading. Column 402D identifies the party that generated a pleading, such as plaintiffs, defendants, and the court. In one embodiment, column 402B includes hyperlinks to electronic copies of the pleadings identified therein. Pleadings index web page 202G may include multiple index tables 400, as indicated by second index heading 406, which is a heading for a second index table (not shown).

FIG. 3G is a diagram of an exemplary rules web page 202H illustrating a list of legal references 420. In one embodiment, rules web page 202H is displayed in response to a user selecting link 308G from one of web pages 202A–202O. Page identifier 306 indicates that the user is viewing "Rules" web page 202H. In one embodiment, each reference in list 420 is a hyperlink to another web page that contains the information identified by the reference. Alternatively, the information identified by the references could be stored locally (e.g., on a law firm's intranet) as images, text, html documents, or other files.

Figure 3H:
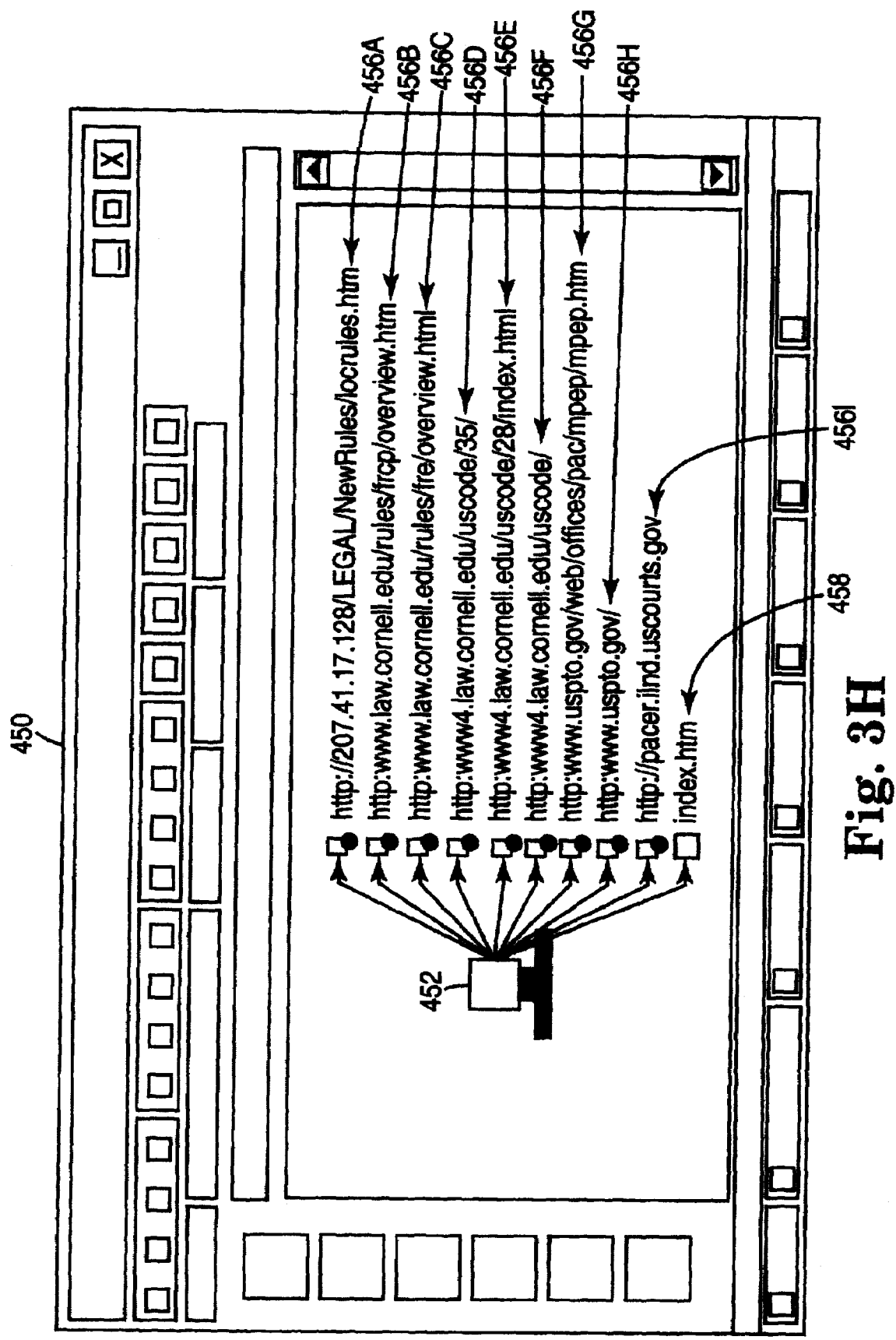
FIG. 3H is a diagram illustrating uniform resource locators (URLs) of hyperlinks in the web page shown in FIG. 3G.

FIG. 3H illustrates uniform resource locators (URLs) of some of hyperlinks 420 in rules web page 202H shown in FIG. 3G. Screen 450 is a simplified exemplary screen display from Microsoft FrontPage. Screen 450 includes rules icon 452, URLs 456A–456I, and index icon 458. Rules icon 452 corresponds to rules web page 202H.

URL 456A specifies the location that the user will jump to when the "Local Rules" hyperlink 420 is selected from rules web page 202H. URL 456B specifies the location that the user will jump to when the "Fed. R. Civ. P." hyperlink 420 is selected from rules web page 202H. URL 456C specifies the location that the user will jump to when the "Fed. R. Evid." hyperlink 420 is selected from rules web page 202H. URL 456D specifies the location that the user will jump to when the "Patent Law" hyperlink 420 is selected from rules web page 202H. URL 456E specifies the location that the user will jump to when the "28 U.S.C" hyperlink 420 is selected from rules web page 202H. URL 456F specifies the location that the user will jump to when the "U.S.C" hyperlink 420 is selected from rules web page 202H. URL 456G specifies the location that the user will jump to when the "MPEP" hyperlink 420 is selected from rules web page 202H. URL 456H specifies the location that the user will jump to when the "USPTO" hyperlink 420 is selected from rules web page 202H. URL 456I specifies the location that the user will jump to when the "PACER" hyperlink 420 is selected from rules web page 202H.

It will be understood that URLs 456A–456I are merely exemplary, and that the information identified by hyperlinks 420 may be accessed from other locations, including a local server (e.g., a server on a law firm's intranet). Index icon 458 represents home page 202A.

Figure 3I:
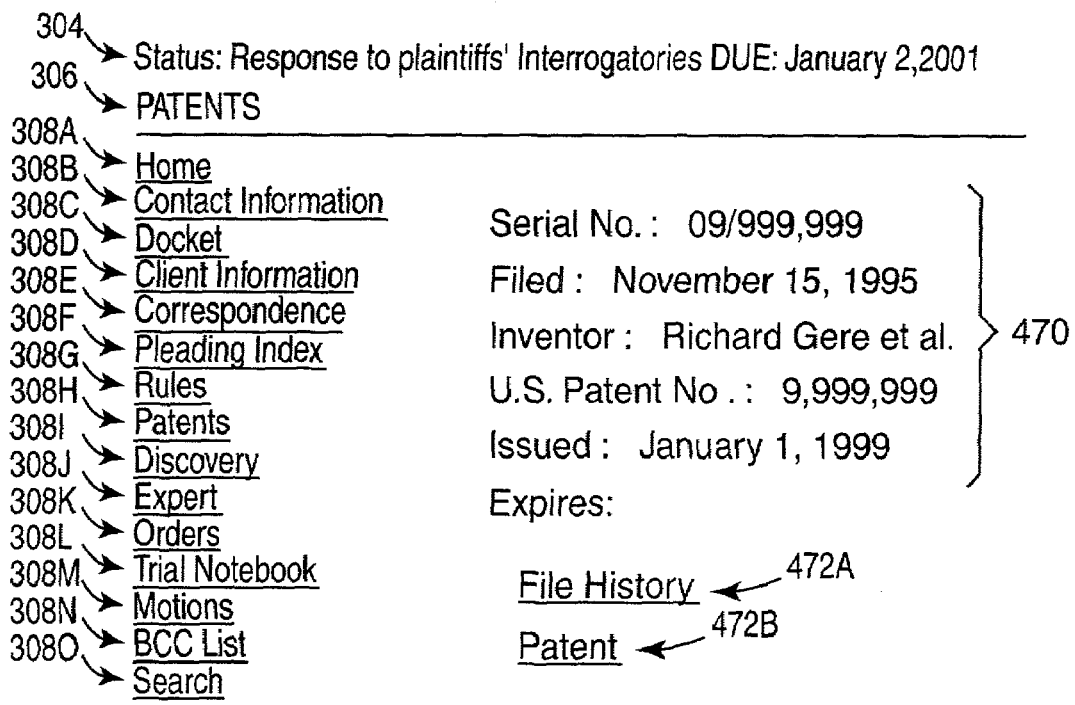
FIG. 3I is a diagram of one embodiment of a web page illustrating information regarding a patent involved in a litigation.

FIG. 3I is a diagram of an exemplary patents web page 202I illustrating information regarding a patent involved in the litigation. In one embodiment, patents web page 202I is displayed in response to a user selecting link 308H from one of web pages 202A–202O. Page identifier 306 indicates that the user is viewing "Patents" web page 202I.

Patents web page 202I includes patent heading information 470, and hyperlinks 472A–472B (collectively referred to as hyperlinks 472). In one embodiment, patent heading information 470 includes the serial number, filing date, inventor names, patent number, issue date, and expiration date of the patent in suit. Patent heading information 470 may also include other information about the patent in suit. Hyperlink 472A provides a link to the file history of the patent identified in patent heading information 470. Hyperlink 472B provides a link to the patent identified in patent heading information 470. Hyperlinks 472 may also include additional links to other information regarding the patent in suit. In one embodiment, the patent and the file history associated with hyperlinks 472A–472B are stored locally as images, text, html, or other file type. It will be understood that patents web page 202I may include information for multiple patents, including prior art patents involved in the litigation. Web page 202I may also or alternatively include information regarding trademarks or copyrights involved in the litigation.

Figures 2, 3J:
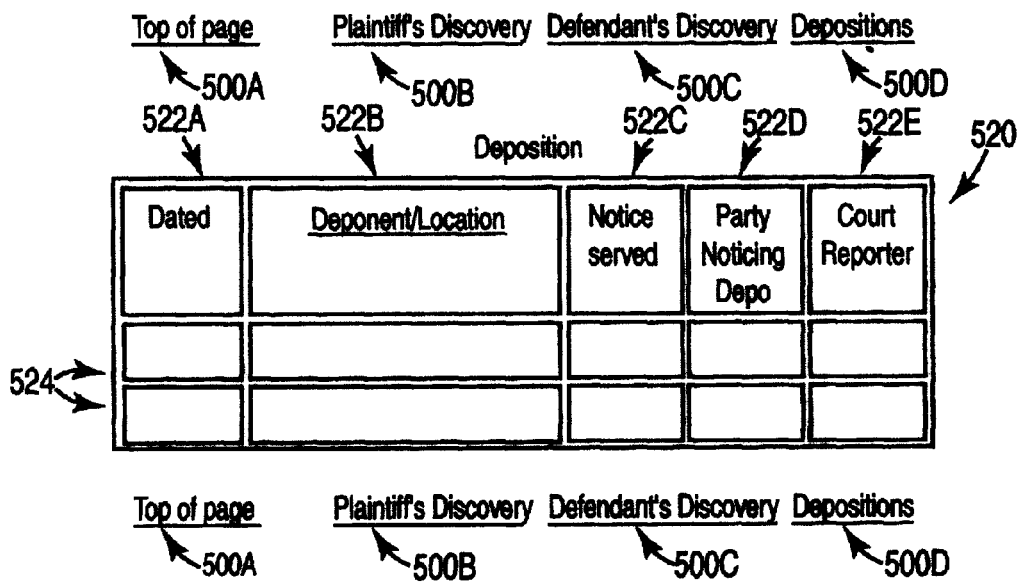

FIGS. 3J-1 through 3J-2 (collectively referred to as FIG. 3J) are diagrams of an exemplary discovery web page 202J illustrating discovery information for the litigation. In one embodiment, discovery web page 202J is displayed in response to a user selecting link 308I from one of web pages 202A–202O. Page identifier 306 indicates that the user is viewing "Discovery" web page 202J. Discovery web page 202J includes, but is not limited to, plaintiff's discovery information, defendant's discovery information, and deposition information.

Discovery web page 202J includes plaintiff's discovery table 502, defendant's discovery table 510, depositions table 520, and hyperlinks 500A–500D. A user can scroll up/down or page up/down through tables 502, 510 and 520. Selecting "Top of Page" hyperlink 500A brings the user back to the top of the first table displayed in discovery web page 202J, which in this embodiment is plaintiff's discovery table 502. Selecting "Plaintiffs Discovery" hyperlink 500B causes a jump to the top of plaintiff's discovery table 502. Selecting "Defendant's Discovery" hyperlink 500C causes a jump to the top of defendant's discovery table 510. Selecting "Depositions" hyperlink 500D causes a jump to the top of depositions table 520.

Plaintiffs discovery table 502 includes columns 504A–504E, and a plurality of entries 506. Column 504B includes descriptions of the plaintiff's discovery requests and the defendant's discovery responses. In one embodiment, descriptions in column 504B also include hyperlinks to electronic copies of the described discovery documents. The discovery documents may be stored locally as image files or other file types, and accessed through the hyperlinks in plaintiff's discovery table 502. Column 504A includes dates for discovery entries described in column 504B. Column 504C includes dates of service of discovery information described in column 504B. Column 504D includes due dates for discovery information described in column 504B. Column 504E includes dates of receipt/service for the defendant's responses to the plaintiff's discovery requests. For entries 506 that correspond to defendant's discovery responses, the date of service of the responses are provided in column 504C, rather than in column 504E (i.e., "N/A" or not applicable).

Defendant's discovery table 510 includes columns 512A–512E, and a plurality of entries 514. Column 512B includes descriptions of the defendant's discovery requests and the plaintiff's discovery responses. In one embodiment, descriptions in column 512B also include hyperlinks to electronic copies of the described discovery documents. The discovery documents may be stored locally as image files or other file types, and accessed through the hyperlinks in defendant's discovery table 510. Column 512A includes dates for discovery entries described in column 512B. Column 512C includes dates of service of discovery information described in column 512B. Column 512D includes due dates for discovery information described in column 512B.

Column 512E includes dates of receipt/service for the plaintiff's responses to the defendant's discovery requests. For entries 514 that correspond to defendant's discovery requests, the date of service of the requests are provided in column 512C, rather than in column 512E (i.e., "NA" or not applicable).

Depositions table 520 includes columns 522A–522E, and a plurality of entries 524. Column 522B includes descriptions of deponents and the location of depositions. Column 522A includes dates for depositions. Column 522C includes dates that deposition notices were served. Column 522D includes identifications of the parties that noticed depositions. Column 522E includes identifications of court reporters for depositions. In one embodiment, depositions table 520 includes hyperlinks to electronic copies of deposition transcripts, and/or hyperlinks to other related information, including links to audio/video recordings of depositions.

Figure 3K:
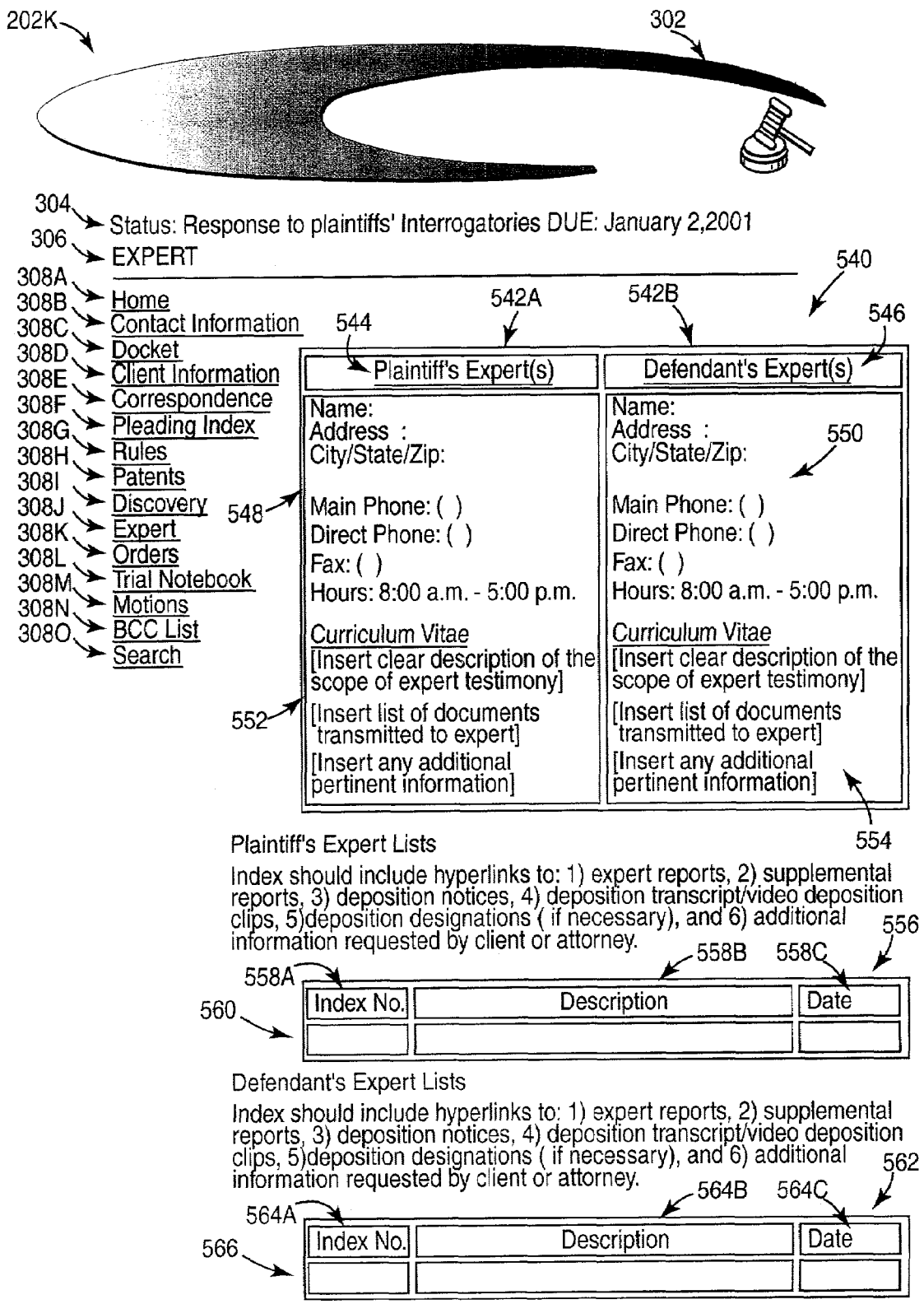
FIG. 3K is a diagram of one embodiment of a web page illustrating information regarding experts.

FIG. 3K is a diagram of an exemplary experts web page 202K illustrating information regarding experts for a litigation. In one embodiment, experts web page 202K is displayed in response to a user selecting link 308J from one of web pages 202A–202O. Page identifier 306 indicates that the user is viewing "Expert" web page 202K. In one embodiment, experts web page 202K includes links to electronic copies of expert reports, deposition notices and testimony, curriculum vitae, and other information related to experts in a litigation.

Experts web page 202K includes experts table 540, plaintiff's experts information table 556, and defendant's experts information table 562. Experts table 540 includes columns 542A and 542B. Column 542A includes "Plaintiff's Expert(s)" hyperlink 544, plaintiff's expert contact information 548, and plaintiff's expert summary information 552. Column 542B includes "Defendant's Expert(s)" hyperlink 546, defendant's expert contact information 550, and defendant's expert summary information 554. Selecting "Plaintiff's Expert(s)" hyperlink 544 causes a jump to the top of plaintiff's experts information table 556. Selecting "Defendant's Expert(s)" hyperlink 546 causes a jump to the top of defendant's experts information table 562. Contact information 548 and 550 includes standard contact information for each expert in a litigation, such as names, addresses, phone numbers and facsimile numbers. Expert summary information 552 and 554 includes information regarding each expert in a litigation, such as a hyperlinks to curriculum vitas, descriptions of the scope of expert testimony, descriptions and hyperlinks to documents transmitted to experts, and any other pertinent information.

Plaintiff's experts information table 556 includes columns 558A–558C, and a plurality of entries 560. Column 558A includes a pleadings index number for each entry 560. Column 558B includes descriptions of documents and other information related to the plaintiff's expert(s). In one embodiment, descriptions in column 558B also include hyperlinks to electronic copies of the described discovery documents or other information. In one form of the invention, hyperlinks are provided in table 556 for expert reports, supplemental reports, deposition notices, deposition transcripts and/or video deposition clips, deposition designations, and any other pertinent information related to the plaintiff's expert(s). Column 558C includes dates for information described in column 558B.

Defendant's experts information table 562 includes columns 564A–564C, and a plurality of entries 566. Column 564A includes a pleadings index number for each entry 566. Column 564B includes descriptions of documents and other information related to the defendant's expert(s). In one embodiment, descriptions in column 564B also include hyperlinks to electronic copies of the described discovery documents or other information. In one form of the invention, hyperlinks are provided in table 562 for expert reports, supplemental reports, deposition notices, deposition transcripts and/or video deposition clips, deposition designations, and any other pertinent information related to the defendant's expert(s). Column 564C includes dates for information described in column 564B.

Figure 3L:
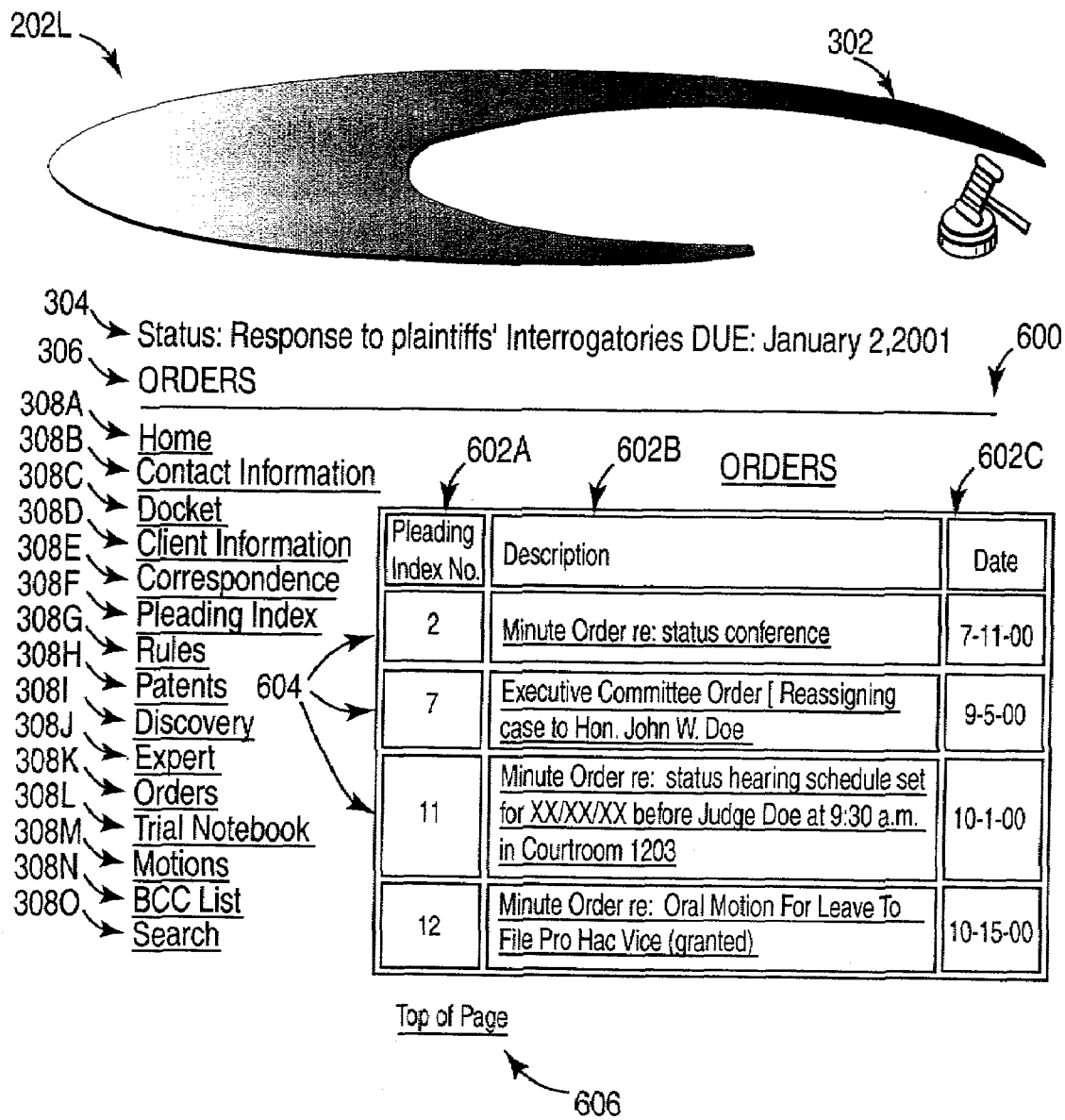
FIG. 3L is a diagram of one embodiment of a web page illustrating orders filed by the judicial assignment.

FIG. 3L is a diagram of an exemplary orders web page 202L illustrating orders filed by the judicial assignment. In one embodiment, orders web page 202L is displayed in response to a user selecting link 308K from one of web pages 202A–202O. Page identifier 306 indicates that the user is viewing "Orders" web page 202L. Orders web page 202L includes orders table 600 and hyperlink 606. Orders table 600 includes columns 602A–602C, and a plurality of entries 604. Column 602B includes descriptions of orders issued by the court. In one embodiment, the descriptions in column 602B are hyperlinks to electronic copies of the described orders. In one embodiment, electronic copies of the orders are stored locally. Column 602A provides a pleading index number for each one of the entries 604. Column 602C includes dates of the orders described in column 602B. A user can scroll up/down and page up/down through orders table 600. Selecting "Top of Page" hyperlink 606 brings the user to the top of orders table 600.

Figure 3M:
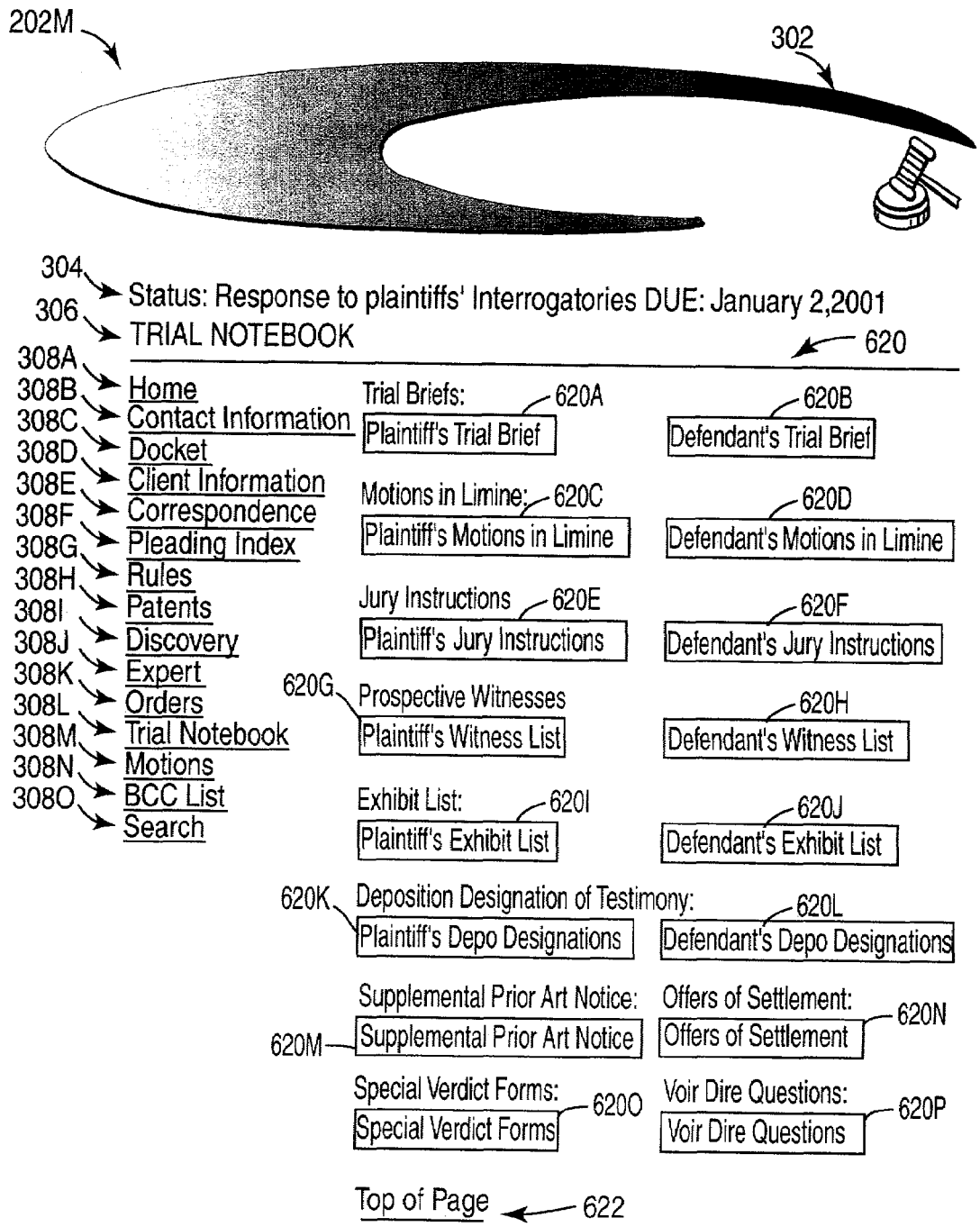
FIG. 3M is a diagram of one embodiment of a web page illustrating an index to other pages that contain information filed/used in preparation for trial.

FIG. 3M is a diagram of an exemplary trial notebook web page 202M illustrating an index to other pages that contain information filed/used in preparation for trial. In one embodiment, trial notebook web page 202M is displayed in response to a user selecting link 308L from one of web pages 202A–202O. Page identifier 306 indicates that the user is viewing "Trial Notebook" web page 202M. Trial notebook web page 202M includes hyperlinks 620A–620P (collectively referred to as hyperlinks 620), and hyperlink 622. In one embodiment, hyperlinks 620 are hover button bars that are linked to other web pages.

Hyperlink 620A provides a link to the plaintiffs trial brief. Hyperlink 620B provides a link to the defendant's trial brief. Hyperlink 620C provides a link to the plaintiff's motions in limine. Hyperlink 620D provides a link to the defendant's motions in limine. Hyperlink 620E provides a link to the plaintiffs jury instructions. Hyperlink 620F provides a link to the defendant's jury instructions. Hyperlink 620G provides a link to the plaintiff's witness list. Hyperlink 620H provides a link to the defendant's witness list. Hyperlink 620I provides a link to the plaintiff's exhibit list. Hyperlink 620J provides a link to the defendant's exhibit list. Hyperlink 620K provides a link to the plaintiff's deposition designations. Hyperlink 620L provides a link to the defendant's deposition designations. Hyperlink 620M provides a link to a supplemental prior art notice for patent litigation. Hyperlink 620N provides a link to offers of settlement. Hyperlink 620O provides a link to special verdict forms. Hyperlink 620P provides a link to Voir Dire questions.

Hyperlinks may also be provided to other types of litigation information in trial notebook web page 202M. A user can scroll up/down and page up/down through the information displayed in trial notebook web page 202M. Selecting "Top of Page" hyperlink 622 brings the user to the top of the displayed information.

Figure 3N:
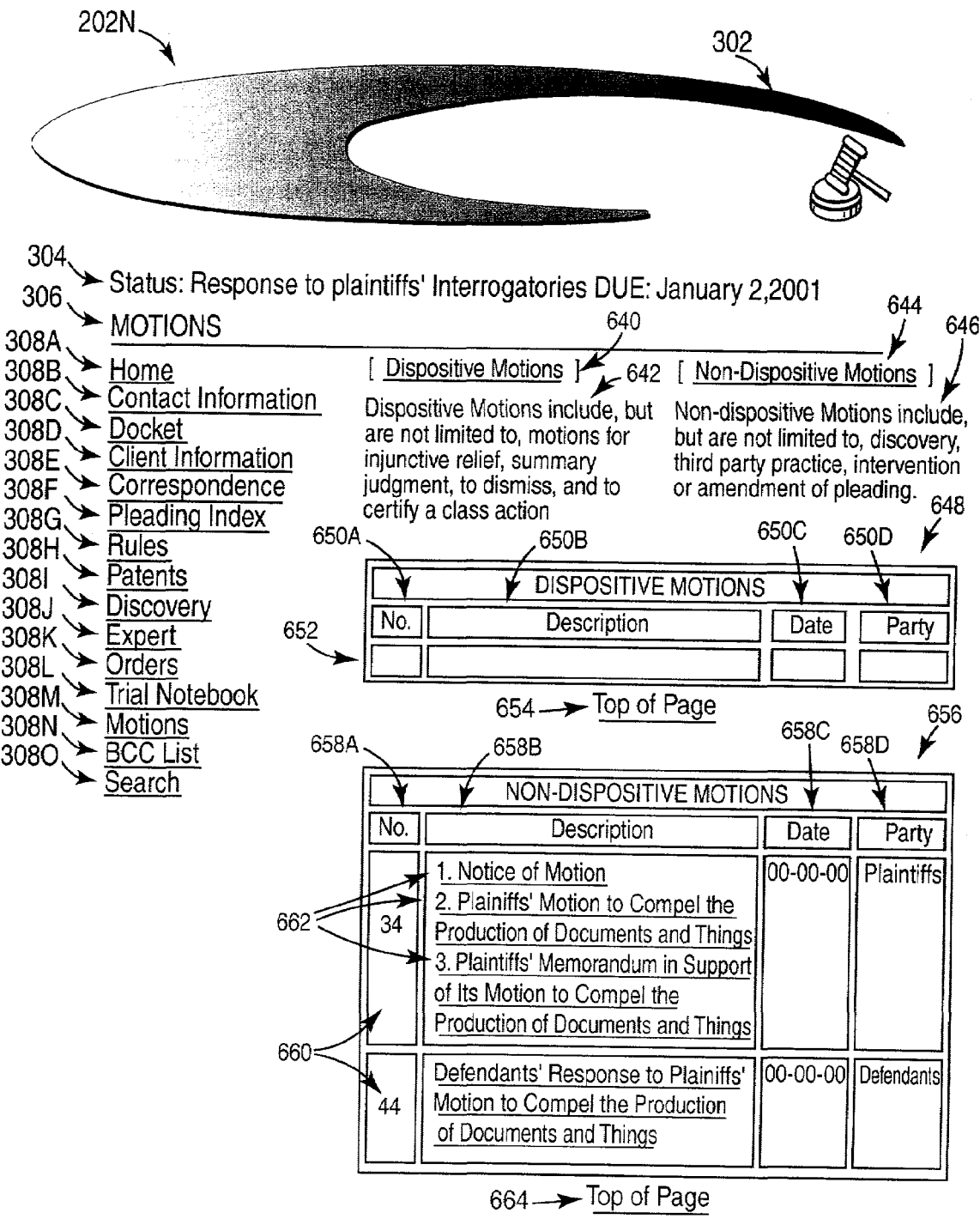
FIG. 3N is a diagram of one embodiment of a web page illustrating links to motion papers.
Figures 2, 30:
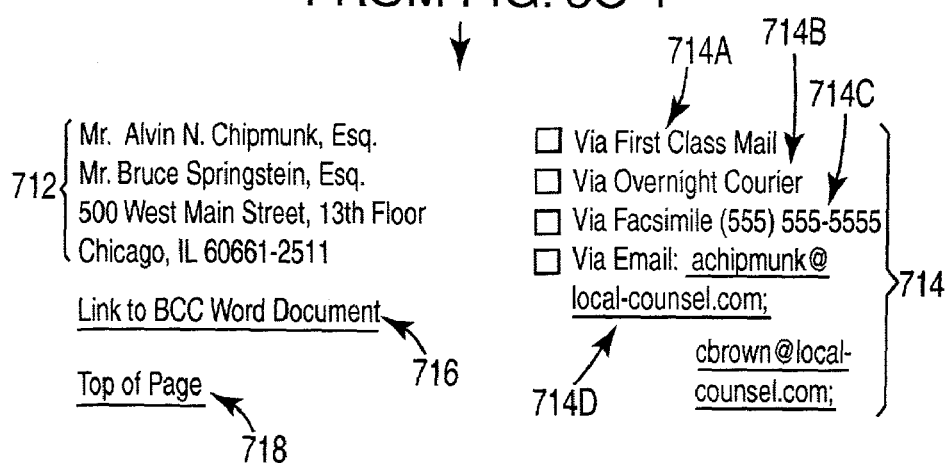

FIG. 3N is a diagram of an exemplary motions web page 202N illustrating links to motion papers. In one embodiment, motions web page 202N is displayed in response to a user selecting link 308M from one of web pages 202A–202O. Page identifier 306 indicates that the user is viewing "Motions" web page 202N.

Motions web page 202N includes hyperlinks 640 and 644, motion definitions 642 and 646, dispositive motions table 648, hyperlink 654, non-dispositive motions table 656, and hyperlink 664. A user can scroll up/down or page up/down through tables 648 and 656. Selecting "Top of Page" hyperlink 654 or 664 brings the user back to the top of the first table displayed in motions web page 202N, which in this embodiment is dispositive motions table 648. Definition 642 includes a description of the types of motions that are typically classified as dispositive motions, and that should be included in table 648. Definition 646 includes a description of the types of motions that are typically classified as non-dispositive motions, and that should be included in table 656. Selecting "Dispositive Motions" hyperlink 640 causes a jump to the top of dispositive motions table 648. Selecting "Non-Dispositive Motions" hyperlink 644 causes a jump to the top of non-dispositive motions table 656.

Dispositive motions table 648 includes columns 650A–650D, and a plurality of entries 652. Column 650A includes a pleadings index number for each entry 652. Column 650B includes descriptions of dispositive motions and related information. In one embodiment, descriptions in column 650B also include hyperlinks to electronic copies of the described dispositive motions and related information. The hyperlinked documents may be stored locally as image files or other file types, and accessed through the hyperlinks in dispositive motions table 648. Column 650C includes dates for dispositive motion entries described in column 650B. Column 650D includes an identification of the party (e.g., plaintiff or defendant) associated with each dispositive motion entry described in column 650B.

Non-dispositive motions table 656 includes columns 658A–658D, and a plurality of entries 660. Column 658A includes a pleadings index number for each entry 660. Column 658B includes descriptions of non-dispositive motions and related information. In one embodiment, descriptions in column 658B also include hyperlinks, such as hyperlinks 662, to electronic copies of the described non-dispositive motions and related information. The hyperlinked documents may be stored locally as image files or other file types, and accessed through the hyperlinks in non-dispositive motions table 656. Column 658C includes dates for non-dispositive motion entries described in column 658B. Column 658D includes an identification of the party (e.g., plaintiff or defendant) associated with each non-dispositive motion entry described in column 658B.

FIGS. 3O-1 through 3O-2 (collectively referred to as FIG. 3O) are diagrams of an exemplary BCC list web page 202O illustrating how the distribution of documents received and generated were effectuated. In one embodiment, BCC list web page 202O is displayed in response to a user selecting link 308N from one of web pages 202A–202O. Page identifier 306 indicates that the user is viewing "BCC List" web page 202O.

BCC list web page 202O, which is also referred to as copy web page 202O, allows a user to identify the individuals who were provided a copy of a particular litigation document, such as a pleading, an email, a letter or other correspondence, or any other litigation document, whether electronic or paper-based. In one form of the present invention, BCC list web page 202O acts as a "form" that is filled in by the user, and then printed for document retention or other purposes. In one embodiment, BCC list web page 202O includes attorney names list 700, attorney email addresses list 702, local counsel email addresses list 704, email identification information 706, client address information 708, client delivery information 710, local counsel address information 712, local counsel delivery information 714, and hyperlinks 716 and 718.

If a user wishes to identify the attorneys that were provided a particular email communication, the user can locate each such attorney in attorney names list 700, identify the corresponding email addresses of the attorneys in attorney email address list 702 or in local counsel email address list 704, and then click on the email addresses corresponding to the attorneys that were provided the communication. Email identification information 706 allows a user to specify identification information for the email communication, including sender information 706A and date information 706B.

Client address information 708 includes names and address information for the client or clients. To indicate that a client was provided a particular litigation document, a user identifies the method of delivery of the document in client delivery information 710. Client delivery information 710 includes checkboxes to indicate the method of delivery, including "first class mail" checkbox 710A, "overnight courier" checkbox 710B, "facsimile" checkbox 710C and "other" checkbox 710D. If a user selects "other" checkbox 710D, the user may also enter the specific method of delivery.

Local counsel address information 712 includes names and address information for local counsel. To indicate that local counsel was provided a particular litigation document, a user identifies the method of delivery of the document in local counsel delivery information 714. Local counsel delivery information 714 includes checkboxes to indicate the method of delivery, including "first class mail" checkbox 714A, "overnight courier" checkbox 714B, "facsimile" checkbox 714C and "email" checkbox 714D. If a user selects "email" checkbox 714D, the user may also select the email address or addresses of the individual or individuals that were provided the communication.

A user may generate a copy list, identifying each individual that received a litigation document, by selecting "Link to BCC Word Document" hyperlink 716. When hyperlink 716 is selected, the information provided by a user on BCC list web page 202O is imported into a Microsoft Word document, which may be printed and stored along with a particular litigation document. In one embodiment, the Microsoft Word document includes a copy list, identifying each individual that was provided a copy of a litigation document, and the manner in which the document was sent. Selecting "Top of Page" hyperlink 718, brings the user back to the top of BCC list web page 202O.

In addition to, or as an alternative to, printing out a copy list for each litigation document, copy information may be stored electronically. Copy information may also be generated automatically, rather than manually entering copy information for each litigation document.

In one embodiment, each of web pages 202A–202O includes a search hyperlink 308O. In one form of the invention, selection of search hyperlink 308O results in the display of a search dialog box (not shown) overlaid on the currently displayed web page 202. Persons of ordinary skill will recognize that various alternative methods of providing search functionality may be employed, including providing a separate search web page 202, or allowing search information to be entered directly on each of web pages 202. In one embodiment, the search dialog box allows a user to enter search terms and boolean logic. A list of information that matches the specified search terms is then displayed.

Searches may be performed for litigation information stored locally, or may specify a broader scope, such as the entire Internet. In one embodiment, search queries may be directed to text contained in web pages 202, metadata, and/or text files generated from performing OCR on documents.

FIGS. 4A–4P and 5A–5C are diagrams of additional or alternative exemplary web pages 202 that are part of a user interface according to one embodiment of the present invention.

Figures 1, 4A:
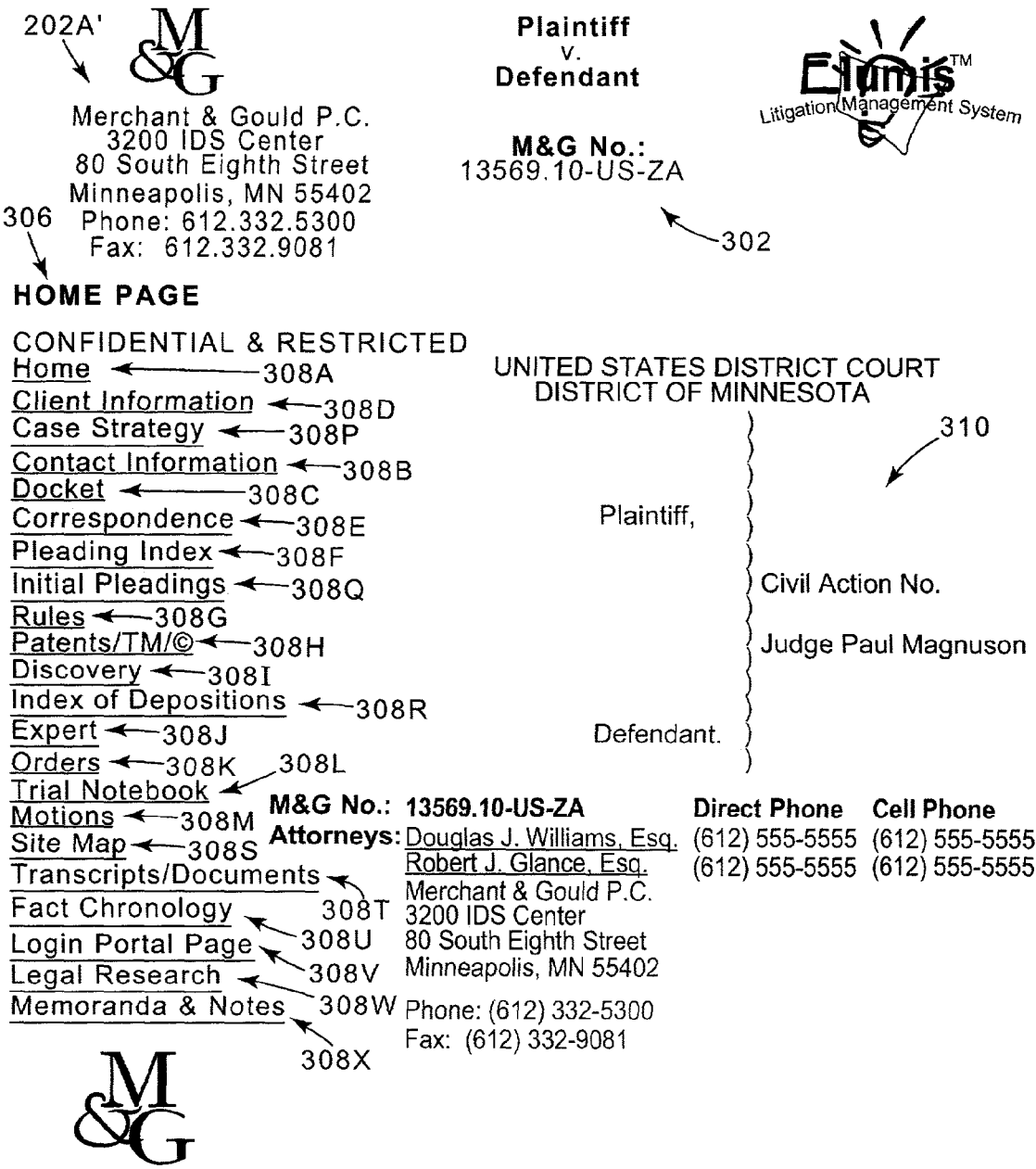

FIGS. 4A-1 through 4A-2 (collectively referred to as FIG. 4A) are diagrams of a second embodiment of a home page 202A' illustrating typical litigation case caption information and contact information for attorneys handling a litigation matter, with additional hyperlinks not shown in home page 202A (shown in FIG. 3A). Home page 202A' includes heading information 302, page identifier 306, hyperlinks 308A–308X (collectively referred to as hyperlinks 308), case caption information 310, and attorney contact information 312.

In one embodiment, heading information 302 identifies the law firm handling the litigation and using litigation management system 200, which is Merchant & Gould P.C. in the example shown. Heading information 302 also identifies the system as an "Elumis™ Litigation Management System."

Page identifier 306 identifies the web page 202 currently being viewed by the user. In FIG. 4A, page identifier 306 indicates that the user is viewing "Home Page" 202A'.

In one embodiment, case caption information 310 includes typical case information, including identification of the plaintiffs and the defendants, case number, and the judge or judges assigned to the case. In one embodiment, attorney contact information 312 includes information regarding the attorneys handling the case, including names, addresses, phone numbers, and facsimile numbers.

Hyperlinks 308 allow a user to link to other web pages 202 within web site 200. Home page 202A' includes additional hyperlinks 308P–308X, which were not illustrated in home page 202A (shown in FIG. 3A). "Case Strategy" hyperlink 308P is a link to a page that provides strategy information for the case. "Initial Pleadings" hyperlink 308Q is a link to an initial pleadings web page 202Y (shown in FIG. 4D). "Index of Depositions" hyperlink 308R is a link to an index of depositions web page 202Z (shown in FIG. 4F). "Site Map" hyperlink 308S is a link to site map web page 202AA (shown in FIG. 4G). "Transcripts/Documents" hyperlink 308T is a link to a page that provides an index of transcripts and other documents relevant to the litigation. "Fact Chronology" hyperlink 308U is a link to a page that provides a chronology of facts in the litigation. "Login Portal Page" hyperlink 308V is a link to client portal page 202CC (shown in FIG. 5B). "Legal Research" hyperlink 308W is a link to legal research information and legal research services, such as Lexis and Westlaw. "Memoranda and Notes" hyperlink 308X is a link to attorney research memoranda and notes for the litigation case. In one embodiment, the attorney research memoranda and notes are only accessible by those with a proper security level clearance (e.g., attorneys only). In one form of the invention, a "Clients Only" hyperlink 308 may be provided to allow a client to add notes that are only accessible by the client and not the attorneys or someone from an outside law firm.

Figures 2, 4B:
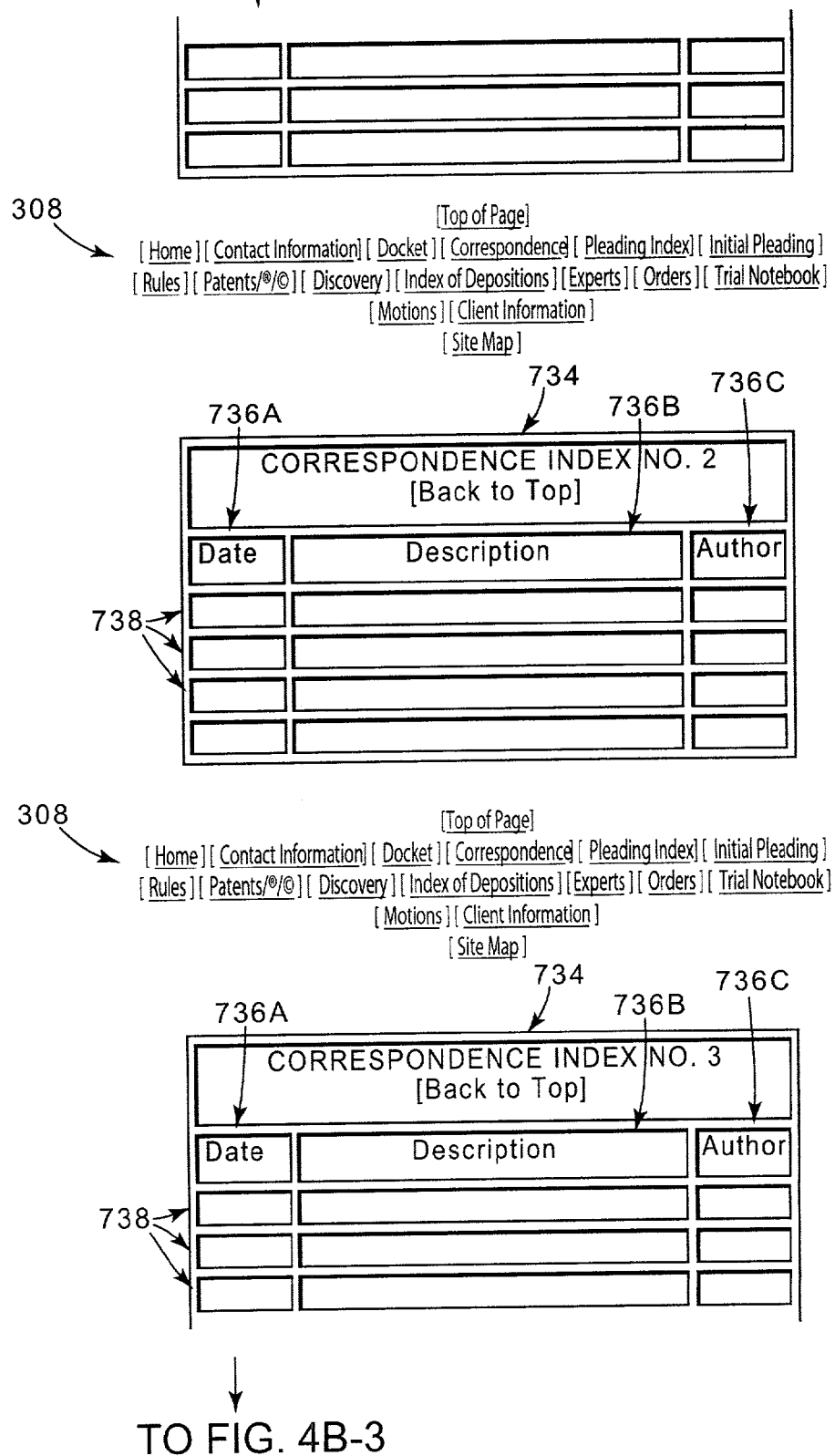
Figures 3, 4B:
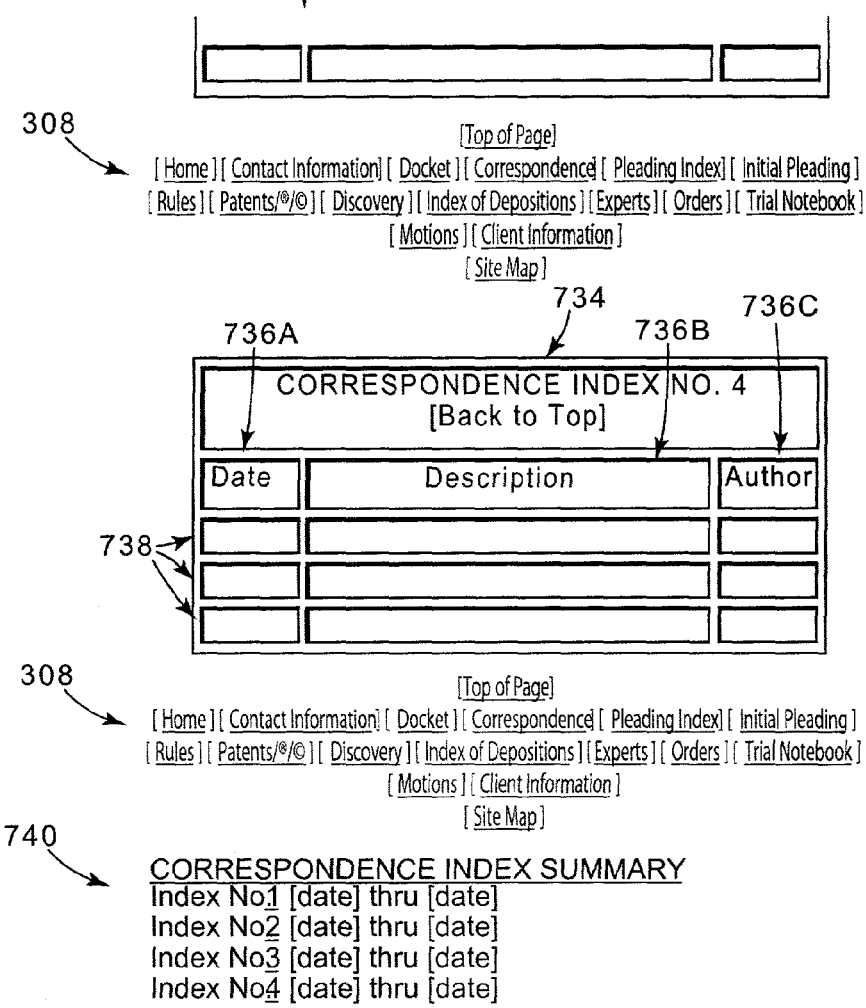

FIGS. 4B-1 through 4B-3 (collectively referred to as FIG. 4B) are diagrams of a second embodiment of a web page 202F' illustrating an index of correspondence received and authored pertaining to a specified litigation matter. In one embodiment, correspondence web page 202F' is displayed in response to a user selecting link 308E from one of web pages 202. Page identifier 306 indicates that the user is viewing "Correspondence" web page 202F'.

Correspondence web page 202F' includes index number hyperlinks 730, index summary hyperlink 732, and four correspondence index tables 734. When a user selects one of index number hyperlinks 730, the user jumps to a corresponding one of the index tables 734. Each correspondence table 734 includes columns 736A–736C, and a plurality of entries 738. Column 736B includes a description of correspondence associated with a particular litigation. In one embodiment, column 736B includes hyperlinks to electronic copies of correspondence identified therein. Column 736A identifies dates of the correspondence listed in column 736B. Column 736C identifies authors of the correspondence listed in column 736B.

When a user selects "Index Summary" hyperlink 732, the user jumps to correspondence index summary 740. Correspondence index summary 740 includes date ranges for the correspondence in each of the correspondence index tables 734.

FIGS. 4C-1 through 4C-2 (collectively referred to as FIG. 4C) are diagrams of a second embodiment of a web page 202G' illustrating an index of pleadings served, filed, authored, received or otherwise generated by any party. In one embodiment, pleadings index web page 202G' is displayed in response to a user selecting link 308F from one of web pages 202. Page identifier 306 indicates that the user is viewing "Pleading Index" web page 202G'.

Pleadings index web page 202G' includes index number hyperlinks 750, and three pleading index tables 752. When a user selects one of index number hyperlinks 750, the user jumps to a corresponding one of the pleading index tables 752. Each pleading index table 752 includes columns 754A–754D, and a plurality of entries 756. Column 754A includes a pleading number for each entry 756. Column 754B includes a description of each pleading. Column 754C includes a date for each pleading. Column 754D identifies the party that generated a pleading, such as plaintiffs, defendants, and the court. In one embodiment, column 754B includes hyperlinks to electronic copies of the pleadings identified therein.

Figure 4D:
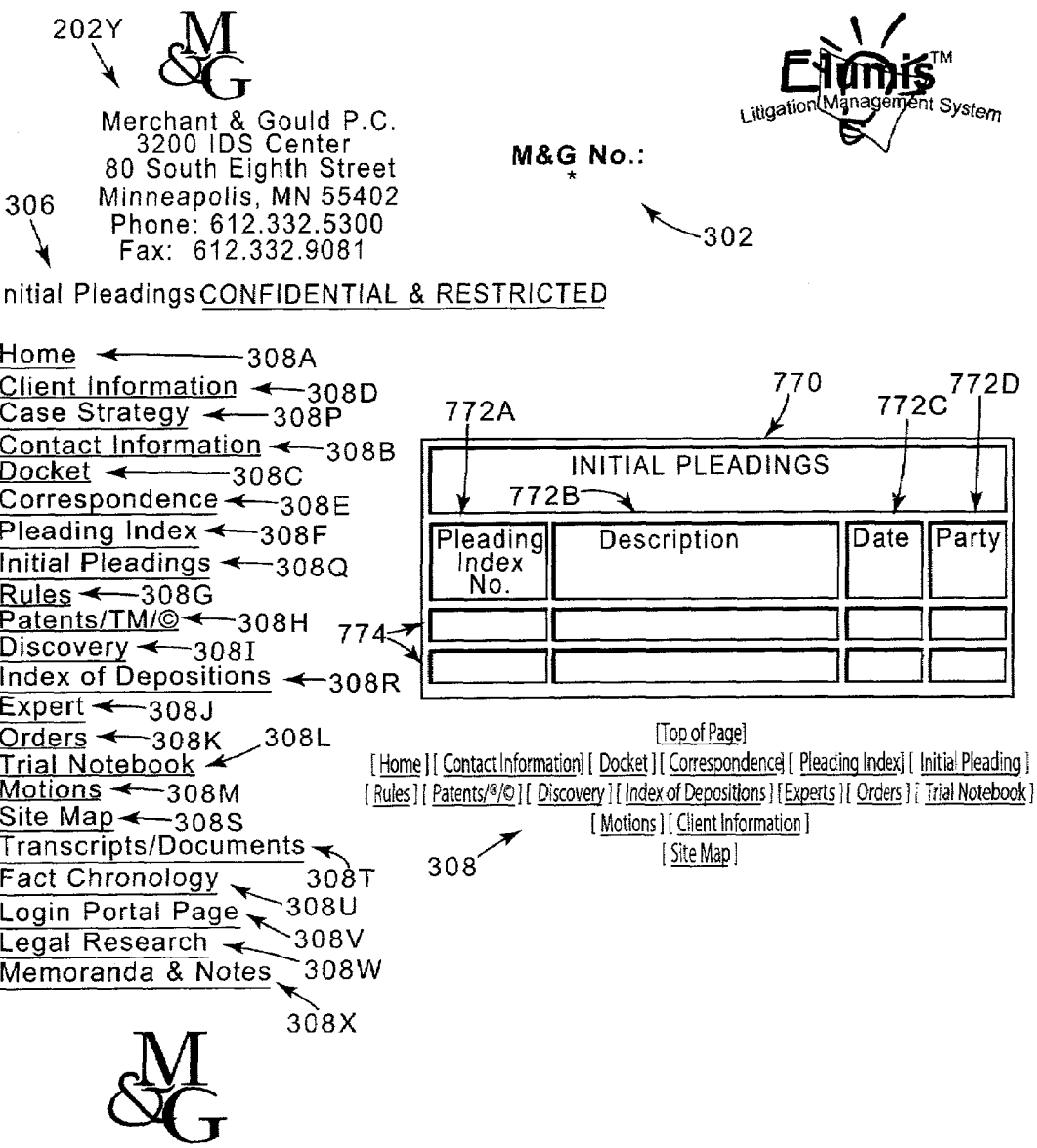
FIG. 4D is a diagram of one embodiment of a web page illustrating an index of initial pleadings.
Figures 2, 4E:
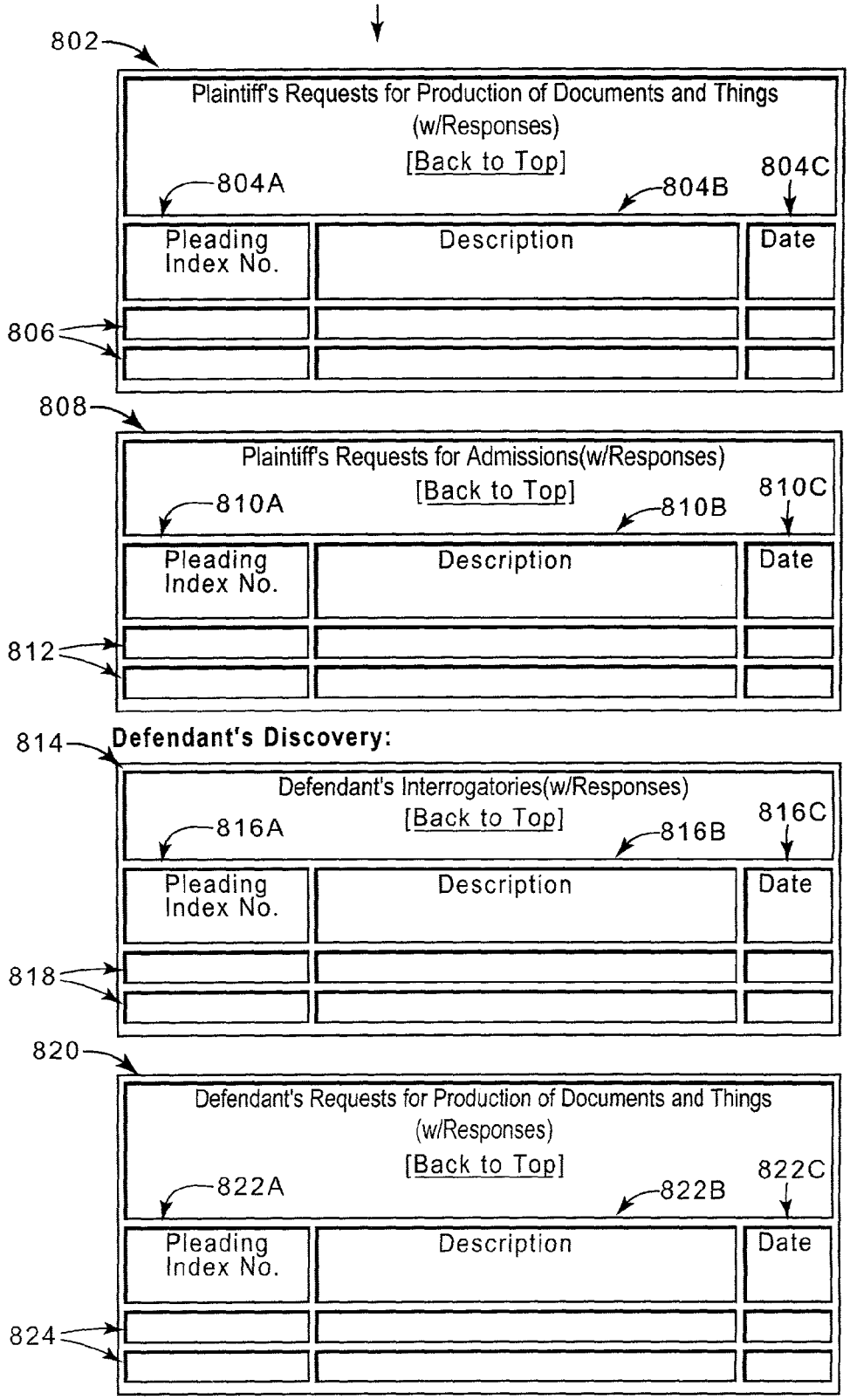
Figures 3, 4E:
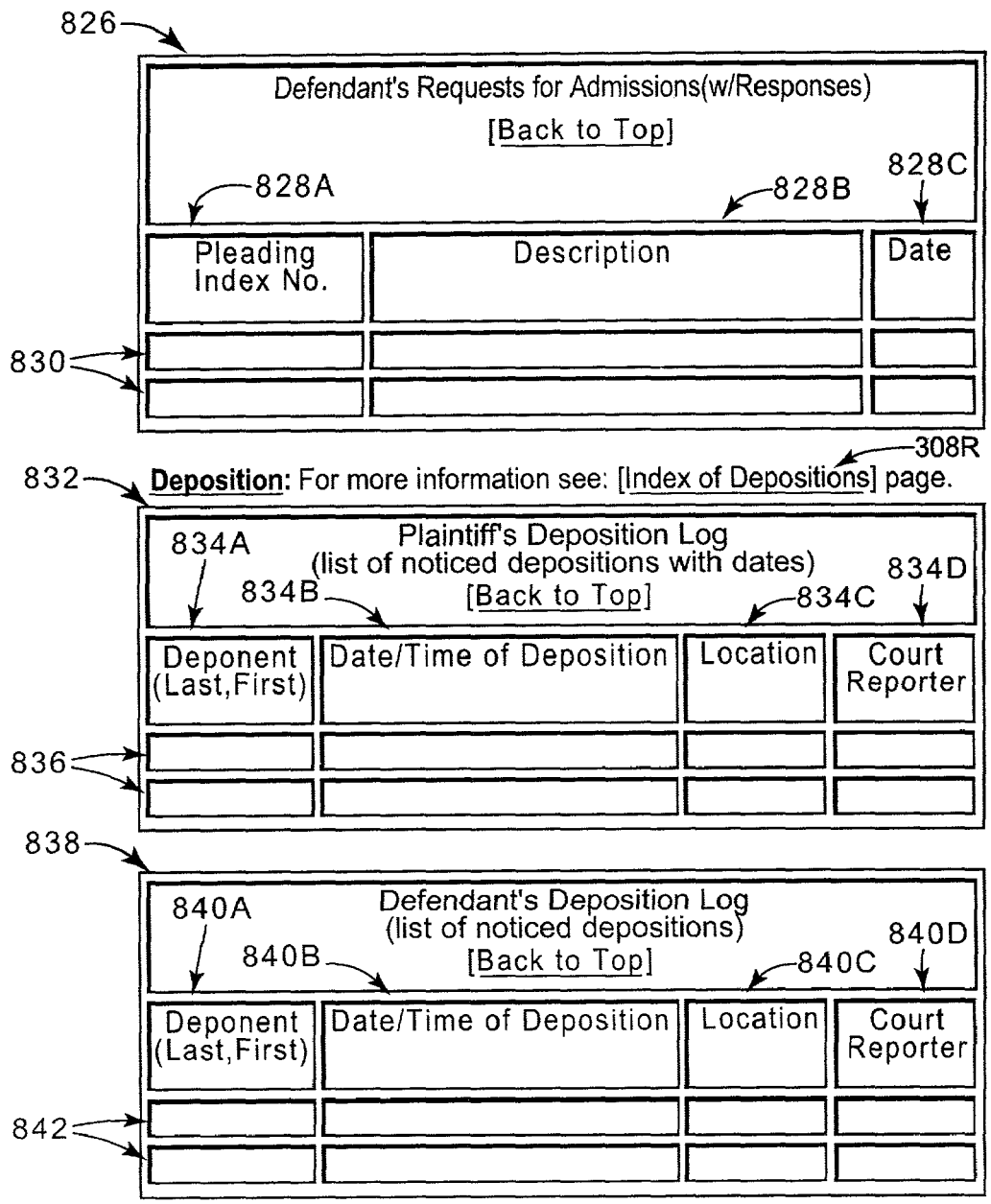
Figures 4, 4E:
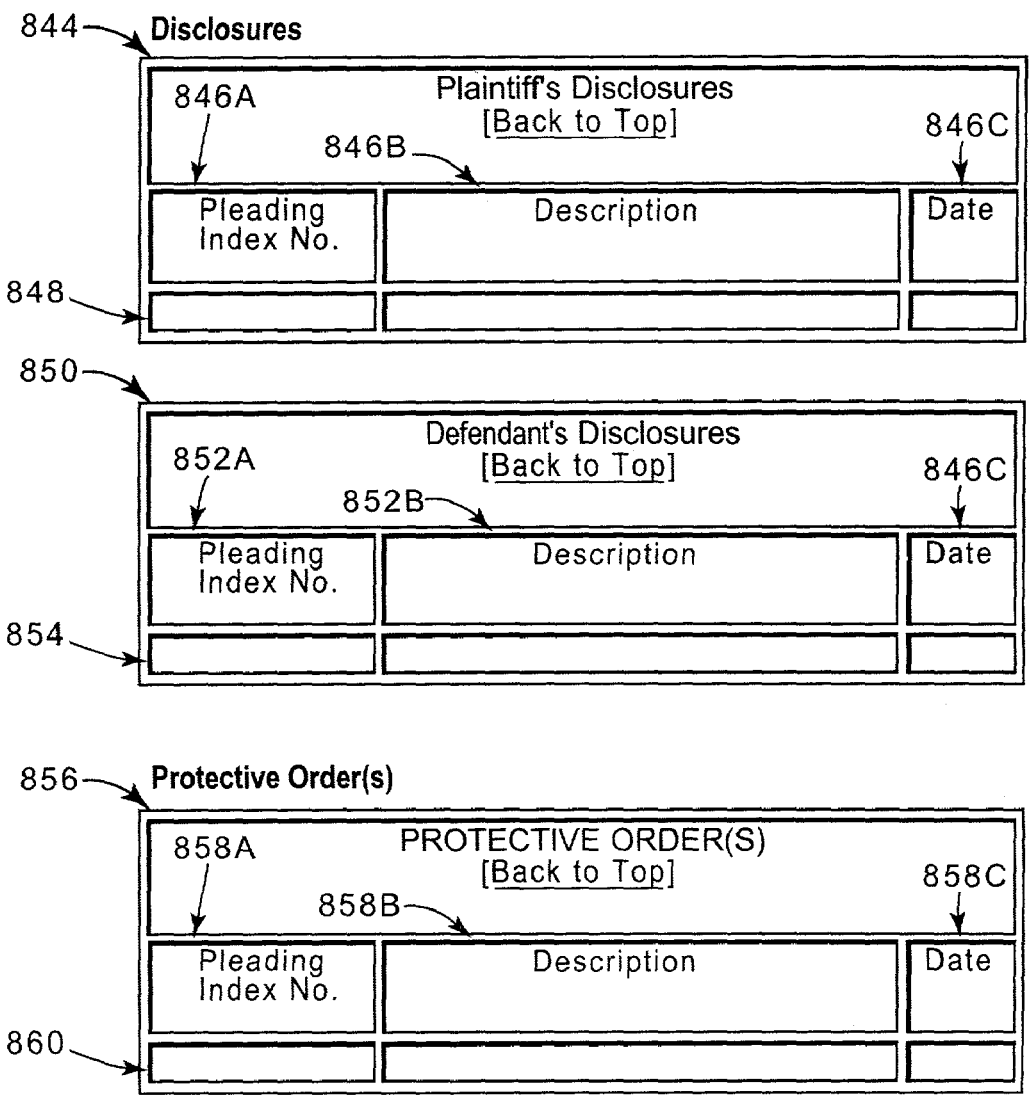

FIG. 4D is a diagram of one embodiment of a web page 202Y illustrating an index of initial pleadings. In one embodiment, initial pleadings web page 202Y is displayed in response to a user selecting link 308Q from one of web pages 202. Page identifier 306 indicates that the user is viewing "Initial Pleadings" web page 202Y.

Initial pleadings web page 202Y includes initial pleadings table 770. Initial pleadings table 770 includes columns 772A–772D, and a plurality of entries 774. Column 772A includes a pleading index number for each entry 774. Column 772B includes a description of each pleading. Column 772C includes a date for each pleading. Column 772D identifies the party that generated a pleading, such as plaintiffs, defendants, and the court. In one embodiment, column 772B includes hyperlinks to electronic copies of the pleadings identified therein.

FIGS. 4E-1 through 4E-5 (collectively referred to as FIG. 4E) are diagrams of a second embodiment of a web page 202J' illustrating an organizational discovery page. In one embodiment, discovery web page 202J' is displayed in response to a user selecting link 308I from one of web pages 202. Page identifier 306 indicates that the user is viewing "Discovery" web page 202J'.

Discovery web page 202J' includes plaintiffs' discovery hyperlinks 790, defendants' discovery hyperlinks 792, miscellaneous discovery hyperlinks 794, Plaintiff's Interrogatories (with Responses) table 796, Plaintiff's Requests for Production of Documents and Things (with Responses) table 802, Plaintiff's Requests for Admissions (with Responses) table 808, Defendant's Interrogatories (with Responses) table 814, Defendant's Requests for Production of Documents and Things (with Responses) table 820, Defendant's Requests for Admissions (with Responses) table 826, Plaintiff's Deposition Log table 832, Defendant's Deposition Log table 838, Plaintiff's Disclosures table 844, Defendant's Disclosures table 850, Protective Orders table 856, and Privilege Logs table 862. Selecting one of "Plaintiff's Discovery" hyperlinks 790 causes a jump to a corresponding one of the plaintiff's discovery tables 796, 802, 808, 832, and 844. Selecting one of "Defendant's Discovery" hyperlinks 792 causes a jump to a corresponding one of the defendant's discovery tables 814, 820, 826, 838, and 850. Selecting miscellaneous discovery hyperlinks 794 causes a jump to corresponding ones of discovery tables 862, 832 and 838, 844 and 850, and 856.

Discovery tables 796, 802, 808, 814, 820, 826, 844, 850, 856, and 862, include columns 798A–798C, 804A–804C, 810A–810C, 816A–816C, 822A–822C, 828A–828C, 846A–846C, 852A–852C, 858A–858C, and 864A–864C, respectively, and include a plurality of entries 800, 806, 812, 818, 824, 830, 848, 854, 860, and 866, respectively. Columns 798B, 804B, 810B, 816B, 822B, 828B, 846B, 852B, 858B, and 864B, include discovery document descriptions, and, in one embodiment, also include hyperlinks to electronic copies of the described discovery documents. The discovery documents may be stored locally as image files or other file types, and accessed through the hyperlinks. Columns 798A, 804A, 810A, 816A, 822A, 828A, 846A, 852A, 858A, and 864A, include a pleading index number for each discovery entry. Columns 798C, 804C, 810C, 816C, 822C, 828C, 846C, 852C, 858C, and 864C, include a date for each discovery entry.

Deposition Log tables 832 and 838 include columns 834A–834D, and 840A–840D, respectively, and a plurality of entries 836, and 842, respectively. Columns 834A and 840A include deponent names. Columns 834B and 840B include date/time information for depositions. Columns 834C and 840C include location information for depositions. Columns 834D and 840D include identifications of court reporters for depositions. In one embodiment, depositions tables 832 and 838 include hyperlinks to electronic copies of deposition transcripts, and/or hyperlinks to other related information, including links to audio/video recordings of depositions.

Figure 4F-2:
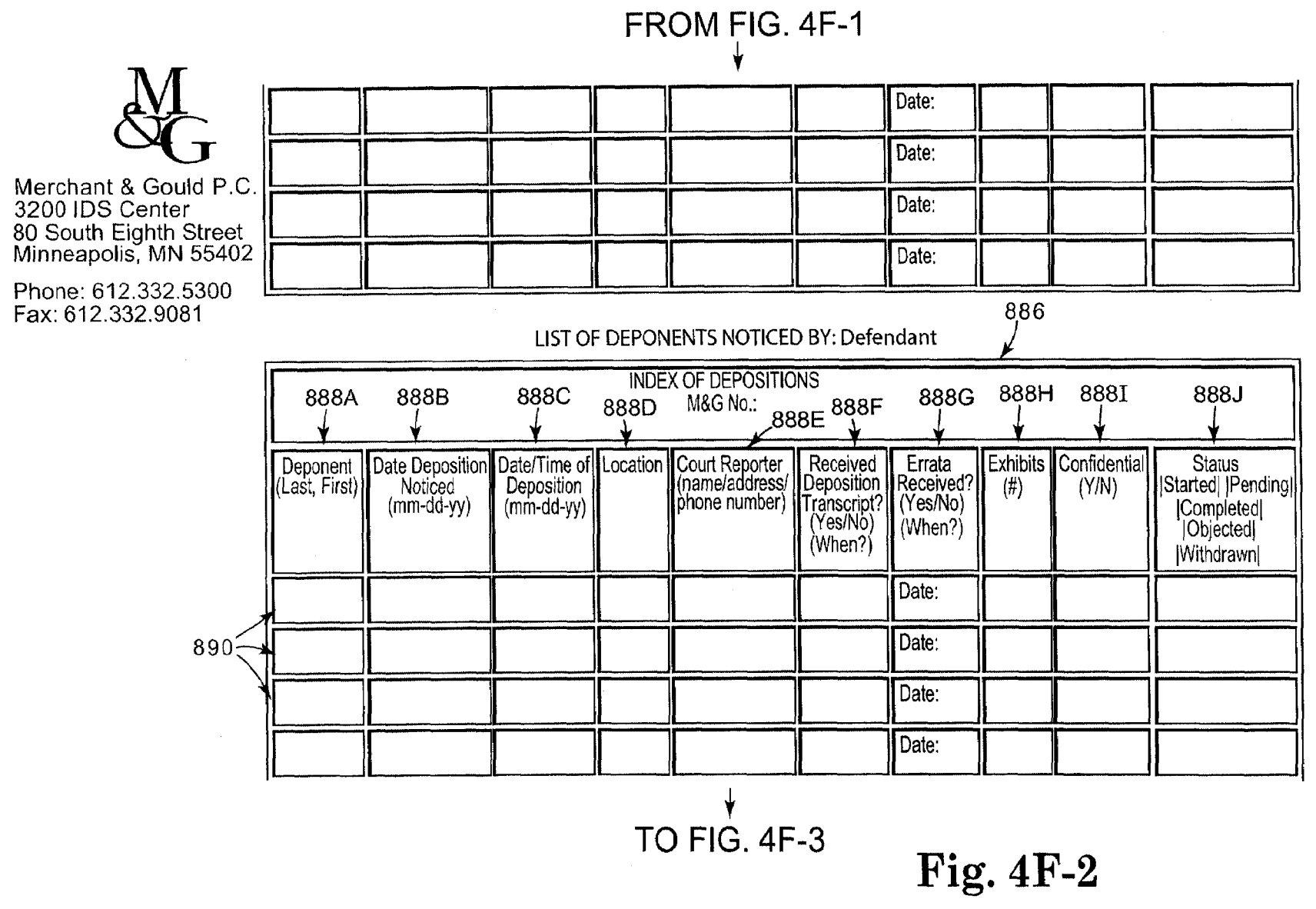

FIGS. 4F-1 through 4F-3 (collectively referred to as FIG. 4F) are diagrams of one embodiment of a web page 202Z illustrating an index of completed depositions. In one embodiment, index of depositions web page 202Z is displayed in response to a user selecting link 308R from one of web pages 202. Page identifier 306 indicates that the user is viewing "Index of Depositions" web page 202Z.

Index of depositions web page 202Z includes Deponents Noticed by Plaintiff table 880 and Deponents Noticed by Defendant table 886. Tables 880 and 886 include columns 882A–882J, and 888A–888J, respectively, and include a plurality of entries 884, and 890, respectively. Columns 882A and 888A include deponent name information. Columns 882B and 888B include date information of when depositions were noticed. Columns 882C and 888C include date information of when depositions were taken. Columns 882D and 888D include information identifying the location of depositions. Columns 882E and 888E include information identifying court reporters for depositions, including name, address, and phone number. Columns 882F and 888F include information identifying whether deposition transcripts have been received, and if so, the date of receipt, and, in one embodiment, also include hyperlinks to electronic copies of the transcripts. Columns 882G and 888G include information identifying whether errata have been received, and if so, the date of receipt. Columns 882H and 888H include information identifying exhibit numbers of exhibits used in depositions. Columns 882I and 888I include information identifying whether depositions have been designated as confidential. Columns 882J and 888J include status information on depositions, such as started, pending, completed, objected, and withdrawn.

FIGS. 4G-1 through 4G-2 (collectively referred to as FIG. 4G) are diagrams of one embodiment of a web page 202AA illustrating a site map of web pages 202 used in an embodiment of the present invention. In one embodiment, site map web page 202AA is displayed in response to a user selecting link 308S from one of web pages 202. Page identifier 306 indicates that the user is viewing "Site Map" web page 202AA. Site map web page 202AA includes an example hierarchical arrangement 900 of web pages 202 (with corresponding hyperlinks 308).

FIGS. 4H–4P are diagrams illustrating example web pages 202 accessible via trial notebook web page 202M, which provide information filed/used in preparation for trial.

FIGS. 4H-1 through 4H-2 (collectively referred to as FIG. 4H) are diagrams of one embodiment of a web page 202P illustrating an index of trial briefs. In one embodiment, trial briefs web page 202P is displayed in response to a user selecting one of links 620A or 620B from trial notebook web page 202M. Page identifier 306 indicates that the user is viewing "Trial Briefs" web page 202P. Trial briefs web page 202P includes trial briefs table 910. Trial briefs table 910 includes columns 912A–912C, and a plurality of entries 914. Column 912A includes a pleading index number for each entry 914. Column 912B includes a description of each trial brief, and, in one embodiment, includes hyperlinks to electronic copies of the trial briefs. Column 912C includes a date for each trial brief.

FIGS. 4I-1 through 4I-2 (collectively referred to as FIG. 4I) are diagrams of one embodiment of a web page 202Q illustrating an index of motions in limine. In one embodiment, motions in limine web page 202Q is displayed in response to a user selecting one of links 620C or 620D from trial notebook web page 202M. Page identifier 306 indicates that the user is viewing "Motions in Limine" web page 202Q.

Motions in limine web page 202Q includes hyperlinks 920, Plaintiff's Motions in Limine table 922, and Defendant's Motions in Limine table 928. Selecting one of hyperlinks 920 causes a jump to the top of the corresponding Motions in Limine table 922 or 928. Motions in Limine tables 922 and 928 include columns 924A–924C, and 930A–930C, respectively, and a plurality of entries 926, and 932, respectively. Columns 924A and 930A include descriptions of motions in limine, and, in one embodiment, include hyperlinks to electronic copies of the described motions. Columns 924B and 930B include descriptions of papers filed by the opposing party in response to motions in limine, and, in one embodiment, include hyperlinks to electronic copies of the Response papers. Columns 924C and 930C include descriptions of papers filed in reply to response papers for motions in limine, and, in one embodiment, include hyperlinks to electronic copies of the Reply papers.

FIGS. 4J-1 through 4J-2 (collectively referred to as FIG. 4J) are diagrams of one embodiment of a web page 202R illustrating an index of jury instructions. In one embodiment, jury instructions web page 202R is displayed in response to a user selecting one of links 620E or 620F from trial notebook web page 202M. Page identifier 306 indicates that the user is viewing "Jury Instructions" web page 202R.

Jury instructions web page 202R includes hyperlinks 940, and jury instructions tables 942 and 948. Selecting one of hyperlinks 940 causes a jump to the top of the corresponding jury instructions table 942 or 948. Jury instructions tables 942 and 948 include columns 944A–944C, and 950A–950C, respectively, and a plurality of entries 946, and 952, respectively. Columns 944A and 950A include a pleading index number for each entry. Columns 944B and 950B include a description of each jury instructions entry. Columns 944C and 950C include a date for each jury instructions entry.

FIGS. 4K-1 through 4K-2 (collectively referred to as FIG. 4K) are diagrams of one embodiment of a web page 202S illustrating an index of witnesses. In one embodiment, witness list web page 202S is displayed in response to a user selecting one of links 620G or 620H from trial notebook web page 202M. Page identifier 306 indicates that the user is viewing "Witness List" web page 202S.

Witness list web page 202S includes witness list tables 960 and 966. Witness list tables 960 and 966 include columns 962A–962C, and 968A–968C, respectively, and a plurality of entries 964, and 970, respectively. Columns 962A and 968A include a pleading index number for each entry. Columns 962B and 968B include a description of each witness list entry. Columns 962C and 968C include a date for each witness list entry.

FIGS. 4L-1 through 4L-2 (collectively referred to as FIG. 4L) are diagrams of one embodiment of a web page 202T illustrating an index of exhibits. In one embodiment, exhibit list web page 202T is displayed in response to a user selecting one of links 620I or 620J from trial notebook web page 202M. Page identifier 306 indicates that the user is viewing "Exhibit List" web page 202T.

Exhibit list web page 202T includes exhibit list tables 980 and 986. Exhibit list tables 980 and 986 include columns 982A–982C, and 988A–988C, respectively, and a plurality of entries 984, and 990, respectively. Columns 982A and 988A include a pleading index number for each entry. Columns 982B and 988B include a description of each exhibit list entry. Columns 982C and 988C include a date for each exhibit list entry.

FIGS. 4M-1 through 4M-2 (collectively referred to as FIG. 4M) are diagrams of one embodiment of a web page 202U illustrating an index of deposition designations of testimony. In one embodiment, deposition designations of testimony web page 202U is displayed in response to a user selecting one of links 620K or 620L from trial notebook web page 202M. Page identifier 306 indicates that the user is viewing "Deposition Designation of Testimony" web page 202U.

Deposition designation of testimony web page 202U includes deposition designations tables 1000 and 1006. Deposition designations tables 1000 and 1006 include columns 1002A–1002C, and 1008A–1008C, respectively, and a plurality of entries 1004, and 1010, respectively. Columns 1002A and 1008A include a pleading index number for each entry. Columns 1002B and 1008B include a description of each deposition designations entry. Columns 1002C and 1008C include a date for each deposition designations entry.

FIGS. 4N-1 through 4N-2 (collectively referred to as FIG. 4N) are diagrams of one embodiment of a web page 202V illustrating an index of offers of settlement. In one embodiment, offers of settlement web page 202V is displayed in response to a user selecting link 620N from trial notebook web page 202M. Page identifier 306 indicates that the user is viewing "Offers of Settlement" web page 202V.

Offers of settlement web page 202V includes offers of settlement table 1020. Offers of settlement table 1020 includes columns 1022A–1022C, and a plurality of entries 1024. Column 1022A includes a pleading index number for each entry. Column 1022B includes a description of each offers of settlement entry. Column 1022C includes a date for each offers of settlement entry.

FIGS. 4O-1 through 4O-2 (collectively referred to as FIG. 4O) are diagrams of one embodiment of a web page 202W illustrating an index of special verdict forms. In one embodiment, special verdict forms web page 202W is displayed in response to a user selecting link 620O from trial notebook web page 202M. Page identifier 306 indicates that the user is viewing "Special Verdict Forms" web page 202W.

Special verdict forms web page 202W includes special verdict forms table 1030. Special verdict forms table 1030 includes columns 1032A–1032C, and a plurality of entries 1034. Column 1032A includes a pleading index number for each entry. Column 1032B includes a description of each special verdict forms entry. Column 1032C includes a date for each special verdict forms entry.

FIGS. 4P-1 through 4P-2 (collectively referred to as FIG. 4P) are diagrams of one embodiment of a web page 202X illustrating an index of Voir Dire questions. In one embodiment, Voir Dire questions web page 202X is displayed in response to a user selecting link 620P from trial notebook web page 202M. Page identifier 306 indicates that the user is viewing "Voir Dire Questions" web page 202X.

Voir Dire questions web page 202X includes Voir Dire questions table 1040. Voir Dire questions table 1040 includes columns 1042A–1042C, and a plurality of entries 1044. Column 1042A includes a pleading index number for each entry. Column 1042B includes a description of each Voir Dire questions entry. Column 1042C includes a date for each Voir Dire questions entry.

FIG. 5A is a diagram of one embodiment of a client login web page 202BB. Client login web page 202BB provides an entry point to litigation management system 200 for clients of a law firm. Client login web page 202BB includes client name input block 1050, client password input block 1052, and an "Enter" hyperlink 1054. A client enters a client name in input block 1050, enters an appropriate password in input block 1052, and presses "Enter" hyperlink 1054 to gain access to litigation management system 200. In one embodiment, client access to litigation management system 200 is provided via a secure Internet connection. In one embodiment, a similar login page is provided for attorneys, paralegals, or other appropriate individuals for gaining access to litigation management system 200.

Figure 5B:
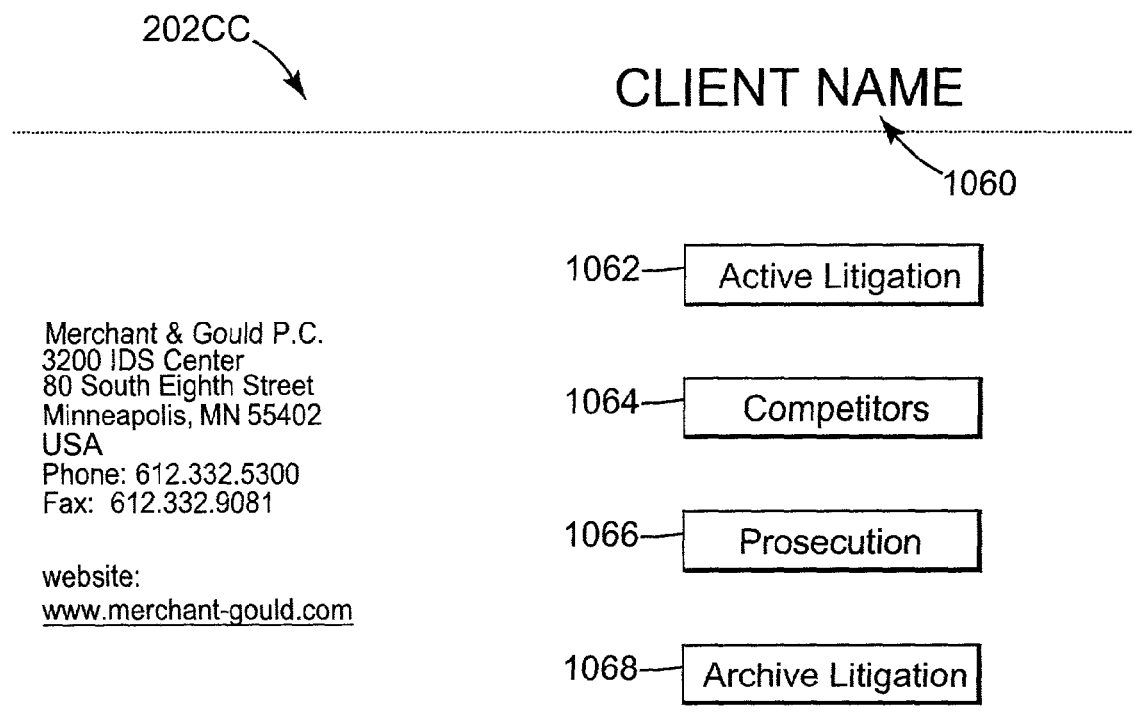
FIG. 5B is a diagram of one embodiment of a client portal web page.
Figure 5C:
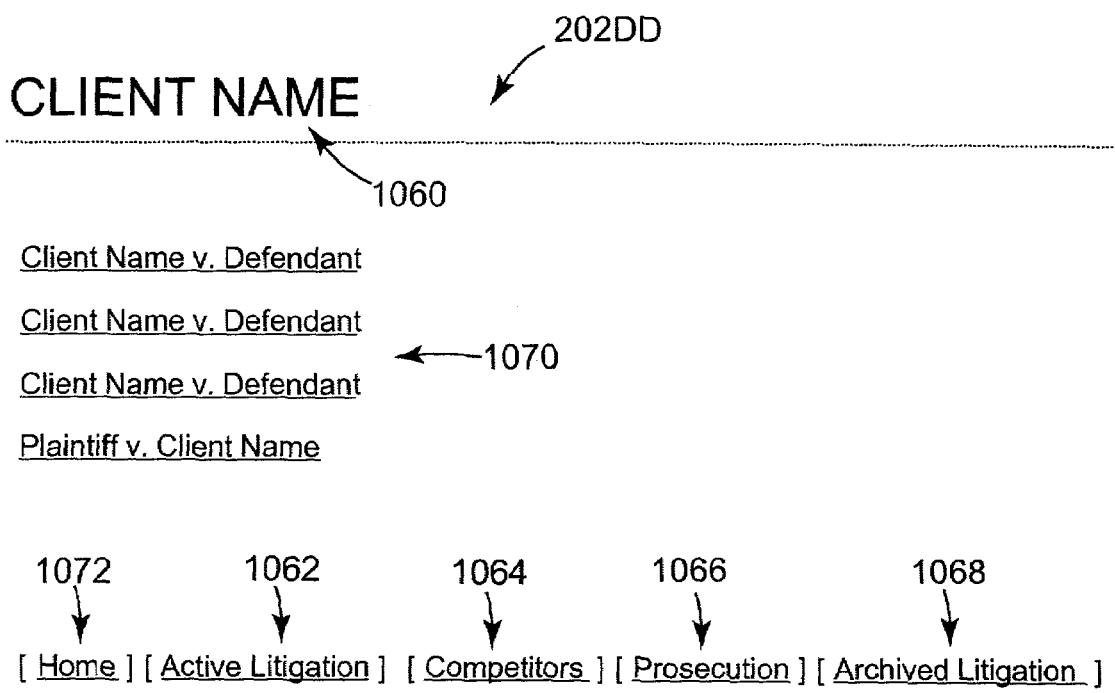
FIG. 5C is a diagram of one embodiment of a web page illustrating a list of active litigation cases for an example client.

After a client has logged into litigation management system 200 via login web page 202BB, client portal web page 202CC, shown in FIG. 5B, is displayed. Client portal web page 202CC includes client identifier 1060, "Active Litigation" hyperlink 1062, "Competitors" hyperlink 1064, "Prosecution" hyperlink 1066, and "Archive Litigation" hyperlink 1068. Selection of active litigation hyperlink 1062 results in the display of web page 202DD (shown in FIG. 5C), which includes a list 1070 of active litigation cases for the logged-in client. Selection of competitors hyperlink 1064 results in the display of a web page containing information on competitors of the logged-in client, including, in one embodiment, hyperlinks to the competitors' home pages and web clippings associated with competitors. Selection of prosecution hyperlink 1066 results in the display of information regarding the logged-in client's pending and issued intellectual property applications, such as patent applications and trademark applications. In one embodiment, the displayed intellectual property information includes status reports, data entry fields, references cited, file histories, and other related information. Selection of archive litigation hyperlink 1068 results in the display of a web page that includes a list of inactive litigation cases (similar to list 1070 of active litigation cases) for the logged-in client.

Each one of the active litigation cases 1070 listed on web page 202DD is a hyperlink. Selection of one of the cases 1070 results in the display of a home page for the case, such as home page 202A or 202A'. The client may then access litigation information regarding the selected case from the displayed home page 202A or 202A'. In one embodiment, the home page 202A or 202A' displayed to a client and the litigation information accessible by a client is different than the home page displayed to attorneys for the case and the litigation information accessible by the attorneys. Web page 202DD also includes "Home" hyperlink 1072 to return to client portal page 202CC.

It will be understood that the present invention is not limited to the specific litigation information shown in the various figures and described herein, but encompasses other types of litigation information as well. It will also be understood that not all litigation information shown and described herein will be needed for every type of litigation. As one example, not every litigation will be a patent litigation, so a patents web page 202I may not be needed in some implementations.

A key feature of one embodiment of the present invention is the organization and logical relationships provided by user interface 202. Litigation information is organized into various logical relationships, including by category and by date, with overlapping categories or subcategories, which allows a user to quickly locate and view a particular litigation document. For example, in one form of the present invention, pleadings web page 202G lists all forms of pleadings information, whereas certain other web pages 202, such as discovery web page 202J, orders web page 202L, and motions web page 202N only list a subset of the pleadings information. Thus, if a user wants to locate a particular court order, for example, the user need not sort through all of the pleadings to locate the order, but can go directly to orders web page 202L to quickly locate and view an electronic copy of the order.

In one embodiment, web pages 202 are continually updated as additional litigation information for a case is accumulated (e.g., additional correspondence, pleadings, etc.). In one form of the invention, documents are scanned and electronic copies are stored in a database for access via appropriate web pages 202. Identifying information for documents (e.g., case, dates, senders, recipients, addresses, etc.) is extracted from the electronic copies using optical character recognition, and the identifying information is stored along with the electronic copies. When a new document has been added to the system, an alert (e.g., an email alert) is sent to appropriate individuals to notify them of the new document and to request that appropriate web pages 202 be updated. In one embodiment, scripting is used (e.g., via Content Publisher, or some other web publishing software) to update pages.

In one form of the invention, when web pages 202 are updated, appropriate individuals (e.g., one or more attorneys and/or paralegals working on the case) are notified by email of the changes. In one embodiment, individual users of litigation management system 200 can subscribe to updates of certain web pages 202, and be notified when changes to these particular web pages 202 occur. For example, a user may want to be notified each time a new Court Order is added to the system 200, but may not want to be notified of the addition of every new correspondence.

One form of litigation management system 200 includes a scanning log feature that automatically increments a counter when a new page is added to the system 200. Litigation management system 200 can also automatically calculate the total number of pages in the system 200. An invoice may be generated based on the counter value, the calculated total number of pages, or the change in the calculated total number of pages from a previously calculated total number of pages.

The present invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

In one embodiment, the logical operations of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer-based user interface for accessing litigation information associated with at least one litigation case, the user interface comprising:

a home page including a first plurality of user-selectable hyperlinks, each hyperlink in the first plurality of hyperlinks identifying a category of litigation information, the hyperlinks thereby identifying categories of litigation information, and a plurality of web pages, each web page associated with one of the hyperlinks in the first plurality of web pages, each web page providing litigation information related to the category identified by the hyperlink associated with the web page, each web page displayed in response to selection of the hyperlink associated with the web page, wherein at least one web page associated with one of the plurality of hyperlinks in the first plurality of hyperlinks includes a hyperlink to an electronic copy of a document related to the category identified by the hyperlink associated with the at least one web page, and wherein one of the categories identified by the hyperlinks is pleadings information, and wherein the web page associated with the hyperlink for pleadings information includes a plurality of pleadings entries, each pleadings entry including a description of a pleading.

2. The computer-based user interface of claim 1, wherein one of the categories identified by the hyperlinks is contact information, and wherein the web page associated with the hyperlink for contact information includes contact information for opposing counsel, the court handling the litigation case, and clients.

3. The computer-based user interface of claim 1, wherein one of the categories identified by the hyperlinks is docket information, and wherein the web page associated with the hyperlink for docket information includes a plurality of docket entries, each docket entry including a description of a litigation action and a due date for the action.

4. The computer-based user interface of claim 3, wherein the web page associated with the hyperlink for docket information includes hyperlinks to electronic copies of litigation documents associated with docket entries.

5. The computer-based user interface of claim 1, wherein one of the categories identified by the hyperlinks is correspondence information, and wherein the web page associated with the hyperlink for correspondence information includes a plurality of correspondence entries, each correspondence entry including a description of a correspondence and a date of the correspondence.

6. The computer-based user interface of claim 5, wherein the web page associated with the hyperlink for correspondence information includes hyperlinks to electronic copies of correspondence.

7. The computer-based user interface of claim 1, wherein each pleadings entry further includes a pleadings number, a date, and a source identifier identifying a source of the described pleading.

8. The computer-based user interface of claim 7, wherein the web page associated with the hyperlink for pleadings information includes hyperlinks to electronic copies of pleadings documents.

9. The computer-based user interface of claim 1, wherein one of the categories identified by the hyperlinks is rules information, and wherein the web page associated with the hyperlink for rules information includes a plurality of hyperlinks to legal information sources relevant to the litigation case.

10. The computer-based user interface of claim 1, wherein one of the categories identified by the hyperlinks is patent information, and wherein the web page associated with the hyperlink for patent information includes information regarding at least one patent involved in the litigation case.

11. The computer-based user interface of claim 10, wherein the web page associated with the hyperlink for patent information includes a hyperlink to an electronic copy of the at least one patent.

12. The computer-based user interface of claim 10, wherein the web page associated with the hyperlink for patent information includes a hyperlink to an electronic copy of a file history of the at least one patent.

13. The computer-based user interface of claim 1, wherein one of the categories identified by the hyperlinks is discovery information, and wherein the web page associated with the hyperlink for discovery information includes a plurality of discovery entries, each discovery entry including a description of a discovery document.

14. The computer-based user interface of claim 13, wherein the discovery entries further include a date of service and a due date.

15. The computer-based user interface of claim 13, wherein the web page associated with the hyperlink for discovery information includes hyperlinks to electronic copies of discovery documents.

16. The computer-based user interface of claim 13, wherein the discovery entries are grouped into subcategories including plaintiff's discovery, defendant's discovery, and depositions.

17. The computer-based user interface of claim 1, wherein one of the categories identified by the hyperlinks is expert information, and wherein the web page associated with the hyperlink for expert information includes information regarding experts used in the litigation case.

18. The computer-based user interface of claim 17, wherein the web page associated with the hyperlink for expert information includes a plurality of hyperlinks to electronic copies of documents related to experts.

19. The computer-based user interface of claim 18, wherein the plurality of hyperlinks to electronic copies of documents related to experts includes hyperlinks to electronic copies of expert reports and expert depositions.

20. The computer-based user interface of claim 1, wherein one of the categories identified by the hyperlinks is court orders, and wherein the web page associated with the hyperlink for court orders includes a plurality of court order entries, each court order entry including a description of a court order.

21. The computer-based user interface of claim 20, wherein the court order entries further include pleadings numbers and dates associated with the court orders.

22. The computer-based user interface of claim 21, wherein the web page associated with the hyperlink for court orders includes hyperlinks to electronic copies of court orders.

23. The computer-based user interface of claim 1, wherein one of the categories identified by the hyperlinks is trial information, and wherein the web page associated with the hyperlink for trial information includes a plurality of hyperlinks to electronic copies of documents to be submitted to a court for trial.

24. The computer-based user interface of claim 23, wherein the plurality of hyperlinks to electronic copies of documents to be submitted to a court for trial include hyperlinks to electronic copies of trial briefs, motions in limine, jury instructions, witness lists, and exhibit lists.

25. The computer-based user interface of claim 24, wherein the plurality of hyperlinks to electronic copies of documents to be submitted to a court for trial include hyperlinks to electronic copies of designations of deposition testimony and offers of settlement.

26. The computer-based user interface of claim 1, wherein one of the categories identified by the hyperlinks is motions, and wherein the web page associated with the hyperlink for motions includes a plurality of descriptions of motions and a plurality of hyperlinks to electronic copies of described motions.

27. The computer-based user interface of claim 1, wherein one of the categories identified by the hyperlinks is copy information, and wherein the web page associated with the hyperlink for copy information allows a user to specify a list of individuals that are provided a copy of a specified litigation document.

28. The computer-based user interface of claim 27, wherein the web page associated with the hyperlink for copy information allows a user to specify a manner in which the specified litigation document is provided to each of the individuals in the specified list.

29. The computer-based user interface of claim 1, wherein one of the categories identified by the hyperlinks is client information, and wherein the web page associated with the hyperlink for client information provides access to case budget information and conflict information.

30. The computer-based user interface of claim 29, wherein the web page associated with the hyperlink for client information includes a plurality of hyperlinks to client information.

31. The computer-based user interface of claim 1, and further comprising a search feature that allows a user to specify a search for litigation information related to the litigation case.

32. The computer-based user interface of claim 1, wherein the home page includes a status information identifier that identifies at least one litigation task that is due by a specified date.

33. The computer-based user interface of claim 32, wherein the status information identifier is included on each of the plurality of web pages.

34. The computer-based user interface of claim 1, wherein each of the plurality of web pages includes the first plurality of user-selectable hyperlinks.

35. The computer-based user interface of claim 1, wherein at least one of the plurality of web pages includes hyperlinks to electronic copies of litigation documents.

36. The computer-based user interface of claim 35, wherein the electronic copies of litigation documents include electronic copies of correspondence and pleadings.

37. The computer-based user interface of claim 35, wherein the electronic copies of litigation documents are stored on a plurality of computers.

38. The computer-based user interface of claim 37, wherein the plurality of computers include at least one local computer and at least one remote computer that is located offsite from the at least one local computer.

39. The computer-based user interface of claim 38, wherein the at least one remote computer includes a first remote computer located offsite from the at least one local computer in a first location, and a second remote computer located offsite from the at least one local computer in a second location.

40. The computer-based user interface of claim 1, wherein the categories of litigation information identified by the first plurality of hyperlinks include at least one subcategory that is logically related to one of the other categories.

41. The computer-based user interface of claim 1, wherein the computer-based user interface is storable on a portable computer-readable medium.

42. The computer-based user interface of claim 41, wherein the computer-based user interface further comprises electronic copies of litigation documents referenced by the plurality of web pages.

43. The computer-based user interface of claim 1, wherein the computer-based user interface is stored on a CD-ROM.

44. The computer-based user interface of claim 1, wherein the computer-based user interface is stored on a corporate intranet.

45. The computer-based user interface of claim 1, wherein the home page includes a user-selectable hyperlink for executing an application program.

46. The computer-based user interface of claim 45, wherein the application program is a document management system.

47. The computer-based user interface of claim 46, wherein the document management system is Summation Blaze.

48. A litigation management system for managing and providing access to litigation information stored on a computer network, the system comprising:
 a server computer coupled to the computer network for storing user interface information, the user interface information including a primary page having a plurality of links to a plurality of secondary pages, the primary page identifying a plurality of categories and subcategories of litigation information, each subcategory logically related to at least one of the categories, the secondary pages providing litigation information related to the identified categories and subcategories; and
 a client computer coupled to the computer network for displaying a user interface based on user interface information received from the server computer, the client computer configured to access the plurality of secondary pages via the user interface;
 wherein the categories and subcategories of litigation information include at least one of pleadings information, discovery information, court orders, and motions.

49. The litigation management system of claim 48, wherein the subcategories include discovery information, court orders, and motions, and wherein the litigation information provided by the secondary pages related to the subcategories of discovery information, court orders, and motions is also provided by the secondary page related to the category of pleadings information.

50. The litigation management system of claim 48, wherein the plurality of categories and subcategories include at least a subset of the following: Contact information, docket information, case information, correspondence information, pleadings information, legal references information, discovery information, expert information, orders information, trial information, motions, and copy information.

51. The litigation management system of claim 50, wherein one of the plurality of categories is patent information.

52. The litigation management system of claim 48, wherein the primary page includes a status information identifier that identifies at least one litigation task that is due by a specified date.

53. The litigation management system of claim 52, wherein the status information identifier is included on each of the plurality of secondary pages.

54. The litigation management system of claim 48, wherein each of the plurality of secondary pages includes at least a subset of the plurality of links.

55. The litigation management system of claim 48, wherein at least one of the plurality of secondary pages includes links to electronic copies of litigation documents.

56. The litigation management system of claim 55, wherein the electronic copies of litigation documents are stored on a plurality of computers coupled to the computer network.

57. The litigation management system of claim 48, wherein the primary page includes a user-selectable hyperlink for executing an application program.

58. The litigation management system of claim 57, wherein the application program is a document management system.

59. The litigation management system of claim 58, wherein the document management system is Summation Blaze.

60. A method of managing litigation information for at least one lawsuit, the method comprising:
- storing litigation information for the lawsuit on a computer network;
- storing user interface data on the computer network;
- generating and displaying a user interface based on the stored user interface data, the user interface providing a plurality of links to the litigation information, each of the plurality of links corresponding to one category of a plurality of categories of litigation information, at least one of the categories of litigation information being a subcategory of at least one of the other categories of litigation information, wherein the categories of litigation information include at least one of pleadings information, discovery information, court orders, and motions;
- receiving selection data provided by a user, the selection data identifying a first link in the plurality of links; and
- displaying litigation information related to the category corresponding to the first link.

61. The method of claim 60, wherein the plurality of categories of litigation information include at least a subset of the following: Contact information, docket information, case information, correspondence information, pleadings information, legal references information, discovery information, expert information, orders information, trial information, motions, and copy information.

62. The method of claim 60, wherein the displayed litigation information includes at least a subset of the plurality of links.

63. The method of claim 60, wherein the displayed litigation information includes links to electronic copies of litigation documents related to the category corresponding to the first link.

64. The method of claim 60, and further comprising storing the litigation information for the lawsuit on a plurality of computers coupled to the computer network.

65. The method of claim 60, wherein the user interface data is stored on a server computer coupled to the computer network and is accessible to client computers via communication with the server computer.

66. The method of claim 60, wherein the user interface data is stored in a memory of at least one client computer coupled to the computer network.

67. The method of claim 66, wherein the user interface data is stored on a CD-ROM of the at least one client computer.

68. A computer-readable medium having computer-executable instructions for performing a method of accessing litigation information for at least one lawsuit, comprising:
- generating a primary display screen including a plurality of user-selectable litigation categories, the plurality of user-selectable litigation categories including at least one user-selectable litigation subcategory that is logically related to at least one of the other litigation categories;
- receiving category selection information from a user identifying one of the user-selectable litigation categories; and
- generating a secondary display screen including litigation information related to the identified litigation category, the secondary display screen including user-selectable links to electronic copies of litigation documents related to the identified litigation category.

69. The computer-readable medium of claim 68, wherein the method further comprises:
- receiving document selection information from a user identifying one of the user-selectable links to electronic copies of litigation documents; and
- generating a display of an electronic copy of a litigation document corresponding to the identified link.

70. The computer-readable medium of claim 68, wherein the plurality of user-selectable litigation categories includes pleadings information, and wherein the at least one user-selectable litigation subcategory includes discovery information, and wherein the litigation information related to the discovery information subcategory is a subset of the litigation information related to the pleadings category.

71. The computer-readable medium of claim 68, wherein the plurality of user-selectable litigation categories includes pleadings information, and wherein the at least one user-selectable litigation subcategory includes motions, and wherein the litigation information related to the motions subcategory is a subset of the litigation information related to the pleadings category.

72. The computer-readable medium of claim 68, wherein the plurality of user-selectable litigation categories includes pleadings information, and wherein the at least one user-selectable litigation subcategory includes court orders, and wherein the litigation information related to the court orders subcategory is a subset of the litigation information related to the pleadings category.

73. A litigation management system for managing and providing access to litigation information stored on a computer network, the system comprising:
- at least one server computer coupled to the computer network for storing user interface information, the user interface information comprising:
  - a client login page;
  - a plurality of litigation case selection pages, each litigation case selection page including at least one hyperlink identifying at least one litigation case associated with a particular client;
  - a plurality of litigation case home pages, each litigation case home page associated with one of the identified litigation cases, each litigation case home page including a first plurality of hyperlinks, each hyperlink in the first plurality identifying a category of litigation information; and
  - a plurality of web pages, each web page associated with one of the hyperlinks in the first plurality of hyperlinks of one of the home pages, each web page providing case specific litigation information related to the category identified by the hyperlink associated with the web page; and
- a client computer coupled to the computer network for displaying a user interface based on user interface information received from the server computer, the client computer configured to access at least a subset of the plurality of web pages via the user interface.

74. The litigation management system of claim 73, wherein the user interface information further comprises:
- a plurality of topics pages, each topics page associated with a particular client and including a plurality of hyperlinks identifying a plurality of topics, the plurality of hyperlinks identifying a plurality of topics including a litigation hyperlink; and
- wherein each litigation case selection page is associated with a litigation hyperlink on one of the plurality of topics pages.

75. The litigation management system of claim 74, wherein the litigation hyperlink is associated with active litigation cases, and wherein the plurality of hyperlinks identifying a plurality of topics further comprises an inactive litigation hyperlink associated with inactive litigation cases.

76. The litigation management system of claim 74, wherein the plurality of hyperlinks identifying a plurality of topics further comprises a competitors hyperlink that provides a link to information about a particular client's competitors.

77. The litigation management of claim 74, wherein the plurality of hyperlinks identifying a plurality of topics further comprises a prosecution hyperlink that provides a link to information about a particular client's intellectual property applications.

78. A method of accessing litigation information associated with at least one litigation case, the method comprising:
- displaying a home page including a first plurality of user-selectable hyperlinks, the hyperlinks in the first plurality identifying a plurality of categories and subcategories of litigation information, each subcategory logically related to at least one of the categories;
- selecting a first one of the plurality of hyperlinks; and
- displaying a web page associated with the first one of the hyperlinks, the web page providing litigation information related to a category identified by the first one of the hyperlinks,
- wherein the litigation information related to the category identified by the first one of the hyperlinks includes a plurality of litigation information entries, each litigation information entry including a description of the litigation information and a hyperlink to an electronic copy of a litigation document associated with the litigation information entry.

79. A user interface for accessing litigation information associated with at least one litigation case, the user interface comprising:
- a home page including a correspondence hyperlink and a pleadings hyperlink;
- a correspondence web page associated with the correspondence hyperlink, the correspondence web page including a plurality of correspondence entries, each correspondence entry including identifying information for a correspondence related to the at least one litigation case; and
- a pleadings web page associated with the pleadings hyperlink, the pleadings web page including a plurality of pleading entries, each pleading entry including identifying information for a pleading related to the at least one litigation case.

80. The user interface of claim 79, wherein the correspondence web page includes hyperlinks to electronic copies of correspondence related to the at least one litigation case.

81. The user interface of claim 79, wherein the pleadings web page includes hyperlinks to electronic copies of pleading documents.

* * * * *